United States Patent [19]
Johnson

[11] Patent Number: 6,122,606
[45] Date of Patent: Sep. 19, 2000

[54] SYSTEM AND METHOD FOR ENHANCING HUMAN COMMUNICATIONS

[76] Inventor: William J. Johnson, 1445 Sedalia Dr., Flower Mound, Tex. 75028

[21] Appl. No.: 08/763,312

[22] Filed: Dec. 10, 1996

[51] Int. Cl.[7] .................................................. G10L 17/28
[52] U.S. Cl. .................................................................. 704/7
[58] Field of Search .................................. 704/1, 2, 3, 7, 704/8; 400/472, 484; 345/352, 156

[56] References Cited

U.S. PATENT DOCUMENTS

| | | | |
|---|---|---|---|
| 4,393,460 | 7/1983 | Masuzawa et al. | 704/3 |
| 5,384,701 | 1/1995 | Stentiford et al. | 704/3 |
| 5,387,104 | 2/1995 | Corder | 704/270 |
| 5,510,981 | 4/1996 | Berger et al. | 704/2 |
| 5,528,491 | 6/1996 | Kuno et al. | 704/9 |
| 5,612,872 | 3/1997 | Fujita | 704/2 |
| 5,675,817 | 10/1997 | Moughanni et al. | 704/3 |
| 5,697,789 | 12/1997 | Sameth et al. | 434/157 |
| 5,826,219 | 10/1998 | Kutsumi | 704/4 |
| 5,854,997 | 12/1998 | Sukeda et al. | 704/3 |

*Primary Examiner*—Forester W. Isen
*Assistant Examiner*—Patrick N. Edouard
*Attorney, Agent, or Firm*—Felsman, Bradley, Vaden, Gunter & Dillon, LLP

[57] ABSTRACT

Provided is a system and method for enhancing human communications. A user selected first language is translated to other languages, using translation rules. A language may be a visual representation, audio representation, and/or a physical form representation. A language also has multilingual characteristics, and can be a single word or a dialogue. A first user communicates to the present invention in a first language of terms familiar and methodology desirable to the first user. The present invention uses translation rules to correlate the first language with a second language, according to a translation member, of the translation rules, which contains a translation record that matches the first language. A translation record in the translation member is then used to communicate a second language of terms familiar and methodology desirable to a second user. A tree menu mode provides a user with a tree structured interface of first language menu selections for constructing and communicating a correlated second language. A static response mode provides a user with a linear list of first language candidate selections for communicating a correlated second language.

34 Claims, 32 Drawing Sheets

SYSTEM AND METHOD FOR ENHANCING HUMAN COMMUNICATIONS

The co-pending application entitled "System and Method for Dynamic Controls", referenced as ENV-96-01, and filed on the same day herewith, discloses matter utilized by the present invention.

FIELD OF THE INVENTION

The present invention relates generally to communication devices, and more particularly to human communications between people who are unable to communicate with each other by speaking.

BACKGROUND OF THE INVENTION

Hospitals are often occupied with individuals, referred to as patients, who have survived a surgical procedure. Many post-op patients are placed on a ventilator to assure adequate respiration with proper oxygen intake. Such patients are unable to communicate to doctors or nurses by speaking because a breathing tube of the ventilator is inserted into the lungs of a patient through the mouth. Such patients are faced with nodding yes or no to questions they may not even see as appropriate. Other patients may be offered to write, but it is difficult to write legibly, particularly when anesthesia has not worn off. Some patients may not be physically able to write, and others may not be able to write because of the surgery they just had. In any case, people trying to communicate often become upset and frustrated. This situation is worse when the patient speaks a different language than the hospital personnel.

As the world becomes a global economy, it is commonplace for a patient to travel great distances for the best doctor. The patient may be placed in a hospital where the language spoken is foreign. It will be difficult to help the patient without hospital personnel who can translate. Proper communications between a patient and hospital personnel could save a life, or prevent a disaster.

It is clear that most people want good communications in most situations. It is very frustrating to not be able to understand someone, or not be able to make someone understand. Sometimes miscommunication can be costly. Businesses, for example, restaurants, car rental agencies, airlines, and others, cater to international customers. It is unreasonable to expect personnel to communicate effectively to every customer from every part of the world. Also, for some businesses, it is often more timely, therefore cost efficient, to present a customer with the finite set of choices available in an automated manner, rather than wasting time with discussing one or more subjects which never should have been brought up in the first place.

Further still, there are students who would like a convenient and portable method for learning foreign languages.

What is required is an improved system and method for enhancing human communications. Enhancing communications is needed in situations which involve patients, the handicapped, foreigners, students, or even businesses which can be run more efficiently.

SUMMARY OF THE INVENTION

The present invention is a system and method for enhancing human communications. A user selected first language is translated to other languages, using translation rules. A language is any form of communications to, or from, a human (or animal). A language may be a visual representation, audio representation, and/or a physical form representation. A language also has multilingual characteristics, and can be a single word or a dialogue. A first user communicates to the present invention in a first language of terms familiar and methodology desirable to the first user. The present invention uses translation rules to correlate the first language with a second language, according to a translation member, of the translation rules, which contains a translation record that matches the first language. A translation record in the translation member is then used to communicate a second language of terms familiar and methodology desirable to a second user.

The present invention operates in a variety of modes, including a tree menu mode, a static response mode, a dictionary mode, and an alphanumeric mode.

The tree menu mode provides a user with a tree structured interface of first language menu selections for constructing and communicating a correlated second language. The selected path of nodes of the tree are used for constructing a communication. As selections are made, traversal to descending levels of the menu tree is accomplished, and a more detailed communication is achieved.

The static response mode provides a user with a linear list of first language candidate selections for communicating a correlated second language. The linear list is of communications that have been anticipated for communicating. User defined static response modes can be defined.

The dictionary mode provides a user with a dictionary of first language selections for constructing and communicating a correlated second language. Dictionary support enables accurate and timely language construction. The dictionary mode also enables a user with ability to specify keywords, from the dictionary, for searching anticipated first language selections for communicating a correlated second language.

The alphanumeric mode enables a user to construct a free-form language.

All modes utilize similar translation rules, translation members, and translation records. A particular translation member is referenced by position in a tree structure (tree menu mode), position in a table (static response mode), spelling match to a subset key specification (dictionary mode), or content match to a keyword(s) specification (dictionary mode for searching anticipated sayings).

Translation rule edit capability is appropriately provided so that situations in the field (i.e. location of use) can be used to tailor the system.

An actual preferred embodiment of the present invention is the Language Interpretation and Processing System (LIPS) which is discussed below. LIPS has an interface which allows discussion in terms of a host and a client. The host and client is a user, possibly the same user. The host is a person who wants to find out what a client wishes to communicate to the host. The client uses LIPS to communicate effectively to the host. LIPS is most effective when the dialogue between the client and host is reasonably predictable, for example, a patient in a hospital, a customer in a restaurant, a customer at a rental agency, a student, etc.

LIPS enables a client who cannot speak to communicate effectively to a host. The client can also be blind or deaf. The host can be mute, blind or deaf. The client and host can communicate in the same or different languages, for example, English and French. The client communicates to the system in terms familiar and methodology desirable to the client. The system then communicates the client dialogue to the host in terms familiar and methodology desirable to the host.

A conveniently selected client displayed language, with optionally a client audible language (uttered or played recording), is automatically associated to a host output. A physical form of language suitable to human touch, such as Braille or an embossed representation of a written language, may also be used by a client (e.g. blind). The conveniently selected host output is an automatically displayed language, an audible language (uttered or played recording), or both displayed and audible.

LIPS can also be used to learn more about a language which is native, or foreign, to a user. It provides a tool by which someone can see language equivalents of many words in language dictionaries, and retrieve common language dialogues given some keywords for search criteria. The tree menu mode further provides ways for organizing topics and/or subjects about particular languages with convenient selecting therefrom.

The host or client can instantly see and/or hear another language form equivalent to a first language form which is either felt, seen or heard.

It is one objective of the present invention to provide a person who is suddenly unable to communicate effectively with the ability to communicate effectively, particularly in a situation where there is a reasonably predictable dialogue. A person who is mute (unable to speak temporarily or permanently), or is mute along with being blind, deaf, and/or unable to write as the result of a surgery, still needs to be able to communicate. The present invention enables such a person to communicate effectively.

It is another objective of the present invention to provide a handicapped person with the ability to communicate effectively, particularly in a situation where there is a reasonably predictable dialogue.

Another objective of the present invention is to provide a translation tool between people who do not speak the same language.

Another objective of the present invention is to provide means for a user to manage a personalized set of data through editing any of translation rules.

Another objective of the present invention is to provide means for communication through the most simple action, such as the pressing of a button.

Yet another objective of the present invention is to provide a learning tool for people who want to sharpen their language skills, or sharpen skills on one or more other languages.

Yet another objective of the present invention is to provide means for organizing a menu for selection, as well as organizing language data.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

Dycons of the Present Invention

Figure 1:
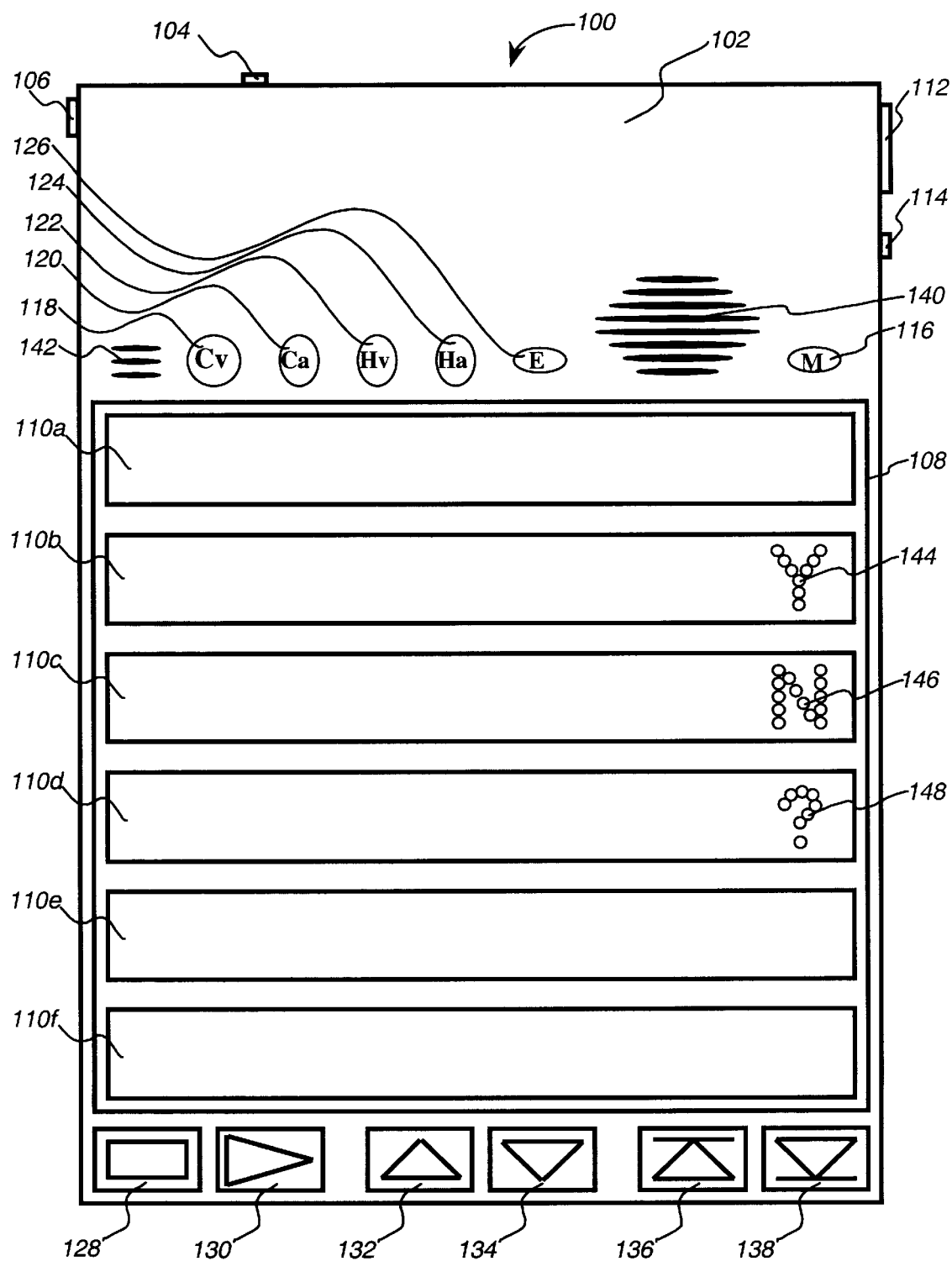
FIG. 1 illustrates a top view of a preferred housing embodiment of the present invention.

The present invention utilizes dycons as presented in the co-pending application entitled "System and Method for Dynamic Controls", referenced as ENV-96-01, and filed on the same day herewith. A dycon is a conventional control coupled with a dedicated display means, coordinated by data processing. It is well known to those skilled in the relevant art how the mechanisms of such conventional controls are designed, how they operate, and how they are manufactured. Varieties of display means are available for converting a conventional control into a dycon. Preferably, the dedicated display means is affixed to the control. Alternate embodiments will locate the dedicated display means in a location which is visually perceptible as being dedicated to a particular control. A dycon has one, and only one, dedicated display means which depicts information for only that particular dycon. A dycon's dedicated display means has one, and only one, mechanical control for which it displays meaning. Information displayed on the dedicated display means assigns a current meaning to the dycon. A dycon may have many meanings over a period of time as indicated by the many variations in what is displayed for the dycon.

Candidate embodiments of small display means include Liquid Crystal Displays (LCDs), Light Emitting Diode (LED) displays, Electroluminescent (EL) displays, customized Color Plasma Displays (CPDs), customized Flat Panel Displays (FPDs), and the like. Display means which are vulnerable to damage, such as LCDs affixed to, or integrated with, a control, should be protected with an appropriate rigid transparent covering. The rows by columns matrix for a particular display should be suitable for the size and types of images to be displayed. Those skilled in the art recognize the many options available which are suitable for display means, considering characteristics such as refresh speed, low voltage requirements, graphical resolution, etc. Many techniques exist across manufacturers for image enhancements. The display means may display text, graphics, icons, animation, or anything which can be displayed.

Small EL displays can be glued directly onto a control. An EL display is a thin film luminescent layer sandwiched between layers (at least one transparent viewing side layer) and a matrix of row and column electrodes. The electronic control circuit lights pixels by energizing the phosphor of intersecting row and columns.

Of course, many shapes, sizes, and types of mechanical controls and dedicated display means, as well as various types of refresh value embodiments and dynamic display refreshes, may be employed without departing from the spirit and scope of the invention.

A dycon can be manufactured as a hardware unit to be sold as a single component to a manufacturer, referred to as a prefabricated component. An appropriate interface is provided to the prefabricated component (dycon) so that the equipment which hosts the prefabricated component (dycon) can incorporate it with minimal effort.

An alternative embodiment of a prefabricated component is called a polydycon. A polydycon is a plurality of dycons which can be manufactured as a single hardware unit to be sold as a single component to a manufacturer.

With reference now to the figures, FIG. 1 illustrates a top view of a preferred housing embodiment of the present invention. The language interpretation and processing system (LIPS) 100 embodiment of the present invention includes a housing 102 which houses data processing system components (discussed below in FIG. 2) to work in cooperation with a power cord female connector 104, an ON/OFF power switch 106, a grouping 108 of a plurality of dycons 110 (shown generally as dycons 110), a parallel port 112, a PS/2 port 114, a mode control 116, a client video control 118, a client audio control 120, a host video control 122, a host audio control 124, an edit control 126, a pause control 128, an iteration control 130, a page up control 132, a page down control 134, a context back control 136, a context forward control 138, a speaker vent 140, a microphone vent 142, an embossed yes symbol 144, an embossed no symbol 146, and an embossed don't know symbol 148. Two or more fan vents (not shown) are provided in the back and/or sides to enable ventilation to data processing system components.

Controls 116, 118, 120, 122, 124, 126, 128, 130, 132, 134, 136, and 138 are buttons in the FIG. 1 preferred embodiment. Dycons 110 are activated according to user selections of a first language.

The microphone vent 142 is required with an on-board microphone and audio editing capability through use of the edit control 126. The edit control 126 is required if user maintenance is permitted to translation rules. Various present invention embodiments may or may not have the edit control 126 and/or an on-board microphone.

LIPS 100 is manufactured at a length by width dimension of about a legal size piece of paper (14 by 8.5 inches), and just less than a couple inches thick (thickness not shown) at any cross section. Future miniaturization of data processing components, as well as technology advances, can allow manufacturing a smaller size and may allow manufacturing without a fan with complementary fan vents. There are various shapes, sizes, dimensions, controls, and look and feel user interfaces, without departing from the spirit and scope of the invention.

Dycons 110 are manufactured individually, for example dycon 110*a* is a prefabricated component, dycon 110*b* is a prefabricated component, and so on. Dycons 110 are placed into a grouping 108 by virtue of the housing 102. An alternate embodiment of the present invention is to manufacture all dycons 110 as a single prefabricated component referred to as a polydycon. The polydycon, a single component, can easily be secured into the housing 102 of LIPS 100 during assembly at the assembly line.

Controls (buttons as manufactured in LIPS 100) are strategically placed on LIPS 100. Client controls are large and easy to access, as are dycons 110. Client controls include the pause control 128, the iteration control 130, the page up control 132, the page down control 134, the context back control 136, and the context forward control 138. Host controls are sized according to anticipated frequency of use and are preferably positioned where they will not be activated inadvertently. Host controls include the mode control 116, the client video control 118, the client audio control 120, the host video control 122, the host audio control 124, and the edit control 126. Dycons 110 may have a plurality of physical language forms embossed thereon, for example, yes symbol 144, no symbol 146, and don't know symbol 148. The preferred embodiment uses raised embossing for symbols which would make sense if read, but are intended to be distinguishable by touch. LIPS 100 is manufactured for the medical community and many patients do not know Braille. For example, many patients are newly blinded. Such patients who are also unable to speak at the time of important questions (e.g. on ventilator) can be asked questions, and can then touch the appropriate answer. Pressing a button and feeling for the correct key may be all a person is physically able to do. LIPS 100 shows embossed symbols 144, 146, and 148 to demonstrate capable functionality. Alternate embodiments will present a user with a variety of symbols, including Braille, at various locations on a control such as a dycon. A single dycon may have a plurality of different physical form symbols located at distinguishable locations on the dycon.

Dycons 110 are large enough to support a reasonably long text line of large font text to be displayed. Dycons 110 should not be so sensitive that inadvertent touch will activate. LIPS 100 dycons 110 are about one inch tall and allow displaying two large fonts. If the text to be displayed is less than the length of the dycon in the largest font, a single text line in the large font is displayed. If the text to be displayed is greater than the length of the dycon in the largest font, then two lines of a smaller font are displayed on the dycon. Dycons 110 support two sizes that are independent of the data processing system. A graphics driver 228 (discussed below) manages appropriate display. Text lines which are too long to be displayed in either font are clipped. It is therefore important to assure data used by LIPS 100 is of appropriate length. Both fonts are very large and well illuminated to be viewed by people with poor vision in low or high light situations. Alternate embodiments will allow a variety of fonts and sizes of text to be displayed to the dycon depending on the type, length, and other attributes of the image to be displayed.

Client video control 118 is used at any time to toggle to a new displayed language on dycons 110 in any mode. It is also used during editing so that multiple languages of a translation member can be toggled for appropriate editing.

Figure 2:
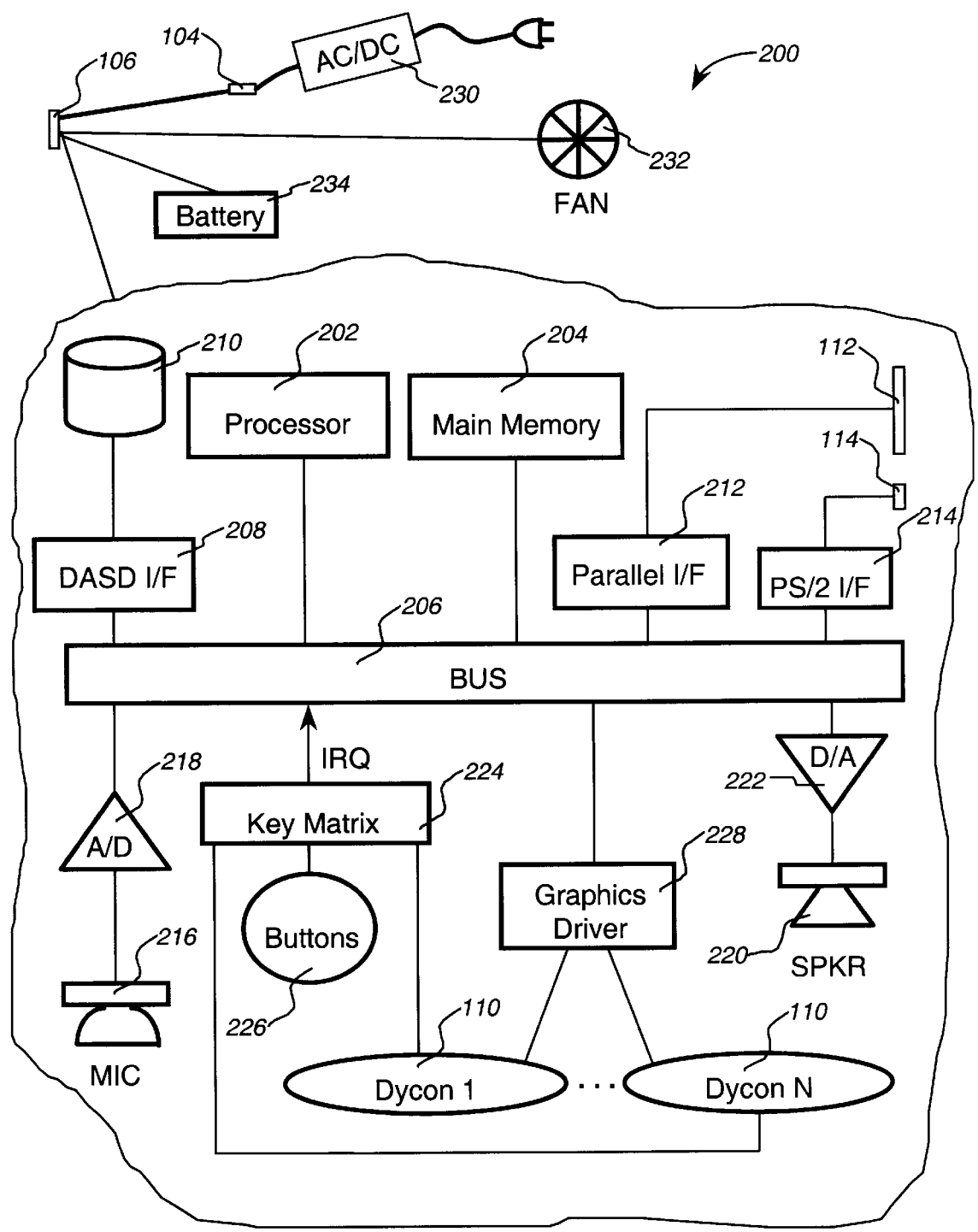
FIG. 2 depicts a block diagram of a preferred embodiment of the data processing system components of the present invention.

FIG. 2 depicts a block diagram of a preferred embodiment of the data processing system components of the present invention. A data processing system 200 according to the present invention includes at least one processor 202 and main memory 204, for example random access memory (RAM), coupled to a bus 206. The data processing system 200 also includes a direct access storage device (DASD) interface module 208 connected to bus 206 for interface to a storage device, for example a hard disk drive 210. A parallel interface module 212 is connected to bus 206 for communicating over a parallel cable connected to parallel port 112. A PS/2 interface module 214 is connected to bus 206 for communicating over a PS/2 cable connected to PS/2 port 114.

The data processing system 200 may include a microphone 216 connected to an analog to digital (A/D) converter 218 which is in turn connected to bus 206. A speaker 220 connected to digital to analog (D/A) converter 222 is connected to bus 206. Obvious switches and bus interfaces are incorporated to coordinate A/D 218 and DIA 222.

The data processing system 200 also includes a key matrix module 224 for issuing Interrupt Requests (IRQs) upon detection of user manipulation of control(s), for example buttons 226 (controls 116–138), and dycons 110. A graphics driver 228 drives dedicated display means for dycons 110 (shown generally as dycons 110) according to data processing system control logic.

An alternating current to direct current (AC/DC) transformer 230 is integrated with a power cord which is connected to power cord female connector 104. The LIPS 100 embodiment is powered on or off with power switch 106. Power switch 106 draws electricity source through power cord female connector 104 when plugged in, otherwise a rechargeable battery 234 is sourced. A fan 232 operates whenever power switch 106 is in the ON position to keep data processing system components at an appropriate temperature. Rechargeable battery 234, for example a lithium battery, recharges whenever plugged in and power switch 106 is in the ON position.

Data processing system programs (also called control logic) may be completely inherent in the processor 202 being a customized semiconductor, or may be stored in main memory 204 for execution by processor 202 as the result of a read-only memory (ROM) load (not shown), or may be loaded from a storage device, such as hard disk drive 210, into main memory 204 for execution by processor 202. Such programs, when executed, enable the data processing system 200 to perform features of the present invention as discussed herein. Accordingly, such data processing system programs represent controllers of the data processing system.

In one embodiment, the invention is directed to a control logic program product comprising a processor 202 readable medium having control logic (software) stored therein. The control logic, when executed by processor 202, causes the processor 202 to perform functions of the invention as described herein.

In another embodiment, the invention is implemented primarily in hardware, for example, using a prefabricated component state machine (or multiple state machines) in a semiconductor element, such as processor 202. Key matrix module 224, as well as graphic driver 228, may have all, or part of, its processing in the semiconductor element.

The parallel interface to data processing system 200 is utilized for efficient file refresh to the data processing system 200, such as the requirement to upgrade control logic and system files to hard drive 210 of the system. The PS/2 interface to data processing system 200 is utilized for a keyboard attachment so that a standard PS/2 keyboard can be used to drive the system.

Those skilled in the art will appreciate various modifications to the data processing system 200 without departing from the spirit and scope of the invention.

Tree Menu Mode Data

Figure 3:
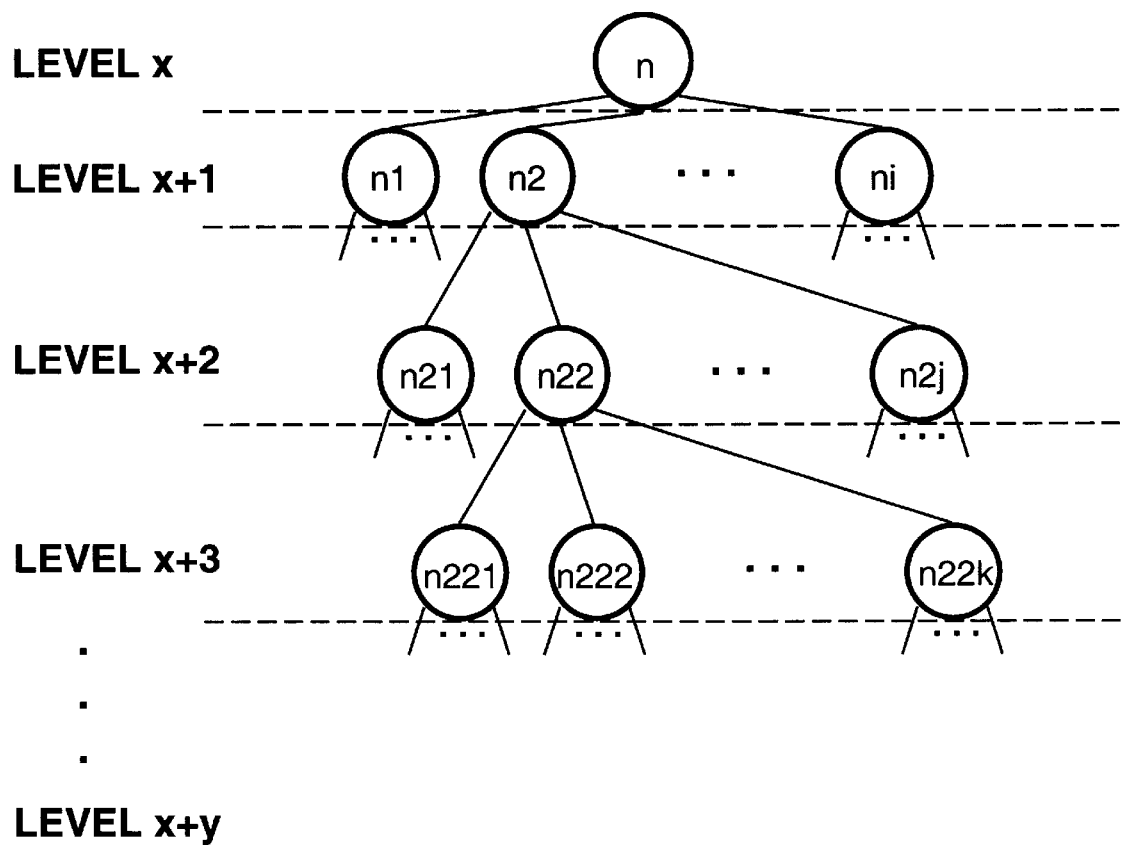
FIG. 3 illustrates a branch subset of a tree structure.

FIG. 3 illustrates a branch subset of a tree structure. Any particular node n of the tree is capable of any number of directly descending nodes n1 through ni. Nodes n1 through ni are referred to as peer nodes. The line drawn connecting any nodes is referred to as a branch of the tree. Any particular node n1 through ni is in turn capable of any number of descending nodes. For example, n2 has directly descending nodes n21 through n2j (peer nodes), as shown with respective branches. Any particular node n21 through n2j is in turn capable of any number of descending nodes. For example, n22 has directly descending nodes n221 through n22k. Node n2 is said to be one level below node n. Node n22 is said to be two levels below node n. Node n222 is said to be three levels below node n. Peer nodes are on the same level in a tree and have the same ascending node.

For convention, the number of digits appearing after the variable n is equivalent to the number of levels below node n. If the variable n indicates a node 345, then 34524184 is 5 levels below node 345.

Any node on the tree can also have any number of ascending nodes, although ascending nodes are singular in nature and correspond directly with the number of levels deep into the tree. Node n222 has three ascending nodes if node n is the root node. This corresponds with the level 3.

Figure 4A:
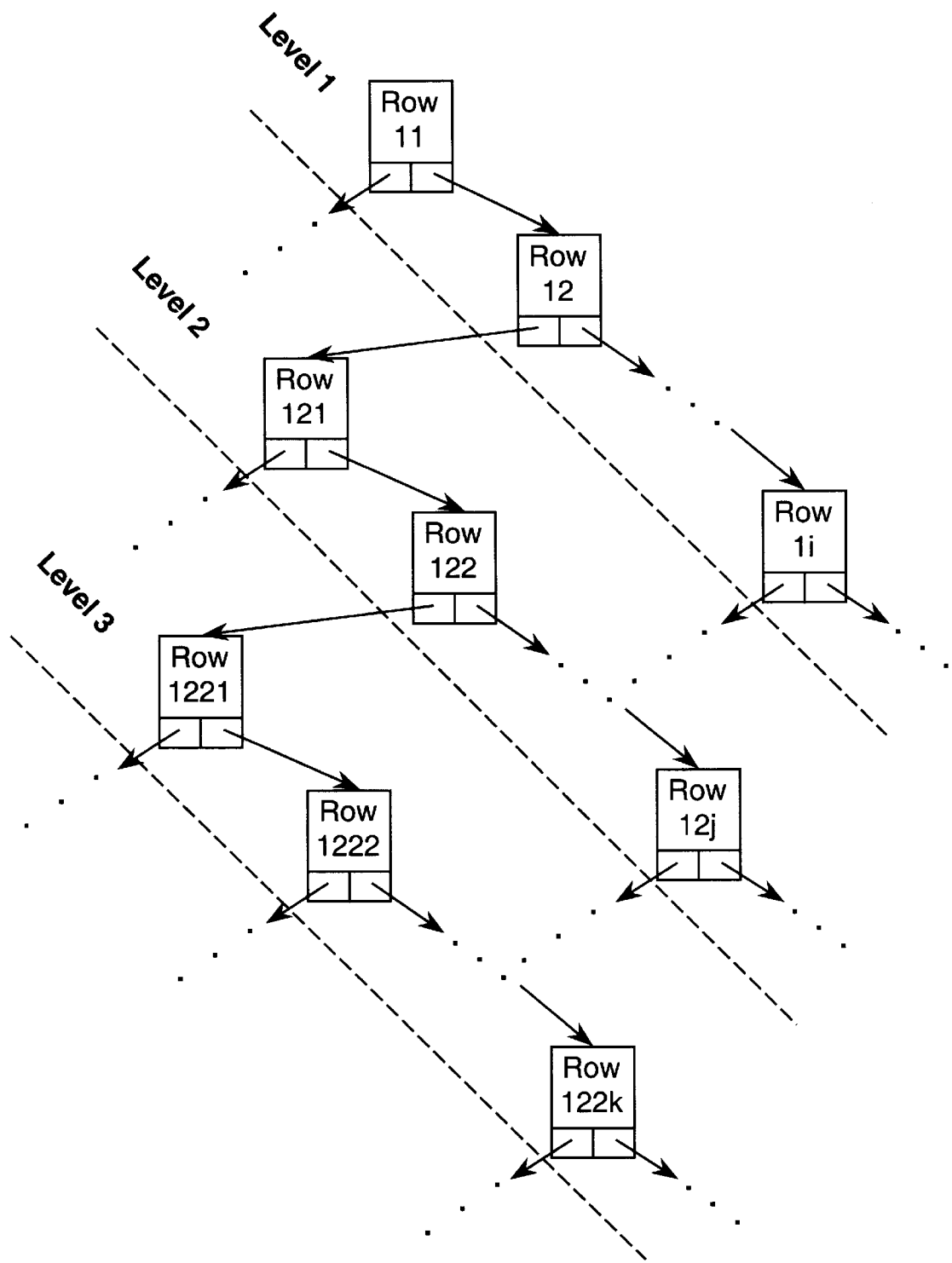
FIG. 4a illustrates a binary tree equivalent to the tree structure of FIG. 3 which is used to support tree menu mode processing of the present invention.

FIG. 4a illustrates a binary tree equivalent to the tree structure of FIG. 3 which is used to support tree menu mode processing of the present invention. Making node n of FIG. 3 the root node 1 yields FIG. 4a. The advantage of representing the tree structure as a binary tree is that only two pointers are required at any particular node in the tree to accomplish all branches. FIG. 4a can represent FIG. 3 without loss of information and is more easily processed by a data processing system. Representing an internalized tree structure in main memory 204 according to FIG. 3 for a data processing system may cause excessive re-allocations on any node n, or wasted storage for allocating a maximum node size, to satisfy the requirement of adding new descendants. Representing an internalized tree structure according to FIG. 4a for a data processing system conveniently allows one allocation in main memory 204 with two pointers for any particular node n. Some embodiments may add an additional pointer for providing a reverse link to either an ascending node, or a peer node.

FIG. 4a is the skeletal structure which references translation rules for tree menu mode processing of the present invention. A root pointer of a tree points to the node Row11. The first level of descending nodes from the root are nodes Row11 through Row 1i. Row 11 through Row1i are peer nodes. Any particular node of Row11 through Row1i is in turn capable of any number of descending nodes. For example, Row12 has directly descending nodes Row121 through Row12j (peer nodes), as shown with respective branches. Any particular node Row121 through Row12j is in turn capable of any number of descending nodes. For example, Row122 has directly descending nodes Row1221 through Row122k. Node Row12 is one level below the root node. Node Row122 is two levels below the root node. Node Row1222 is three levels below the root node.

Pointers, pointing to the left, point to the leftmost descending node (peer nodes on a tree are ordered). Pointers, pointing to the right, point to the next peer node.

A tree node record contains a translation member (actually a pointer to a translation member in the preferred embodiment) and is indicated in FIG. 4a using the "Row" prefix as a notation convention. The translation member (a row, for example) for a particular tree node is contained in tree menu mode translation rules (a table, for example).

Figure 4B:
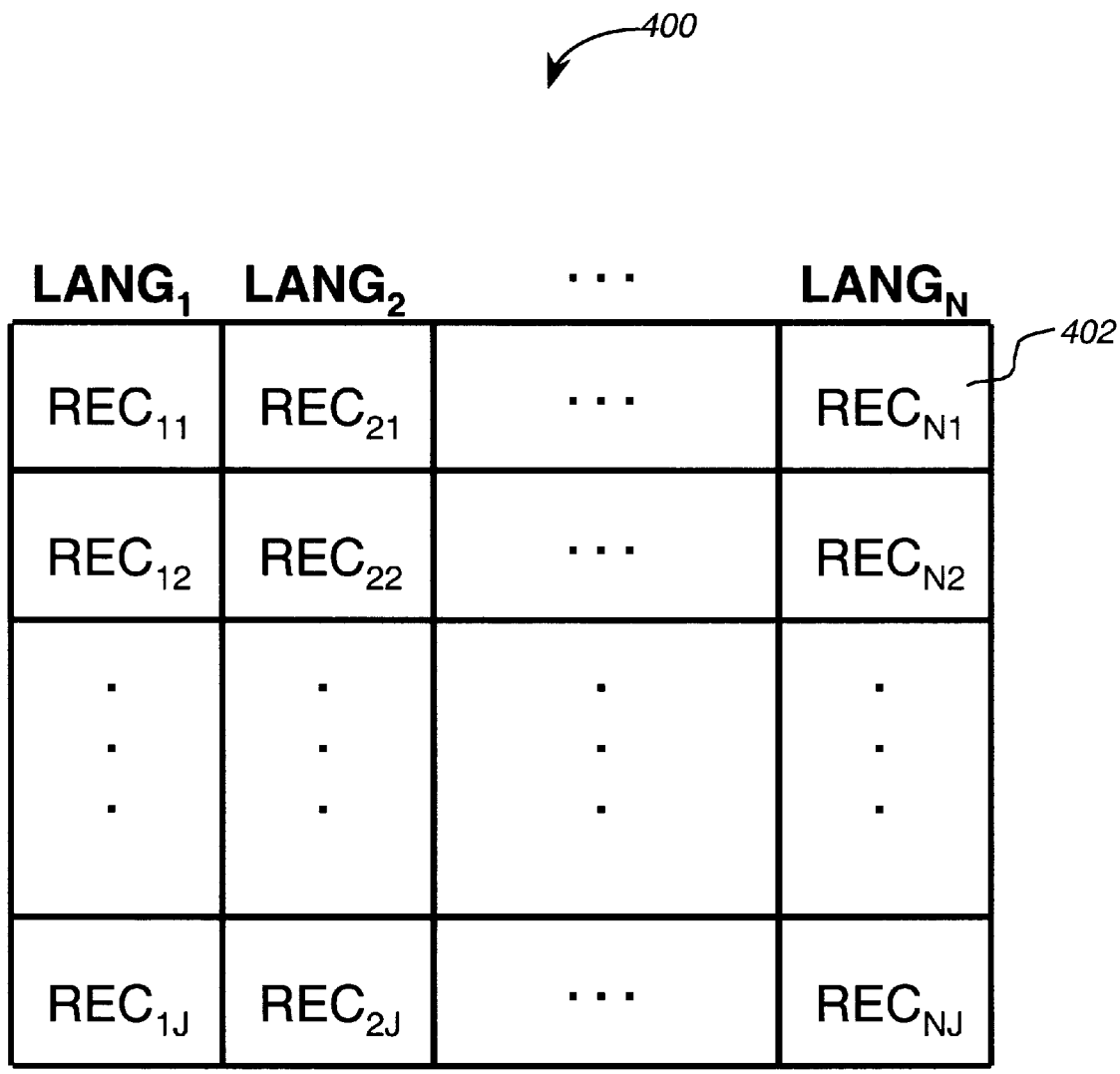
FIG. 4b illustrates a preferred embodiment of tree menu mode translation rules which are used to support tree menu mode processing of the present invention.

FIG. 4b illustrates a preferred embodiment of tree menu mode translation rules which are used to support tree menu mode processing of the present invention. Tree menu mode translation rules 400 contains translation members, such as translation member 402. Translation member 402 contains translation records. The translation records correspond to supported languages of the tree menu mode translation rules 400. The present invention can support any number (N) of languages, for example, English, French, Italian, German, Russian, Chinese, etc. Translation members of the tree nodes are referenced with a pointer such as a translation member reference value thereby pointing to the correct translation member in the tree menu mode translation rules 400. The translation member 402 with translation records $REC_{11}$ through $REC_{N1}$ is at reference value 1. The translation member with translation records $REC_{12}$ through $REC_{N2}$ is at reference value 2. The translation member with translation records $REC_{1J}$ through $REC_{NJ}$ is at reference value J. There is a translation member in the tree menu mode translation rules 400 for every node on the tree menu mode tree structure. Some tree nodes may point to the same translation member.

The language partition (a column, for example) of translation members, denoted by translation records $REC_{11}$ through $REC_{1J}$, is of one particular language, for example, English. The language partition denoted by translation records $REC_{21}$ through $REC_{2J}$ is of another particular language, for example, French. The language partition denoted by translation records $REC_{N1}$ through $REC_{NJ}$ is of another particular language, for example, Chinese. Thus, a single translation member has a translation record for each supported language.

Each translation record in the preferred embodiment of the translation rules 400 includes at least two fields; a text string and a recording. The text string is displayed to any single dycon of dycons 110 and the recording is played on the speaker 140. The text string is made of character codes from a character set (or plurality of character sets) which includes characters from supported languages. An alternative embodiment will rely on a phonetic text to speech process completely for annotating the text strings to the speaker 140. However, the well known drunken slur of a phonetic text to speech process makes providing a correctly pronounced recording optimal. Yet another embodiment may include additional customizable record information for special text display (e.g. font), audible rendering (e.g. voice), or even corresponding dycon behavior. A translation record may include graphical information, and can contain any information for displaying any kind of image to any of dycons 110.

The text string field of a translation record may contain a null terminated text string, or a pair of values, namely, a text string length and a pointer to the actual text string. The recording field is preferably a file name of a digitized file stored on a storage device, such as hard disk 210. There are various appropriate digitized formats, for example a wave file of various sample rates.

Each translation member in tree menu mode translation rules 400 represents, for example, a single dialogue in different languages. For example, the dialogue "I feel great!" would be represented by a single translation member with translation records in N different languages, each record containing the correct textual form and corresponding recorded form of the dialogue in that particular language. The preferred embodiment of recordings for a particular language are made by a single person for consistency.

Peer nodes in the present invention tree structure are displayed to dycons 110 at the same time and can be paged with page up control 132 and page down control 134, if the number of dycons 110 required for display is less than the number of peer nodes at the current level. A single translation member in tree menu mode translation rules 400 occupies a single dycon. The language (the translation record) displayed for the translation member depends on the current setting of the client video control 118 which is discussed below. Tree structure nodes Row11 through Row1i would appear to dycons 110 at the same time and node Row11 would display to dycon 110a, while for i=3, Row1i would display to dycon 110c. Upon user activation (i.e. selection) of hdycon 110b (press button), the appropriate action as dictated by the client audio control 120, host video control 122, and host audio control 124 would occur (discussed below). Then, the next menu (i.e. next level of peer nodes) in the tree would display to dycons 110, namely peer nodes Row121 through Row12j. In this way, a user is able to traverse the entire tree structure by activating (i.e. selecting) a single node on the tree (pressing one of dycons 110) in order to get to the next descendant nodes (next level) of selections. A context back control 136 is provided for returning to the ascending menu (i.e. return to ascending node among its peer nodes). The context forward control 138 is provided to continue by way of the most recent path (branch) to a descending node for the current menu (level) displayed to dycons 110.

For further optimization, some tree nodes may be pointed to by a plurality of other tree nodes, for example to have a common menu list at different points in the tree structure.

The tree structure heretofore described is an internalized form efficiently accessed in memory. It is a straightforward derivation for efficiently representing the tree structure in a file on a storage device, such as hard disk 210, in order to initialize memory from the file for the tree structure.

Static Response Mode Data

Figure 5:
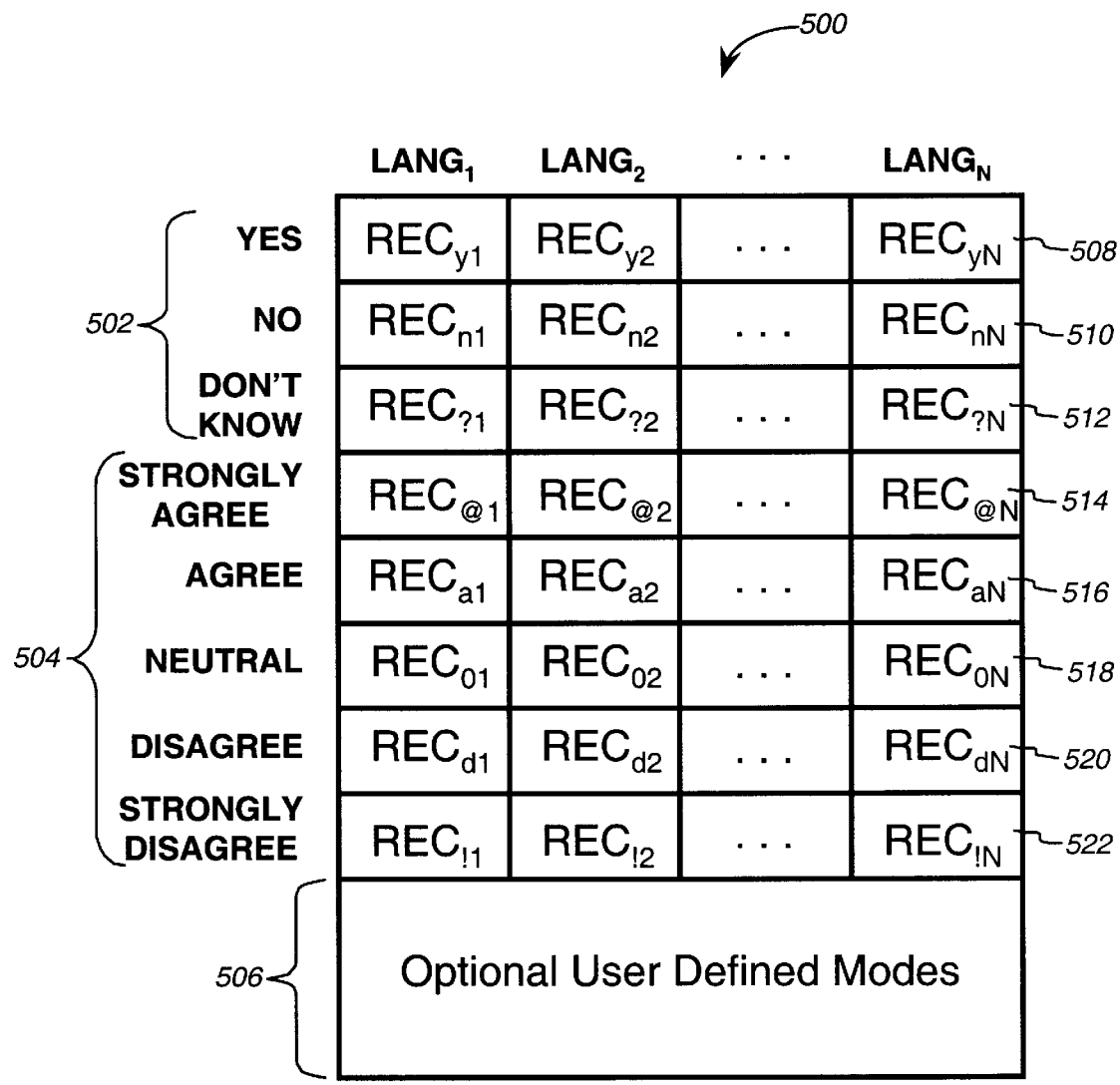
FIG. 5 illustrates a preferred embodiment of static response mode translation rules which are used to support static response mode processing of the present invention.

FIG. 5 illustrates a preferred embodiment of static response mode translation rules which are used to support static response mode processing of the present invention. Static response mode translation rules 500 contains translation members, such as translation member 508. Each translation member contains translation records. The translation records correspond to language partitions of static response mode translation rules 500, in a similar manner as discussed above for the tree menu mode translation rules 400. Static response mode translation rules 500 and tree menu mode translation rules 400 may in fact share a single repository of rules. Syntax and semantics are identical.

Each translation record in the preferred embodiment of the static response mode translation rules 500 is defined the same as translation records discussed above for the tree menu mode translation rules 400. The text string of a translation record is displayed to any single dycon of dycons 110 and the recording is played on speaker 140.

Each translation member in static response mode translation rules 500 represents, for example, a single dialogue in different languages. For example, the dialogue "Yes" would be represented by a single translation member with translation records in N different languages, each translation record containing the correct textual form and corresponding recorded form of the dialogue in that particular language.

The static response mode translation rules 500 is stocked with an affirmation mode which consists of affirmation translation members 502, namely, YES member 508, NO member 510, and DON'T KNOW member 512. A client presses the appropriate dycon while in affirmation mode to communicate either yes, no, or I don't know. It is important that the affirmation translation member (i.e. translation record of the translation member according to client video control 118) be displayed on the dycon which contains the equivalent physical form for touch. For example, YES member 508 should be displayed to dycon 110b which contains an embossed yes symbol 144, NO member 510 should be displayed to dycon 110c which contains an embossed no symbol 146, and DON'T KNOW member 512 should be displayed to dycon 110d which contains an embossed don't know symbol 148.

The static response mode translation rules 500 is also stocked with a weighted affirmation mode which consists of weighted affirmation translation members 504, namely STRONGLY AGREE member 514, AGREE member 516, NEUTRAL member 518, DISAGREE member 520, and STRONGLY DISAGREE member 522. A client presses the appropriate dycon while in weighted affirmation mode to communicate. If complementary Braille or embossed symbols are used on dycons, the correct weighted affirmation member should be displayed correspondingly.

The static response mode translation rules 500 also allows a user to define personalized static response modes as indicated by optional user defined modes translation members section 506. A user can define any number of translation members for a new mode and any number of modes. Page up control 132 and page down control 134 allows paging through all selections for a particular mode. Activating (pressing) a dycon 110 causes the appropriate action as dictated by the client audio control 120, host video control 122, and host audio control 124 (discussed below). Because a user may be capable of only defining a subset of languages for a translation member according to all supported languages, null records in static response mode translation rules 500 are valid.

Dictionary Mode Data

Figure 6:
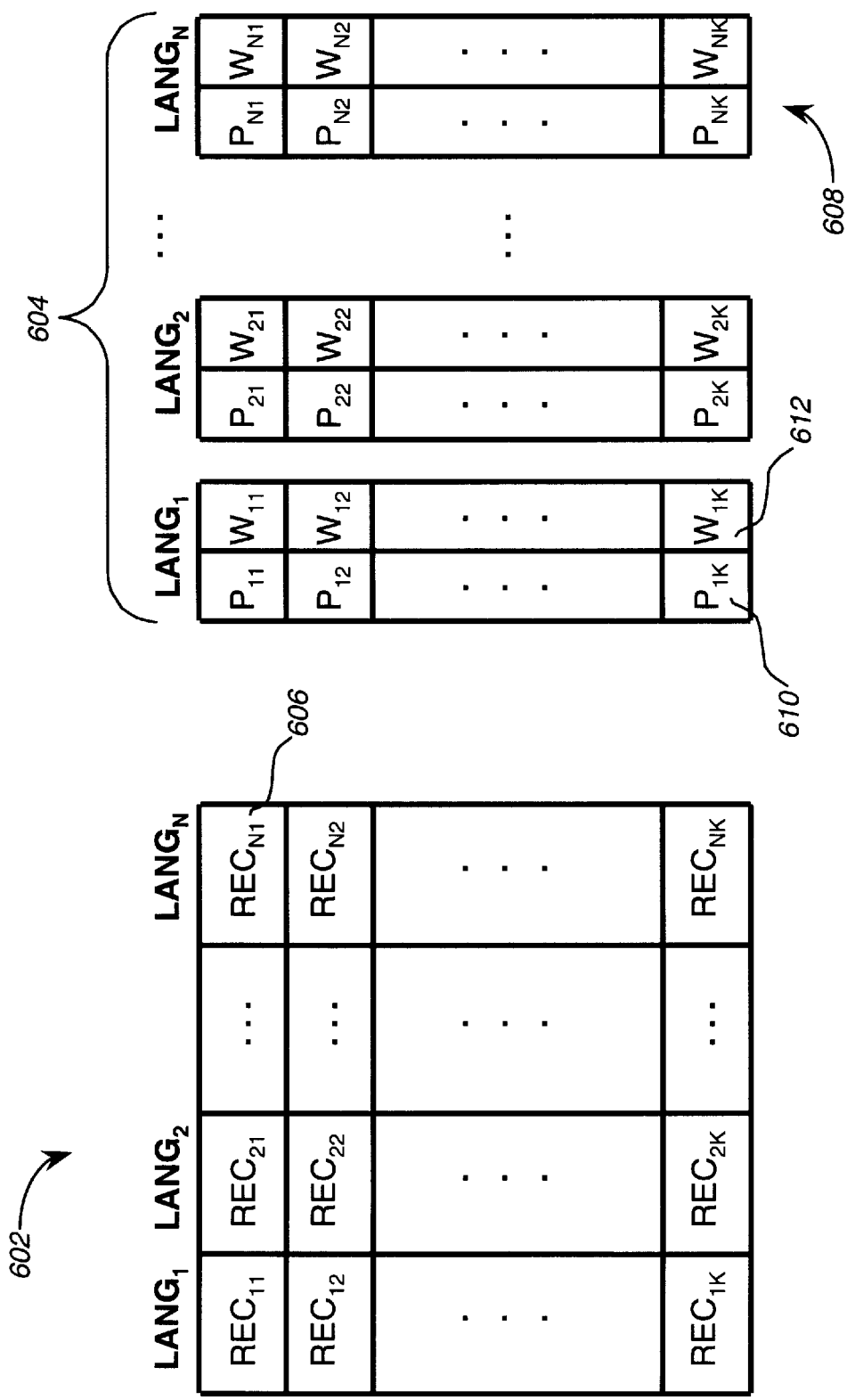
FIG. 6 illustrates a preferred embodiment of dictionary mode translation data which is used to support dictionary mode processing of the present invention.

FIG. 6 illustrates a preferred embodiment of dictionary mode translation data which is used to support dictionary mode processing of the present invention. Dictionary mode translation rules 602 contains translation members, such as translation member 606. Translation members contain translation records. The translation records correspond to language partitions already discussed. Dictionary mode translation rules 602, static response mode translation rules 500, and tree menu mode translation rules 400 may in fact share a single set of rules. Syntax and semantics are identical.

Each translation record in the preferred embodiment of the static response mode translation rules 500 is defined the same as translation records discussed above for the tree menu mode translation rules 400 and static response mode translation rules 500. The text string of a translation record is displayed to any single dycon of dycons 110 and the recording is played on speaker 140. The dictionary mode translation rules 602 typically contains single words, instead of dialogues, in translation records therein.

A dictionary mode sort schema 604 includes a language sort reference 608 for each language supported by the present invention. A particular language sort reference 608 contains a list of sort records, the number of which is equivalent to the number of translation members in the dictionary mode translation rules 602. A sort record in a sort reference 608 contains a translation member pointer 610 into the dictionary mode translation rules 602 and a weight value 612 indicating frequency of use in the particular language. Each sort reference 608 enables retrieving translation members from the dictionary mode translation rules 602 in a sorted order according to the spelling for the particular language. Translation members in dictionary mode translation rules 602 cannot be in sorted order for all languages at the same time. A sort reference 608 solves that problem. The following is a pseudo-coded bubble sort utilizing the sort reference 608 method for sorting.

K=number of translation members in dictionary mode translation rules;

P[i]=a particular translation member pointer 610 in a sort reference 608;

REC[j]=a particular translation record in a translation member j.

```
FOR y = 1 TO K-1 DO
    MADE_CHANGE = FALSE
    FOR z = 1 TO K-y
        IF REC[P[z]] > REC[P[z+1]] THEN   // ptrs are swapped
```

```
            TEMP = P[z]
            P[z] = P[z+1]
            P[z+1] = TEMP
            MADE_CHANGE = TRUE
        ENDIF
    ENDFOR
    IF MADE_CHANGE = FALSE THEN
        STOP
    ENDIF
ENDFOR
```

While words in the dictionary mode translation rules 602 are not necessarily in sorted order for a language, translation member pointers allow a sorted order for each language. The bubble sort is useful for a small number of translation members in dictionary mode translation rules 602. There are many other sort methods which utilize translation member pointers in a similar manner.

Anticipated Saying Data

Figure 7:
FIG. 7 illustrates a preferred embodiment of anticipated saying translation rules which are used to support dictionary mode processing of the present invention.

FIG. 7 illustrates a preferred embodiment of anticipated saying translation rules which are used to support dictionary mode processing of the present invention. Anticipated saying translation rules 700 contains translation members, such as translation member 702. Translation members contain translation records. The translation records correspond to language partitions already discussed. Anticipated saying translation rules 700, dictionary mode translation rules 602, static response mode translation rules 500, and tree menu mode translation rules 400 may in fact share a single set of rules. Syntax and semantics are identical.

Each translation record in the preferred embodiment of the anticipated saying translation rules 700 is defined the same as translation records discussed above for the other translation rules. The text string of a translation record is displayed to any single dycon of dycons 110 and the recording is played on speaker 140. The Anticipated Saying (AS) translation rules 700 typically contains multiple word dialogues in translation records therein.

The dictionary mode translation rules 602 should have all words which are used in any particular translation member of the AS translation rules. This provides optimal keyword functionality for performing AS searches from FIG. 16 (and FIG. 17) processing which is discussed below.

Preferred Data Processing Aspects of Invention

Figure 8:
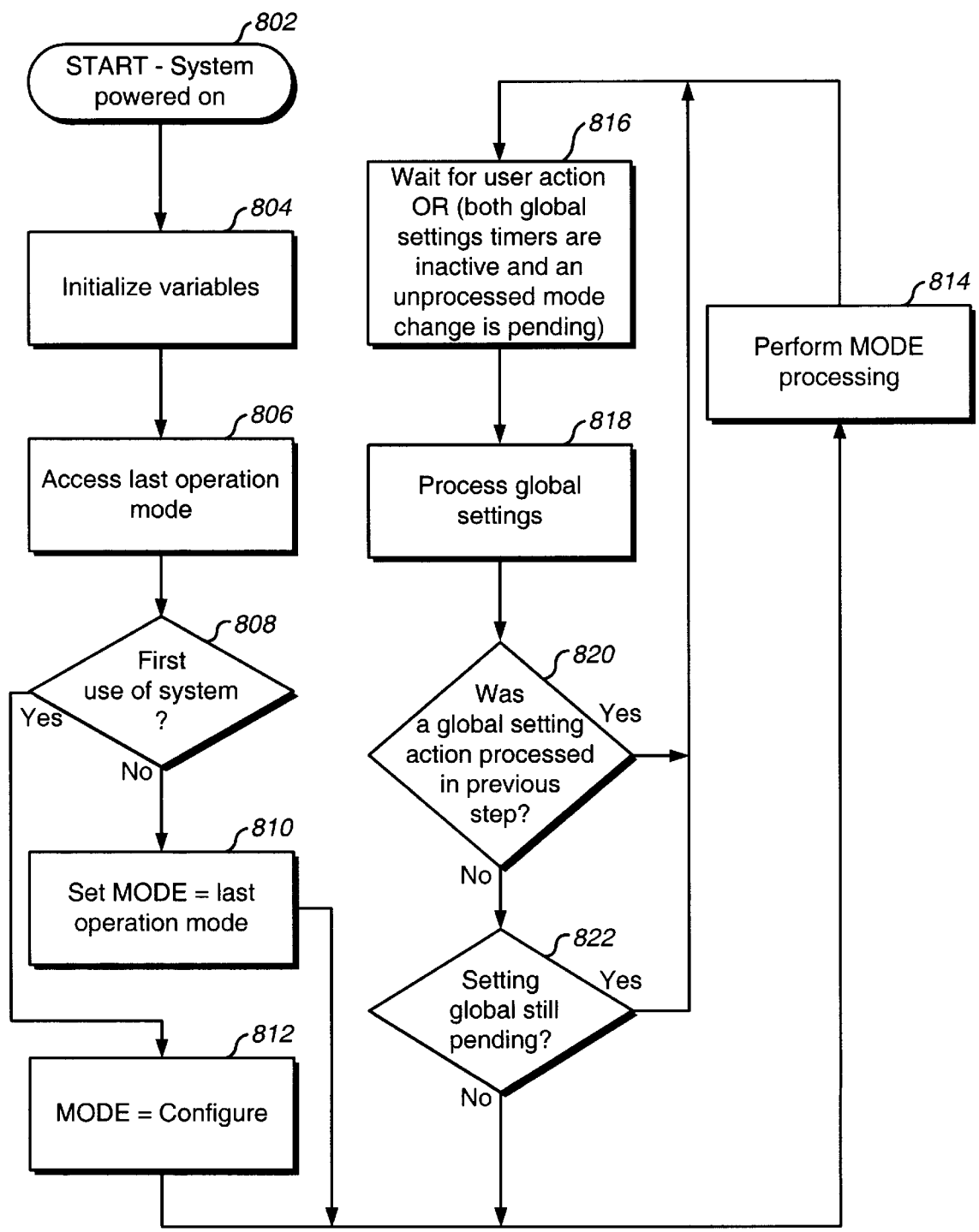
FIG. 8 depicts a flowchart for describing a preferred embodiment of data processing of the present invention.

FIG. 8 depicts a flowchart for describing a preferred embodiment of data processing of the present invention. The process starts at step 802 and continues to step 804 where system variables are initialized. For example, system variables such as the internalized tree structure for tree menu mode, interfaces to bus 206, sort references, and defaults for controls 116, 118, 120, 122, 124, and 126 (as most recently set), are initialized.

Thereafter, step 808 determines if this is the first use of the system since arriving to the customer. If at step 808, the system has been used before, then a MODE variable is set to the most recently set MODE value at step 810. Otherwise, step 808 proceeds to step 812 where MODE is initialized to Configure mode. Step 810, and 812, proceeds to step 814 where mode processing is performed according to the current MODE variable setting, and then to step 816 for monitoring of any user action to controls 116, 118, 120, 122, 124, 126, 128, 130, 132, 134, 136, 138, or any of dycons 110.

Step 816 also monitors for any mode change which may have occurred at step 818 (see FIG. 9 described below), so that step 816 continues to step 814 (by way of steps 818, 820, and 822) when a new mode has been selected. Thus, step 816 continues to step 818 for one case of asynchronous action, as well as for every user action.

Upon detection of action, step 818 processes global settings and step 820 checks if any global settings were actually processed at step 818. If a global setting was processed, step 820 returns to step 816. If a global setting was not processed, then step 820 proceeds to step 822. If at step 822, there is a global setting still pending, then processing continues back to step 816. If there is not a global setting still pending, then processing continues to step 814 where MODE processing can be performed. Step 814 returns to step 816 which was already described. The system does not allow any action other than setting global settings while global setting modification is still pending per timers set in FIG. 9 discussed below.

Terminating the system is accomplished by powering the present invention off at any time.

Figure 9A:
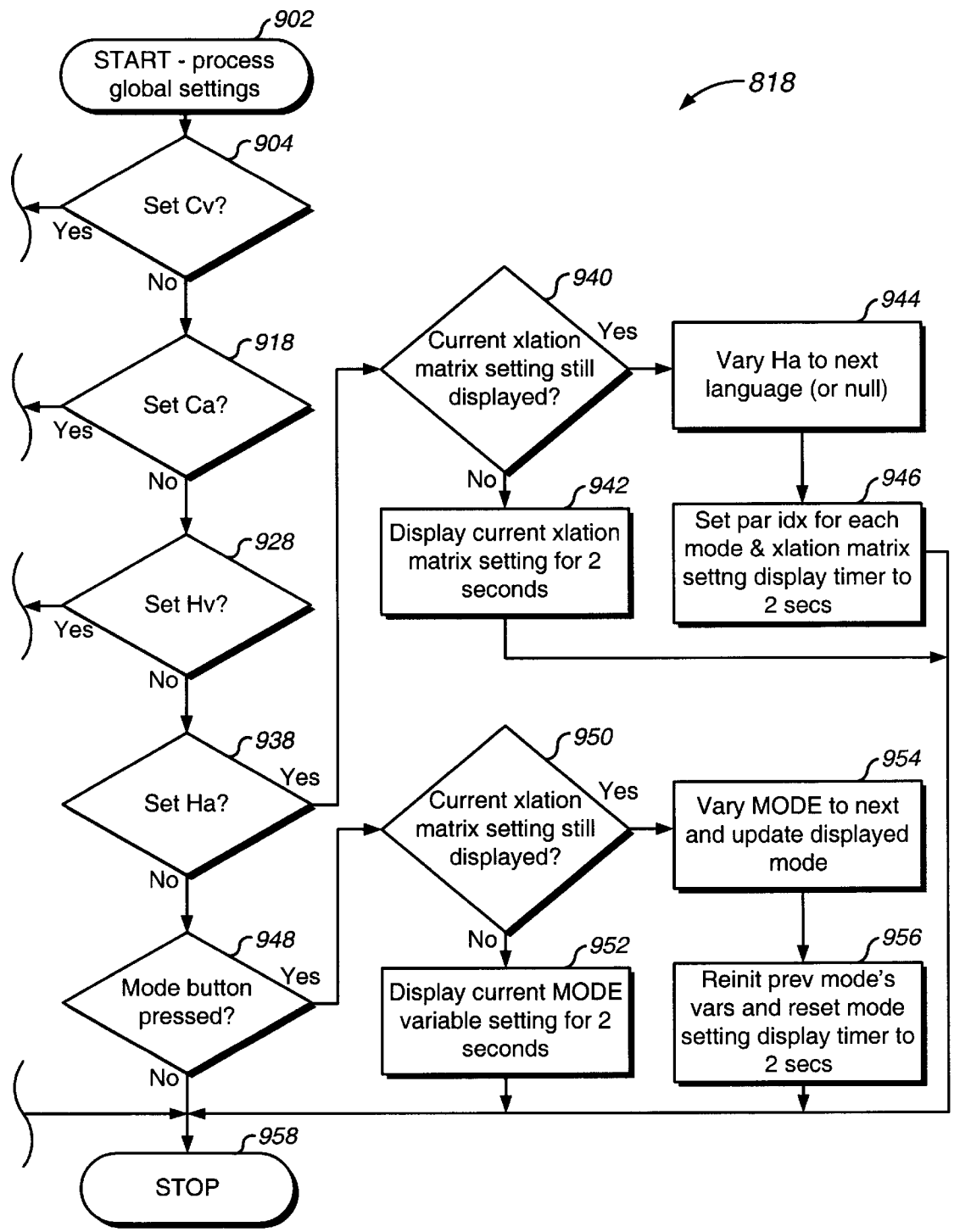
FIG. 9 depicts a flowchart for describing a preferred embodiment of the process global settings aspect of the present invention.
Figure 9B:
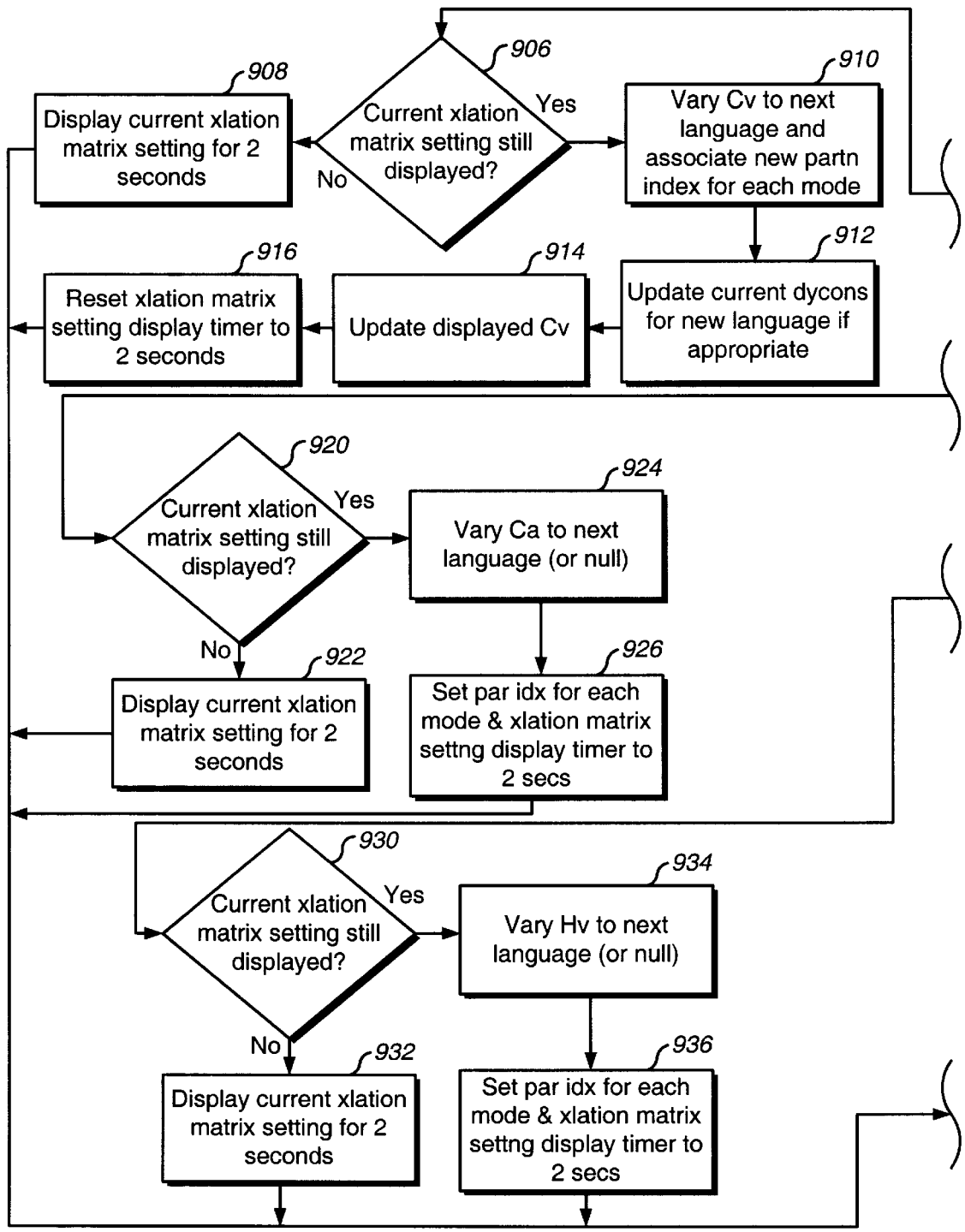

FIG. 9 depicts a flowchart for describing a preferred embodiment of the process global settings aspect of the present invention. Global settings include settings controlled by host controls 116, 118, 120, 122, and 124. With regard to the client video control 118, client audio control 120, host video control 122, and host audio control 124, the following translation matrix shows all possible combinations of settings, denoting controls as $C_V$, $C_A$, $H_V$, and $H_A$, respectively.

| | | Translation Matrix | | |
|---|---|---|---|---|
| $C_V$ | $C_A$ | $H_V$ | $H_A$ | DESCRIPTION |
| ✓ | | | | $C_V$ dycon pressed, next menu list |
| ✓ | | | ✓ | $C_V$ dycon pressed, $H_A$ played, next menu list |
| ✓ | | ✓ | | $C_V$ dycon pressed, $H_V$ displayed, dycon highlights, pressed again, next menu list |
| ✓ | | ✓ | ✓ | $C_V$ dycon pressed, $H_V$ displayed, $H_A$ played, dycon highlights, pressed again, next menu list |
| ✓ | ✓ | | | $C_V$ dycon pressed, $C_A$ played, next menu list |
| ✓ | ✓ | | ✓ | $C_V$ dycon pressed, $C_A$ played, $H_A$ played, next menu list |
| ✓ | ✓ | ✓ | | $C_V$ dycon pressed, $C_A$ played, $H_V$ displayed, dycon highlights, pressed again, next menu list |
| ✓ | ✓ | ✓ | ✓ | $C_V$ dycon pressed, $C_A$ played, $H_V$ displayed, $H_A$ played, dycon highlights, pressed again, next menu list |

$C_V$ (client video control 118) toggles through all supported languages and is always set to one of the languages. $C_A$ (client audio control 120) toggles through all supported languages, as well as a null setting, and is set to null or one of the languages. $H_V$ (host video control 122) toggles through all supported languages, as well as a null setting, and is set to null or one of the languages. $H_A$ (host audio control 124) toggles through all supported languages, as well as a null setting, and is set to null or one of the languages. A check mark in the translation matrix indicates the control is currently set to a particular language. A blank entry indicates a null setting.

The description shows what will happen when a dycon 110 is activated in any mode (dycon activation is included in the description). For cases wherein $H_V$ is set to a language, the pressed dycon is highlighted upon display of the $H_V$ translation record so the user knows to press the dycon to return it to its original $C_V$ state. Tree menu mode, on the other hand, continues to the next context. The term "next menu list" only applies to tree menu mode processing because that is the only mode where dycons are refreshed with a new context after translation processing as dictated by the translation matrix. Note that a single dycon activation may involve up to four different languages in the same translation member of translation rules heretofore described, according to controls 118, 120, 122, and 124. Consider an example of a $C_V$ setting of English, $C_A$ setting of French, $H_V$ setting of Spanish, and $H_A$ setting of Russian, while the system is in affirmation mode. The last row of the translation matrix would apply. "Yes", "No", and "Don't know" would be displayed to dycons 110b, 110c, and 110d, respectively, in English (as dictated by current client video setting of English). If dycon 110b is activated, the recording for "oui" (yes in French) is played on speaker 140 (as dictated by current client audio setting of French), then the text string "si" (yes in Spanish) is displayed (as dictated by current host video control setting of Spanish), then the Russian yes recording is played (as dictated by current host audio control setting of Russian), and finally the user knows to press again to return to normal English context upon being presented with a highlight (except tree menu mode which traverses to next level). While this is an unusual example, it shows that controls 118, 120, 122, and 124 are completely independent. Typically, there is a single client language and a single host language (two languages involved). A null setting simply tells the system to skip processing for that control (no translation record access).

The controls 118, 120, 122, and 124 dynamically tell the system which translation record to access in a translation member of the tree menu mode translation rules 400, static response mode translation rules 500, dictionary mode translation rules 602, or anticipated saying translation rules 700, depending on the mode. Thus, if English is currently displayed to dycons 110, toggling client video control to French will dynamically and instantly refresh all dycons 110 with the French records, before ever activating a dycon.

The gray rows in the table indicate valid settings when the present invention is placed into blind mode (in Configure mode processing discussed below). In blind mode, an acknowledgment action is required after the client audio translation record is played (client audio is required for language setting in blind mode). This allows a blind person to activate dycons 110 by hearing (blind person can also feel for static response mode embodiments) before finally acknowledging a specific dycon for performing a translation to a host. Toggling controls 118, 120, 122, and 124, will force the gray rows as the only valid candidates while in blind mode. All rows of the translation matrix are valid settings whenever not in blind mode.

FIG. 9 describes step 818 processing. Step 818 processing begins at step 902 and continues to step 904. If at step 904, the client video control 118 was activated (button pressed), step 906 checks to see if setting any of client video, client audio, host video, or host audio is still pending. If at step 906, the current translation matrix settings (they are global settings) are not still pending, then step 908 displays the current translation matrix setting (a row as described above in the translation matrix), for example to dycon 110a, for a duration of two seconds. Any text replaced on dycon 110a is returned to its state prior to being replaced once the two second timer elapses. It is during this two second duration that a control 118, 120, 122, or 124 can again be activated to toggle to a new setting. The user presses the buttons quickly to round-robin through all available settings. Step 908 then continues to step 958 where processing terminates.

If at step 906, the current translation matrix row is still displayed (as a result of a previous execution of any of steps 908, 916, 922, 926, 932, 936, 942, or 946), then step 910 will vary the client video setting to the next language in a round-robin manner and associate a new $C_V$ partition index into each mode rules (may be a single shared set of rules) and appropriate sort reference, according to the language selected. Thereafter, step 912 updates dycons 110 according to the new language if applicable text is displayed thereon. Thus, the client video control may be used to instantly toggle through all languages of a translation member displayed on dycons 110. All dycons except the temporary global settings displays will be affected (until timer elapses). When a global setting timer elapses, the applicable dycon is returned to its correct display. Step 912 then continues to step 914 where the translation matrix row for client video control is updated for display to the user, and then step 916 resets the two second timer, thereby making global settings pending for another subsequent execution of step 910 within the two second time interval. Processing then terminates at step 958. Note that step 908 allows an initial query (an initial query is made at steps 908, 922, 932, or 942), and steps 910, 912, 914, and 916 allow changing the client video setting after an initial query has already been made. The translation matrix settings display is preferably in a textual form $C_V,C_A,H_V,H_A$, for example, "Eng,null,null,Spa" which denotes client video=English, client audio=null, host video=null, and host audio=Spanish.

If at step 904, the client video control 118 was not activated, then processing continues to step 918. If at step 918, the client audio control 120 was activated (button pressed), step 920 checks to see if setting any of client video, client audio, host video, or host audio is still pending. If at step 920, the current translation matrix settings are not still pending, then step 922 displays the current translation matrix setting in an identical manner and description to step 908 described above. Step 932 then continues to step 958 where processing terminates.

If at step 920, the current translation matrix row is still displayed, then step 924 will vary the client audio setting to the next language (or null) in a round-robin manner and step 926 will associate a new $C_A$ partition index into each mode rules (may be a single set of rules) and appropriate sort reference, according to the language selected. Step 926 also resets the translation matrix setting display timer so that setting global settings is still pending for toggling. When a global setting timer elapses, the applicable dycon is returned to its correct display. Step 926 then continues to step 958 where processing terminates.

If at step 918, the client audio control 120 was not activated, then processing continues to step 928. If at step 928, the host video control 122 was activated (button pressed), step 930 checks to see if setting any of client video, client audio, host video, or host audio is still pending. If at step 930, the current translation matrix settings are not still pending, then step 932 displays the current translation matrix setting in an identical manner and description to step 908 described above. Step 922 then continues to step 958 where processing terminates.

If at step 930, the current translation matrix row is still displayed, then step 934 will vary the host video setting to the next language (or null) in a round-robin manner and step 936 will associate a new $H_V$ partition index into each mode rules (may be a single set of rules) and appropriate sort reference, according to the language selected. Step 936 also resets the translation matrix setting display timer so that setting global settings is still pending for toggling. When a global setting timer elapses, the applicable dycon is returned to its correct display. Step 936 then continues to step 958 where processing terminates.

If at step 928, the host video control 122 was not activated, then processing continues to step 938. If at step 938, the host audio control 124 was activated (button pressed), step 940 checks to see if setting any of client video, client audio, host video, or host audio is still pending. If at step 940, the current translation matrix settings are not still pending, then step 942 displays the current translation matrix setting in an identical manner and description to step 908 described above. Step 942 then continues to step 958 where processing terminates.

If at step 940, the current translation matrix row is still displayed, then step 944 will vary the host audio setting to the next language (or null) in a round-robin manner and step 946 will associate a new $H_A$ partition index into each mode rules (may be a single set of rules) and appropriate sort reference, according to the language selected. Step 946 also resets the translation matrix setting display timer so that setting global settings is still pending for toggling. When a global setting timer elapses, the applicable dycon is returned to its correct display. Step 946 then continues to step 958 where processing terminates.

Controls 118, 120, 122, and 124 are separated from the configure mode interface (discussed in FIG. 11 below) because these independent controls should be manageable without exiting from a current context on dycons 110.

If at step 938, the host audio control 124 was not activated, then processing continues to step 948. If at step 948, the mode control 116 was activated (button pressed), step 950 checks to see if setting of the mode is still pending. If at step 950, the mode (also one of global settings) is not still pending, then step 952 displays the current MODE variable value, for example to dycon 110*b,* for a duration of two seconds. Any text replaced on dycon 110*b* is returned to its state prior to being replaced once the two second timer elapses. It is during this two second duration that mode control 116 can again be activated to toggle to a new mode setting. The user presses the button quickly to round-robin through all available mode settings. Step 952 then continues to step 958 where processing terminates.

If at step 950, the current mode setting is still displayed (as a result of a previous execution of step 952, then step 954 will vary the MODE variable in a round-robin manner and update display of the mode setting. Step 954 then continues to step 956 where the previous mode's variables are reset for a future restart and the two second timer is reset, thereby making global settings pending. Processing then terminates at step 958. Note that step 952 allows an initial query and steps 954 and 956 allow changing the mode after an initial query has already been made. The mode setting display is preferably in a textual form, for example, "TREE" which denotes tree menu mode. The mode (MODE variable) can be set to any of the following:

CONFIG=Configure mode;
ADMIN=Administration mode;
TREE=Tree Menu mode;
Y/N=Affirmation static response mode;
W;Y/N=Weighted affirmation static response mode;
DICTIONARY=Dictionary mode;
W;DICTIONARY=Weighted Dictionary mode;
"user defined name"=User Defined static response mode; and
ALPHA=Alphanumeric mode;

The user can perform no actions except global settings processing of FIG. 9 during an active translation matrix setting timer or mode setting timer. The translation matrix row will be displayed while the translation matrix setting timer is active. The mode setting will be displayed while the mode setting timer is active. Global settings values are toggled as long as the settings are displayed. An alternate embodiment may use a different timer duration or different method for managing global settings.

The mode control 116 is separated from the configure mode interface (discussed in FIG. 11 below) because a user should be able to change to another mode instantly without excessive navigation.

Figure 10:
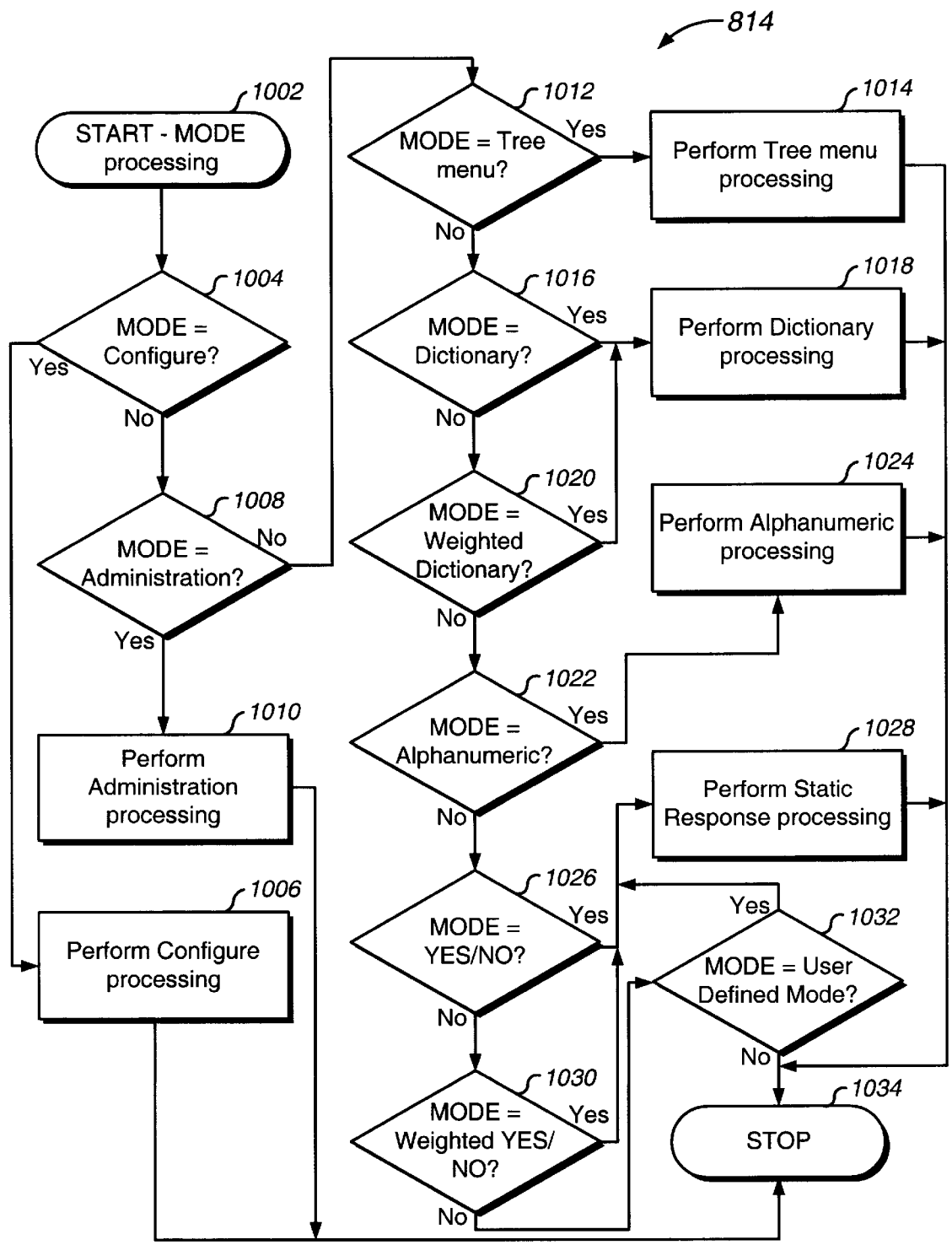
FIG. 10 depicts a flowchart for describing a preferred embodiment of the mode processing aspect of the present invention.

FIG. 10 depicts a flowchart for describing a preferred embodiment of the mode processing aspect of the present invention. FIG. 10 describes step 814. Step 814 begins at step 1002 and continues to step 1004. If at step 1004, the MODE variable is determined to be set to Configure mode, then step 1006 performs configure processing and continues to step 1034 where processing terminates.

If at step 1004, the MODE variable is determined to not be set to Configure mode, then step 1004 continues to step 1008. If at step 1008, the MODE variable is determined to be set to Administration mode, then step 1010 performs administration processing and continues to step 1034 where processing terminates.

If at step 1008, the MODE variable is determined to not be set to Administration mode, then step 1008 continues to step 1012. If at step 1012, the MODE variable is determined to be set to Tree Menu mode, then step 1014 performs Tree menu mode processing and continues to step 1034 where processing terminates.

If at step 1012, the MODE variable is determined to not be set to Tree Menu mode, then step 1012 continues to step 1016. If at step 1016, the MODE variable is determined to be set to Dictionary mode, then step 1018 performs Dictionary mode processing and continues to step 1034 where processing terminates.

If at step 1016, the MODE variable is determined to not be set to Dictionary mode, then step 1016 continues to step 1020. If at step 1020, the MODE variable is determined to be set to Weighted Dictionary mode, then step 1018 performs Weighted Dictionary processing and continues to step 1034 where processing terminates.

If at step 1020, the MODE variable is determined to not be set to Weighted Dictionary mode, then step 1020 continues to step 1022. If at step 1022, the MODE variable is determined to be set to Alphanumeric mode, then step 1024 performs Alphanumeric processing and continues to step 1034 where processing terminates.

If at step 1022, the MODE variable is determined to not be set to Alphanumeric mode, then step 1022 continues to step 1026. If at step 1026, the MODE variable is determined to be set to Affirmation static response mode, then step 1028 performs Affirmation static response mode processing and continues to step 1034 where processing terminates.

If at step 1026, the MODE variable is determined to not be set to Affirmation static response mode, then step 1026 continues to step 1030. If at step 1030, the MODE variable is determined to be set to Weighted Affirmation static response mode, then step 1028 performs Affirmation static response mode processing and continues to step 1034 where processing terminates.

If at step 1030, the MODE variable is determined to not be set to Weighted Affirmation static response mode, then step 1030 continues to step 1032. If at step 1032, the MODE variable is determined to be set to a particular User Defined static response mode, then step 1028 performs static response mode processing and continues to step 1034 where processing terminates.

If at step 1032, the MODE variable is determined to not be set to a User Defined static response mode, then step 1032 continues to step 1034 where processing terminates.

Figure 11:
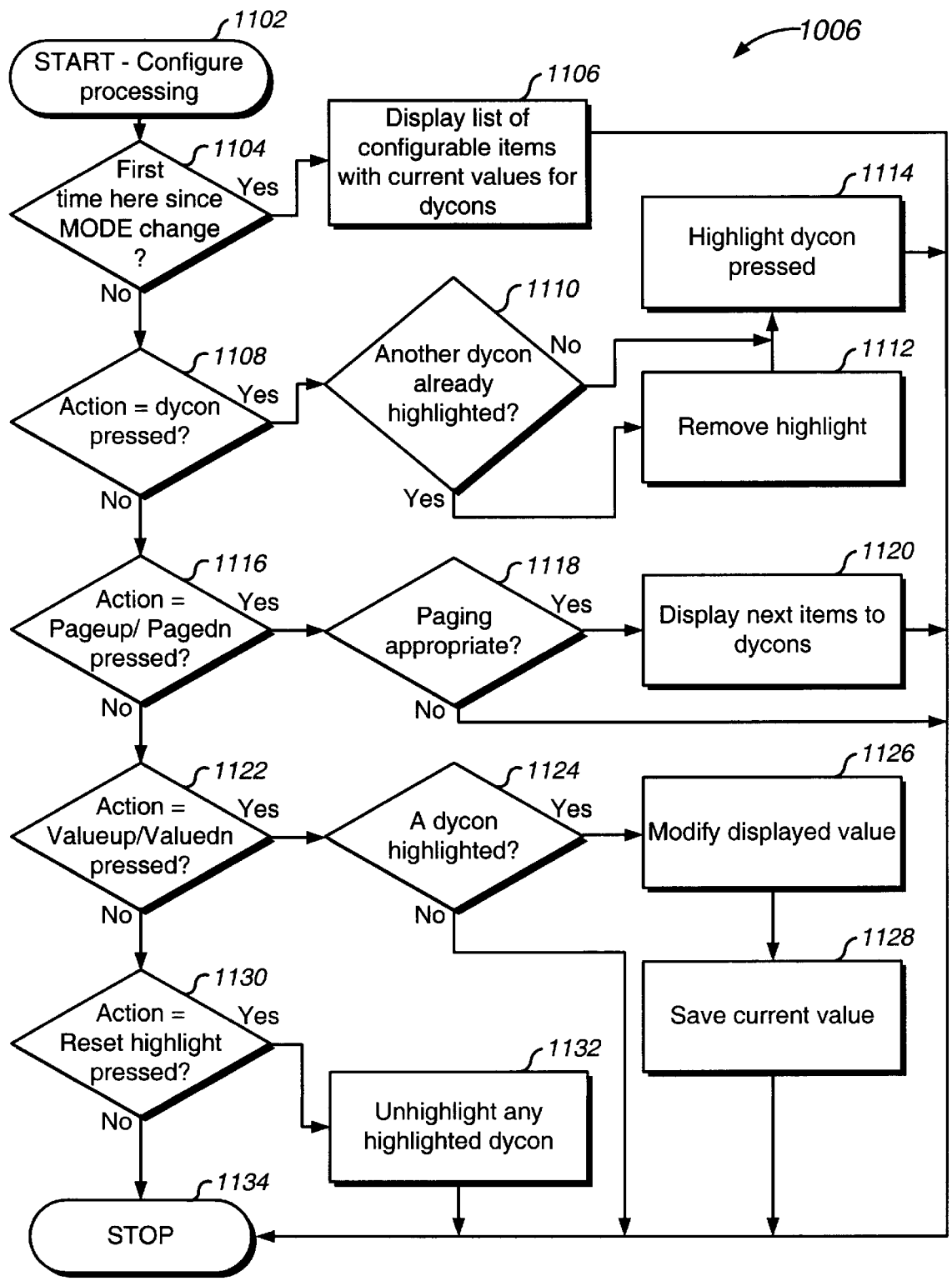
FIG. 11 depicts a flowchart for describing a preferred embodiment of the configure mode processing aspect of the present invention.

FIG. 11 depicts a flowchart for describing a preferred embodiment of the configure mode processing aspect of the present invention. FIG. 11 describes step 1006 processing which begins at step 1102 and continues to step 1104. If it is determined at step 1104 that this is the first execution of step 1104 since a MODE change, then step 1106 displays configurable items with current values to dycons 110, and step 1134 terminates processing.

Configurable items and associated values include, and are not limited to, the following:

| Configurable Item | Candidate Values |
|---|---|
| Object Separation Speed | O-N milliseconds (250) |
| = Pause time between separate CommItem() invocations such as for played back to back recordings. This is a subjective, yet consistent, value because there is processing time involved. | |
| Speaker Volume | 0–100% (50%) |
| = Volume of speaker. | |
| Microphone Volume | 0–100% (50%) |
| = Volume of microphone. | |
| Ack Highlight | Flash, Invert, Both, None |
| = How to perform dycon highlight for an acknowledgment of a particular dycon (e.g. when $H_V$ rendered to dycon and need ack to return to $C_V$). | |
| Edit Mode Highlight | Flash, Invert, Both, None |
| = How to perform dycon highlight when in edit mode. | |
| Criteria Dycon Highlight | Flash, Invert, Both, None |
| = How to perform dycon highlight for a criteria dycon when not in edit mode. | |
| Client Audio ($C_A$) | Phonetic, Recording |
| = Method to perform client audio output - use text string or recording. | |
| Host Audio ($H_A$) | Phonetic, Recording |
| = Method to perform host audio output - use text string or recording. | |
| Edit | Enabled, Disabled |
| = Enables or disables edit control 126. | |
| Blind Client | Enabled, Disabled |
| = Limits translation matrix to settings with a client audio language ($C_A$ is not null). | |
| Annotation Speed | 1–10 (5) |
| = Speed to perform phonetic pronunciation. | |
| Automatic Dictionary | Enabled, Disabled |
| = Perform automatic dictionary searches according to what is typed so far at the active cursor, and display to dycons for selection. | |
| Weight Threshold | 1-N (O) |
| = Limits dictionary search results which are displayed to dycons, to words of a specified frequency of use in a language - weighted dictionary mode. Higher value equals less results displayed. | |
| Code page | IBM code pages (850) |
| = The code page to map character codes from the keyboard connected to PS/2 port 114 for proper display. Code pages conform to the IBM standard international definitions. Keyboards, of languages supported by LIPS 100, are supported. The default ASCII code page 850 supports all Latin-1 languages. IBM documentation can be consulted for other multilingual code pages. (IBM is a registered trademark of International Business Machines Corp.) | |
| Last Dycon | Period, Asterisk |
| = The last record of a list to dycons 110 is always suffixed with this character to indicate to the user it is the last list record. This is particularly useful if editing has occurred, whereby there may be | |

| Configurable Item | Candidate Values |
|---|---|
| null translation records in translation members for certain languages. | |

Alternate embodiments may move any of these configurable items to control(s) supported by housing 102. The defaults of configurable items are shown in italics above. Values are displayed next to the configurable item on a dycon. The context back control 136 and context forward control 138 is used to change values. Values are modified in a round-robin manner.

If step 1104 determines it is not the first time here since a MODE change, then step 1108 and subsequent FIG. 11 steps process user actions received while in configure mode. If at step 1108, user action is a dycon activated, then step 1110 determines if there is another dycon already highlighted. Only a highlighted dycon with a configurable item can be modified. The edit mode highlight configuration value is used.

If step 1110 determines an other dycon is already highlighted, then step 1112 removes its highlight and step 1114 highlights the dycon activated which was determined by step 1108. Step 114 then continues to step 1134 where processing terminates. If at step 1110, an other dycon is not already highlighted, then step 1110 proceeds to step 1114 for highlighting, and then on to step 1134. Step 1114 ensures no other dycons except one of those with a displayed configurable item are highlighted.

If step 1108 determines a dycon was not activated, then processing continues to step 1116. If step 1116 determines that the page up control 132 or page down control 134 was activated, then step 1118 checks for validity of the paging. If at step 1118, paging is appropriate, then step 1120 performs the appropriate paging to next configurable items on dycons 110, and processing terminates at step 1134. Of course, paging maintains the highlighting with an entry if it were paged off dycons 110 and then paged back to dycons 110. Paging is currently valid in configure mode because there are more configurable items than number of dycons 110.

If step 1118 determines paging is not appropriate, then the action is ignored and processing terminates at step 1134.

If step 1116 determines paging was not requested, then step 1116 proceeds to step 1122. If step 1122 determines that context back control 136 or context forward control 138 was activated, then processing continues to step 1124. If step 1124 determines a dycon is highlighted then the corresponding value is affected appropriately on the dycon at step 1126, and the new value is saved to storage at step 1128, such as main memory 204, and hard disk drive 210. Thereafter processing terminates at step 1134.

If at step 1124 no dycon is highlighted, then user action is ignored and step 1124 continues to step 1134.

If step 1122 determines neither context controls were activated, then step 1122 continues to step 1130. If step 1130 determines the pause control 128 was activated, then step 1132 removes highlights from any highlighted dycons and processing terminates at step 1134.

If step 1130 determines the pause control 128 was not activated, then processing terminates at step 1134.

Configure mode may be protected with password support to prevent unauthorized configuration.

Figure 12:
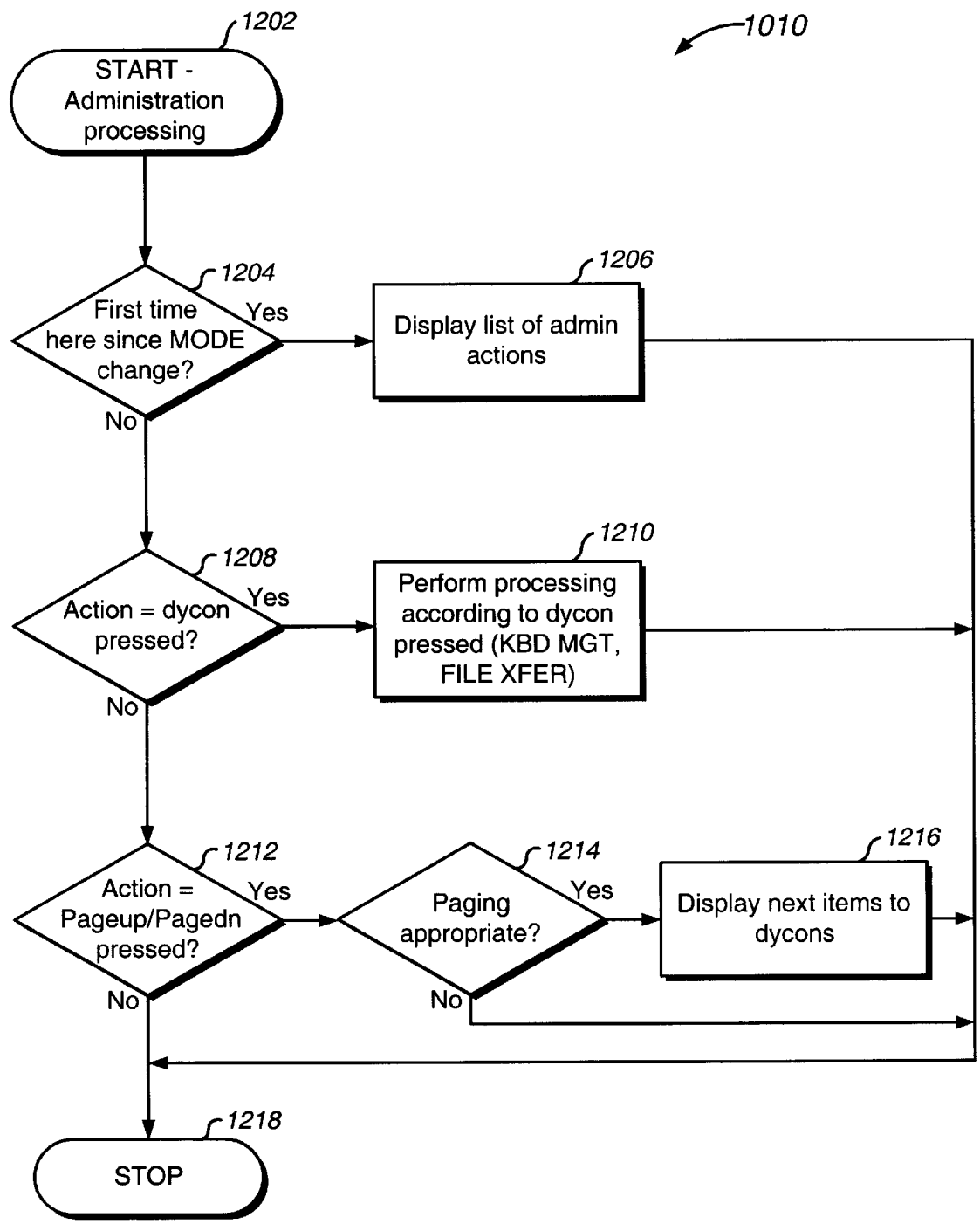
FIG. 12 depicts a flowchart for describing a preferred embodiment of the administration mode processing aspect of the present invention.

FIG. 12 depicts a flowchart for describing a preferred embodiment of the administration mode processing aspect of the present invention. FIG. 12 describes step 1010 processing which begins at step 1202 and continues to step 1204. If step 1204 determines that this is the first execution of step 1204 since a MODE change, then step 1206 displays administrative actions to dycons 110, and step 1218 then terminates processing.

If step 1204 determines it is not the first time here since a MODE change, then step 1208 and subsequent FIG. 12 steps process user actions received while in administration mode. If at step 1208, user action is a dycon activated, then step 1210 performs the appropriate action and processing terminates at step 1218.

There is currently two administrative functions in the LIPS 100 embodiment, KBD MGT and FILE XFER.

Activating the KBD MGT dycon allows a standard PS/2 keyboard plugged into PS/2 port 114 to perform operating system commands for maintaining data on the storage device, such as hard disk drive 210. Dycons 110 serve as a line oriented monitor for the keyboard user. In fact, the LIPS 100 embodiment of FIG. 1 contains six dycons 110 that provide twelve monitor lines (two lines each). Just as a monitor behaves while in full screen DOS (Disk Operating System) mode, so does the twelve line monitor provided by dycons 110. LIPS 100 is powered off to terminate keyboard management administration.

Activating the FILE XFER dycon allows a standard parallel cable plugged into parallel port 112 to transmit an entire refresh of files on the storage device, such as hard disk drive 210. Software modules, translation rule files, code page and character set files, and the like, can be refreshed using the well known FastLynx 2.0 utility, published by Rupp Corporation, and developed by Sewell Development Corporation. FastLynx is capable of transferring files from one personal computer to another over a parallel interface. Parallel transfers are faster than serial transfers, although an alternate embodiment could certainly use a similar product to a serial port on LIPS 100. LIPS 100 is powered off to terminate file transfer administration.

If step 1208 determines a dycon was not activated, then processing continues to step 1212. If step 1212 determines that the page up control 132 or page down control 134 was activated, then step 1214 checks for validity of the paging. If at step 1214, paging is appropriate, then step 1216 performs the appropriate paging to next administrative items on dycons 110, and processing terminates at step 1218.

If step 1214 determines paging is not appropriate (as is the case with a LIPS 100 embodiment with two administration functions), then the action is ignored and processing terminates at step 1218.

If step 1212 determines paging was not requested, then step 1212 continues to step 1218 where processing terminates.

Administration mode may be protected with password support to prevent unauthorized maintenance.

Figure 13:
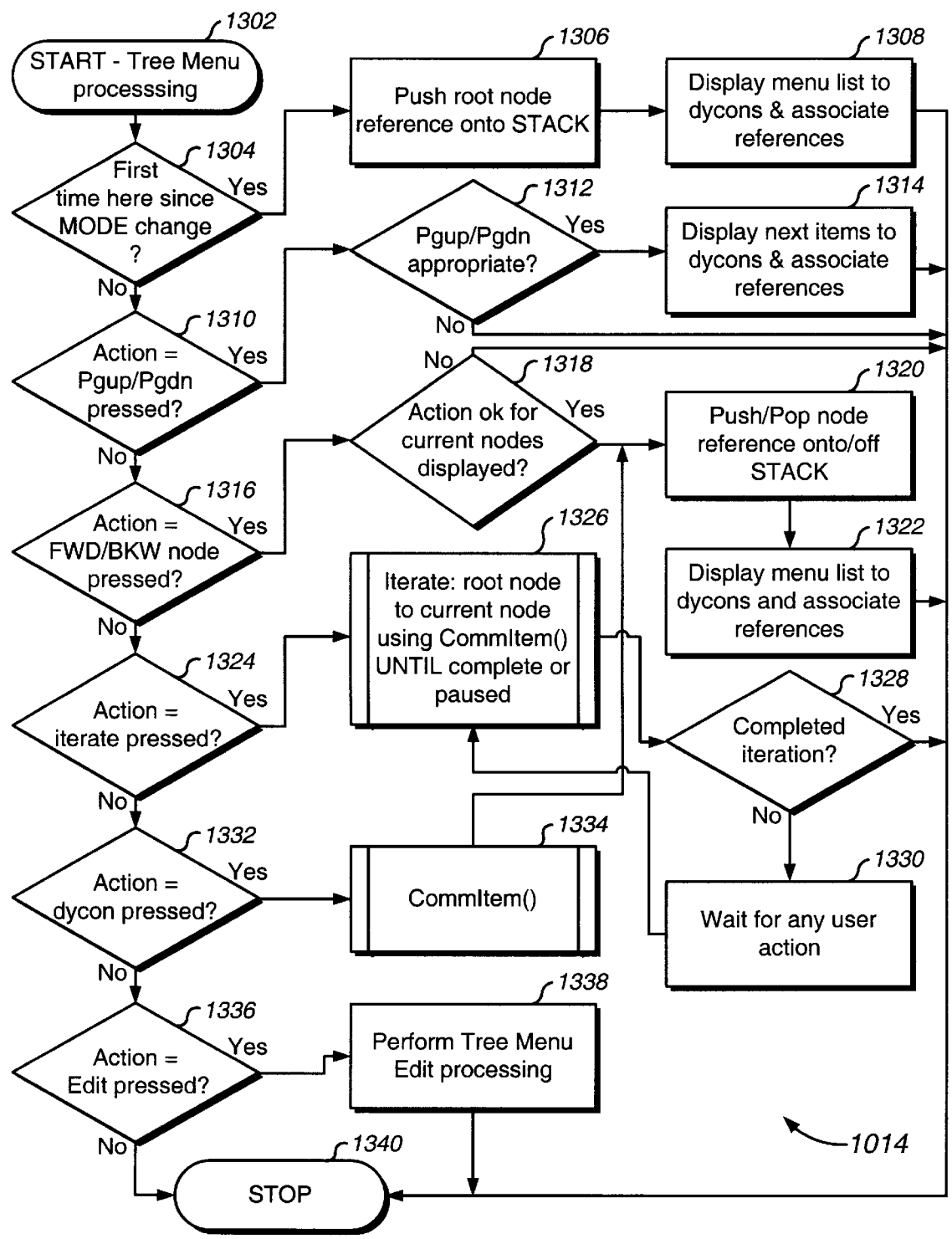
FIG. 13 depicts a flowchart for describing a preferred embodiment of the tree menu mode processing aspect of the present invention.

FIG. 13 depicts a flowchart for describing a preferred embodiment of the tree menu mode processing aspect of the present invention. FIG. 13 describes step 1014 processing which begins at step 1302 and continues to step 1304. If step 1304 determines that this is the first execution of step 1304 since a MODE change, then step 1306 pushes the tree structure root node reference (e.g. pointer) onto a variable STACK which operates in a programming stack manner. Thereafter, step 1308 displays first level nodes to dycons 110 and associates node references with the corresponding dycons to which the nodes are displayed according to the client video setting. Processing then terminates at step 1340.

If step 1304 determines it is not the first time here since a MODE change, then step 1310 and subsequent FIG. 13 steps process user actions received while in tree menu mode. If step 1310 determines that the page up control 132 or page down control 134 was activated, then step 1312 checks for paging validity. If at step 1312, paging is appropriate, then step 1314 performs the appropriate paging to other peer nodes at the same level and associates node references with the corresponding dycons to which the nodes are displayed according to the client video setting. Processing then terminates at step 1340. Of course, paging maintains the highlighting with a node if it were paged off dycons 110 and then paged back to dycons 110.

If step 1312 determines paging is not appropriate, then the action is ignored and processing terminates at step 1340.

If step 1310 determines paging was not requested, then step 1310 proceeds to step 1316. If step 1316 determines that context back control 136 or context forward control 138 was activated, then processing continues to step 1318. If step 1318 determines control 136 or 138 is valid for current dycons 110, then step 1318 continues to step 1320. Step 1320 pushes the appropriate node reference (e.g. pointer) to, or pops the appropriate node reference (e.g. pointer) from, STACK. Thereafter, step 1322 displays the next level (ascending or descending) of nodes to dycons 110, associates appropriate references between the nodes and dycons 110, and then processing terminates at step 1340.

The context back control 136 allows moving up the tree structure to the ascending node (i.e. ascending level). Dycons 110 are refreshed with the ascending node and its peer nodes. Context back control 136 is not valid for level 1 nodes.

The context forward control 138 allows moving down the tree structure to the most recently traversed descending node (i.e. descending level) from the current level displayed on dycons 110. Dycons 110 are refreshed with the descending level of nodes. Context forward control 138 is only valid if the user has previously activated a dycon, to traverse to a descending level, from the current context (level) that the context forward control 138 is activated. Popping (or pushing) a value from STACK actually resets a STACK pointer so that the tree node reference popped is still on STACK as far as being able to context forward. However, it will be overwritten with the next push onto STACK.

If step 1318 determines that context control 136 and 138 are not valid for the current level of nodes of dycons 110, then processing terminates at step 1340.

If step 1316 determines contextual control was not requested, then step 1316 proceeds to step 1324. If step 1324 determines iteration control 130 was activated, then processing continues to step 1326. Step 1326 invokes a subroutine, referred to as CommItem(), to iterate all nodes the user has selected from the first level to the current level. Step 1326 loops on the contents of STACK, starting with the first level user selected node (dycon activated) to the current level user selected node. Object Separation Speed set in Configure mode is used in the loop for properly timed spacing between CommItem() invocations. CommItem() is discussed in FIG. 21 below. The particular translation member of the node reference in a loop iteration is passed to the subroutine CommItem() for appropriate processing. The tree menu mode translation member is properly accessed in CommItem() for languages according to client audio, host video, and host audio settings. Iteration "borrows" dycon

110*a* if H$_V$ is not null. Dycon 110*a* is returned to its previous C$_V$ state after iteration.

Step 1326 also monitors for pause control 128 and continues to step 1328 if pause control 128 is detected, or if iteration has completed. If at step 1328, iteration has competed, then processing terminates at step 1340. If at step 1328, iteration has not completed (i.e. pause was detected), then step 1328 continues to step 1330. Step 1330 waits for any user control activated to terminate the pause (any user control terminates pausing and is intercepted at step 1330 specifically to terminate pausing), and processing subsequently returns back to step 1326 to complete the iteration.

If at step 1324, iteration was not activated, then step 1324 continues to step 1332. If step 1332 determines a dycon was activated (pressed), then step 1332 continues to step 1334 where subroutine CommItem() is invoked on the dycon's node reference for appropriate processing. The particular translation member of the node reference is passed to the subroutine CommItem() for appropriate processing. The tree menu mode translation member is properly accessed in CommItem() for languages according to client audio, host video, and host audio settings. Step 1334 then continues to step 1320 for pushing the activated dycon node reference onto STACK, and refreshing dycons 110 with the descending level of nodes. Step 1320 was described above.

If step 1332 determines a dycon was not activated, then step 1332 continues to step 1336. If step 1336 determines the edit control 126 was activated, then step 1338 performs tree menu edit processing, and then processing terminates at step 1340.

If at step 1336, the edit control was not activated, then processing terminates at step 1340.

Step 1336 performs no action when the configuration for Edit is disabled, thereby causing step 1332 to continue directly to step 1340 when it would have continued to step 1336.

Activating the client video control 118 for a new video language at any time during FIG. 13 processing instantly updates the dycons 110 with the new language for viewing and associates the appropriate partition (see steps 910 and 912).

Figure 14A:
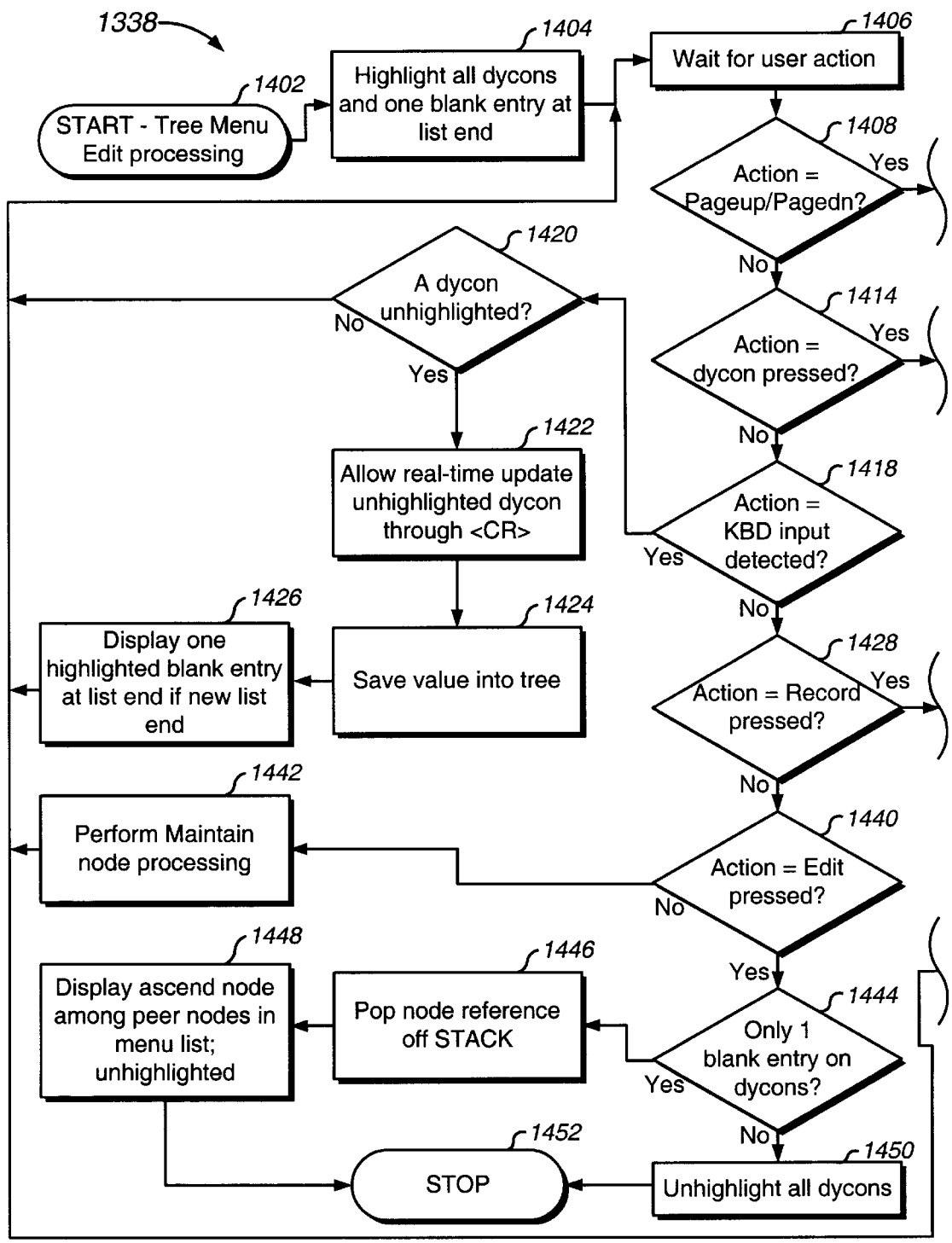
FIG. 14 depicts a flowchart for describing a preferred embodiment of the tree menu edit processing aspect of the present invention.
Figure 14B:
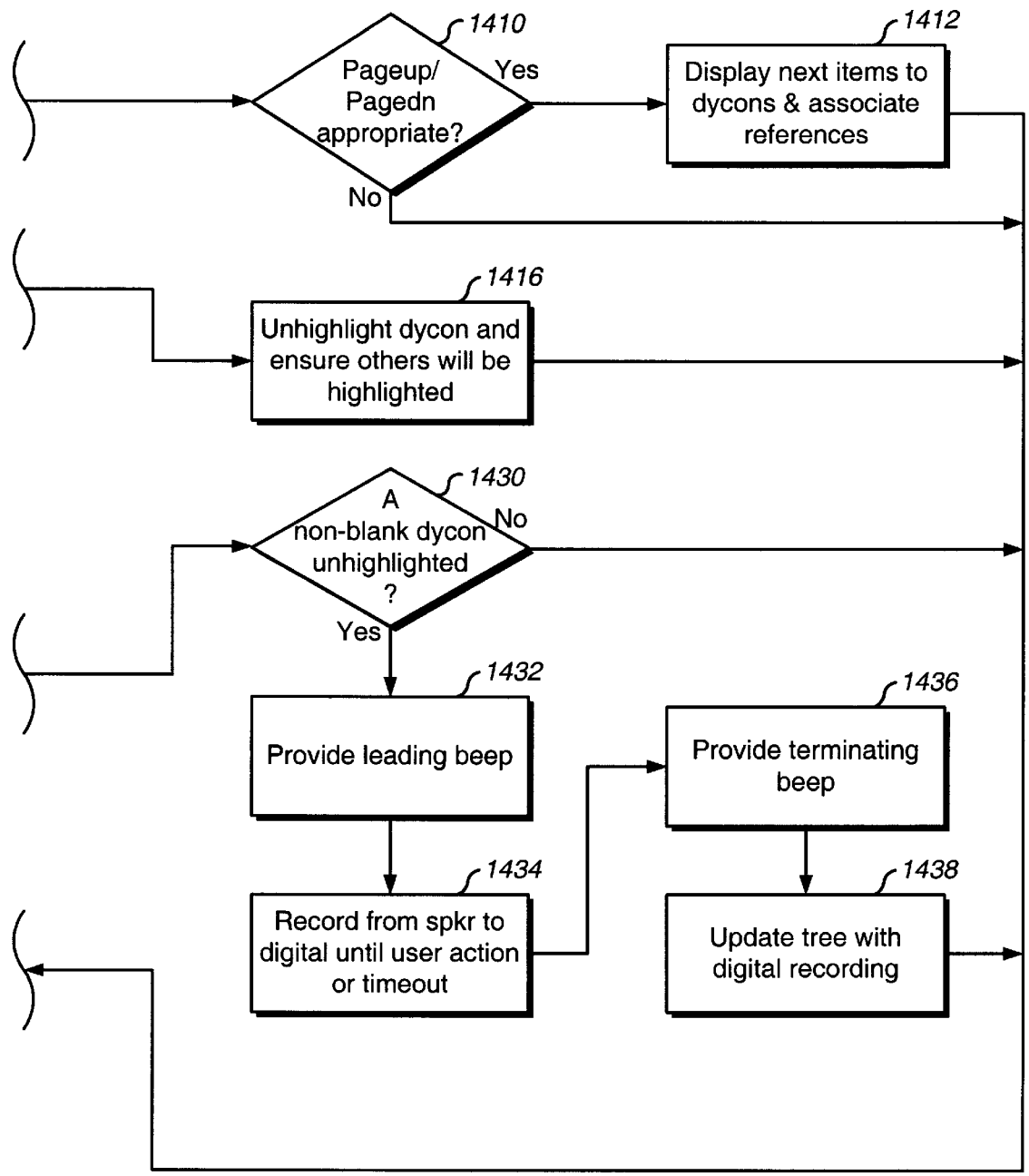

FIG. 14 depicts a flowchart for describing a preferred embodiment of the tree menu edit processing aspect of the present invention. FIG. 14 describes step 1338 processing which begins at step 1402 and continues to step 1404 which highlights all dycons for indicating edit mode, and maintains an add peer node position after the last peer node for the current level. The user may have to activate page down control 134 to expose the add peer node entry. Step 1404 then proceeds to step 1406 which waits for user action. Upon user action detected at step 1406, step 1406 continues to step 1408.

If step 1408 determines that the page up control 132 or page down control 134 was activated, then step 1410 checks for paging validity. If at step 1410, paging is appropriate, then step 1412 performs the appropriate paging to other peer nodes at the same level and associates node references with the corresponding dycons to which the nodes are displayed according to the client video setting. Processing then returns to step 1406. Of course, paging maintains the highlighting with a node if it were paged off dycons 110 and then paged back to dycons 110.

If step 1410 determines paging is not appropriate, then the action is ignored and processing returns to step 1406.

If step 1408 determines paging was not requested, then step 1408 proceeds to step 1414. If step 1414 determines a dycon was activated (pressed), then step 1414 continues to step 1416 where the dycon is un-highlighted, thereby indicating it may be edited. Any other dycon which may have been un-highlighted from a previous execution of step 1416 is re-highlighted. Thereafter, processing continues back to step 1406.

If step 1414 determines a dycon was not activated, then step 1414 continues to step 1418. If step 1418 determines an attached keyboard at PS/2 port 114 is sending keyboard data (i.e. user typing), then step 1420 determines if there is a dycon un-highlighted for such data. If at step 1420, a dycon is not un-highlighted, then processing continues back to step 1406. If at step 1420, a dycon is un-highlighted, then step 1422 real-time updates the dycon with data which is typed through a carriage return (i.e. enter key). Step 1422 updates the dycon one character at a time, returning to step 1406 for the next character (keys such as backspace, delete, etc are supported). A maximum length string may also be enforced at step 1422. Thereafter, step 1424 saves the character to the text string of the translation record of the node (that is un-highlighted) according to the current client video setting. Then, step 1426 ensures there is still an add peer node entry maintained if steps 1422 and 1424 processed for the add peer node entry. The add peer node entry is a method for adding peer nodes at the current level. Step 1424 creates a translation member if the add peer node entry is used to add a translation member. Step 1426 then returns back to step 1406.

If at step 1418, keyboard data is not detected, then step 1428 determines if the pause control 128 was activated. Pause control 128 causes a record request in tree menu edit processing.

If at step 1428, pause control 128 was activated, then step 1428 continues to step 1430. If step 1430 determines a dycon, other than the last add node dycon, is un-highlighted, then step 1432 provides a prompt beep, the recording process is started, and ends either through another user control action (terminates) or timeout (step 1434). Thereafter, step 1436 provides a terminating beep, step 1438 updates the translation record of the node (that is un-highlighted) with the recorded file (according to client video setting), and processing continues back to step 1406.

If step 1430 determines a dycon is not un-highlighted or there is not yet a text string for the node represented by the dycon (as could be the case for the add peer node dycon, or an added node without a particular language added in the translation member), then processing continues back to step 1406. Step 1430 requires a text string present in the translation record of the un-highlighted node (for the language according to client video setting) before allowing an associated recording entry. Alternative embodiments will allow recordings without a text string present in the translation record and will indicate such a situation properly.

If at step 1428, pause control 128 was not detected (recording request), then step 1428 continues to step 1440.

If step 1440 determines the edit control 126 was activated, then step 1444 checks to see if there is merely a single node (a add peer node entry) which is maintainable on dycons 110. If there is a single add peer node entry, then step 1446 pops the topmost reference from STACK, step 1448 displays the ascending level of nodes to dycons 110 in highlighted (for edit) form, and un-highlights the ascending node to the node removed from the tree. Step 1448 then continues to step 1452 which terminates edit processing. The edit control 126 toggles edit mode for a current context of the present invention.

If step 1440 determines the edit control 126 was not activated, then step 1442 performs maintain node processing. Thereafter, step 1442 returns back to step 1406.

Activating the client video control 118 for a new video language at any time during FIG. 14 processing instantly updates the dycons 110 with the new language for viewing and associates the appropriate partition so that the corresponding record is edited (see steps 910 and 912). A user should attempt to put as many language records as possible when adding a node, otherwise null translation records may appear in a translation member of the tree menu mode rules 400. Subroutine CommItem() (FIG. 21) will handle null translation member records with an audible beep and/or a visual text string "BLANK".

Figure 15:
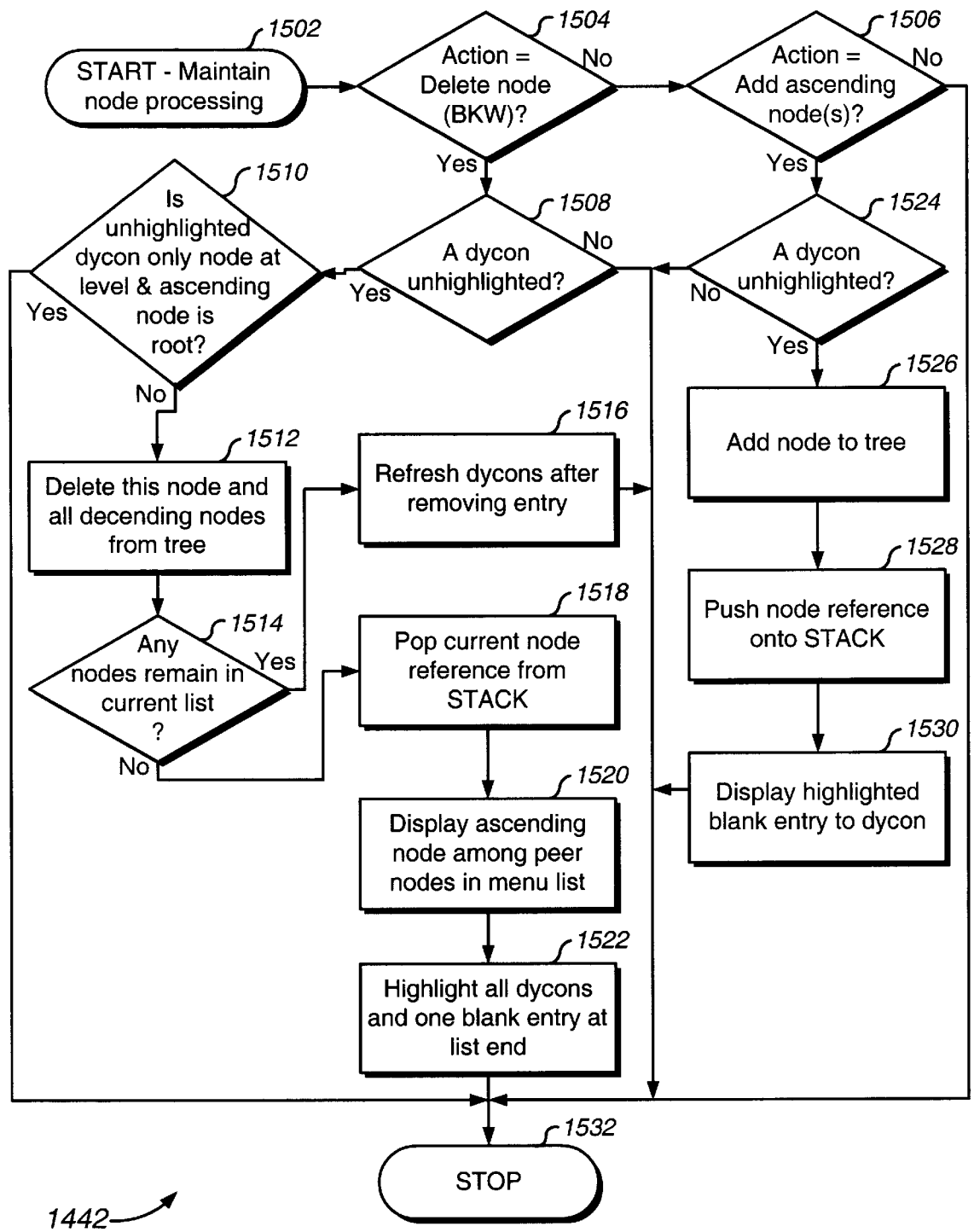
FIG. 15 depicts a flowchart for describing a preferred embodiment of the maintain node processing aspect of the present invention.

FIG. 15 depicts a flowchart for describing a preferred embodiment of the maintain node processing aspect of the present invention. FIG. 15 describes step 1442 processing which begins at step 1502 and continues to step 1504.

If step 1504 determines that the context backward control 136 (delete node in this context) was activated, then step 1508 checks for an un-highlighted dycon for which the operation applies. If step 1508 determines there is not an un-highlighted dycon, then processing terminates at step 1532.

If step 1508 determines there is an un-highlighted dycon, then step 1510 determines if the un-highlighted dycon is the only node at the current level to dycons 110 while the ascending node is the root node. If at step 1510, the un-highlighted dycon is the only node at the current level and the ascending node is the root node, then processing terminates at step 1532. The tree structure root node must point to at least one node in the first level.

If at step 1510, the un-highlighted dycon is not the only node at the current level or the ascending node is not the root node, then processing continues to step 1512 which deletes the un-highlighted node and all descending nodes from the tree structure. Thereafter, step 1514 determines if the only node at the current level was deleted.

If at step 1514, there remain other peer nodes at the current level to dycons 110, then step 1516 refreshes dycons 110 for a contiguous listing of displayed nodes according to the client video setting, and processing terminates at step 1532. If at step 1514, the deleted node was the only node at the current level to dycons 110, then the node reference requested for delete is popped from STACK at step 1518. Thereafter, step 1520 displays the ascending level of nodes to dycons 110 and step 1522 highlights (indicating edit) all dycons 110, and maintains an add peer node entry after the last peer node for the current level. The user may have to activate page down control 134 to expose the add peer node entry. Processing then terminates at step 1532.

If step 1504 determines that the context backward control 136 (delete node in this context) was not activated, then processing continues to step 1506. If step 1506 determines the context forward control 138 (add descending level of nodes) was activated, then step 1524 checks for an un-highlighted dycon for which the operation applies. If step 1524 determines there is not an un-highlighted dycon, then processing terminates at step 1532.

If step 1524 determines there is an un-highlighted dycon, then step 1526 adds a null node to the tree structure (corresponding to an add peer node entry which is maintained and displayed to dycon 110a at step 1530 below). Thereafter, step 1528 pushes the node reference onto STACK and step 1530 displays an add peer node position to dycon 110a. Then, processing terminates at step 1532.

If step 1506 determines the context forward control 138 (add descending level of nodes) was not activated, then processing terminates at step 1532.

All edits affect the tree structure in main memory 204 and/or the storage device, such as hard disk drive 210. Editing is provided for customer premise modifications. Extensive present invention updates are performed through refreshing LIPS 100 with the file transfer administration function by an authorized developer.

Alternative embodiments of tree menu mode processing support managing multiple trees, each referenced by a particular mode name. Some embodiments may be sorted at a given node's descending level, and maintained in editing as a sorted order wherein peers are added to any peer position.

Figure 16A:
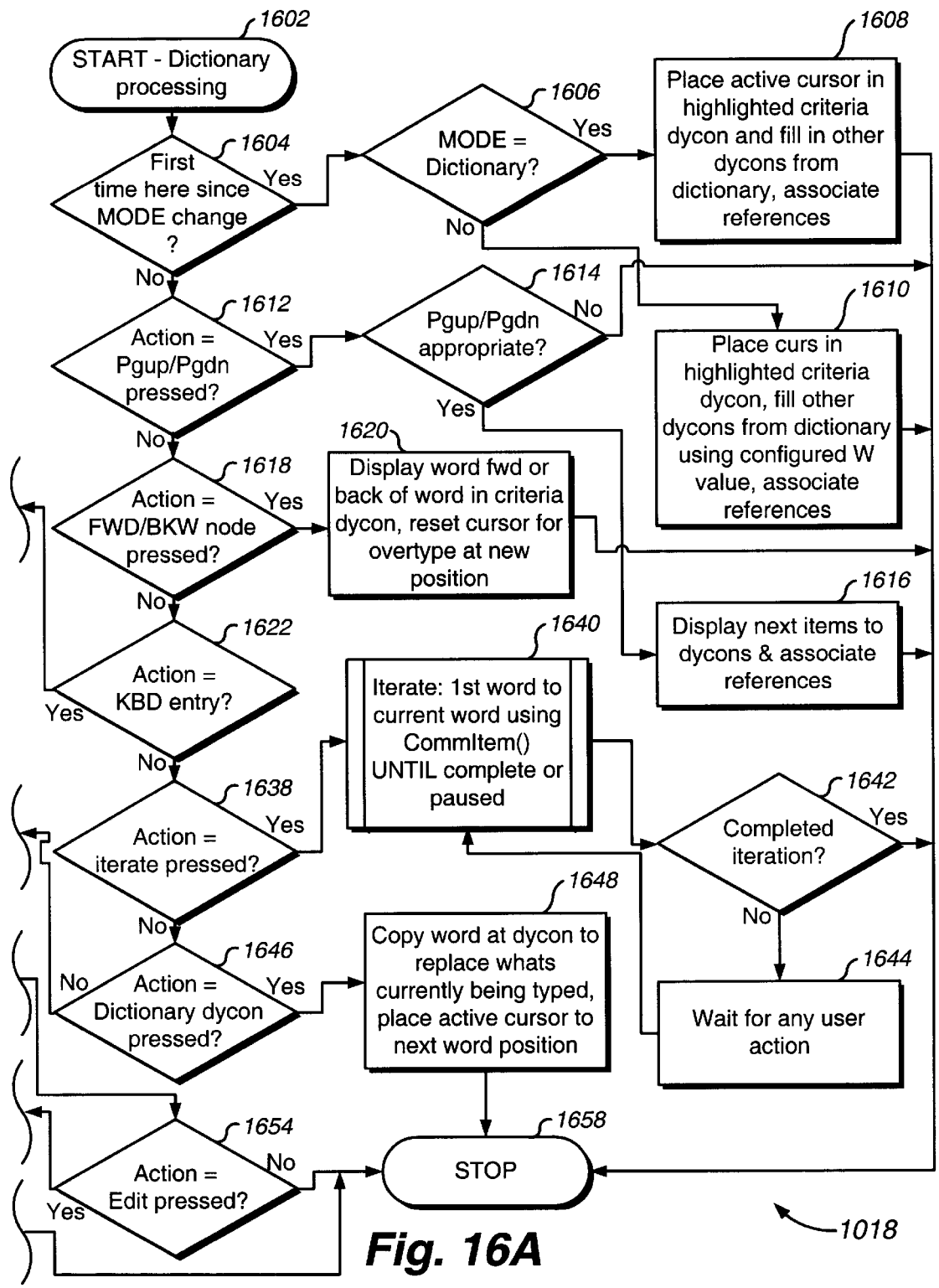
FIG. 16 depicts a flowchart for describing a preferred embodiment of the dictionary mode processing aspect of the present invention.
Figure 16B:
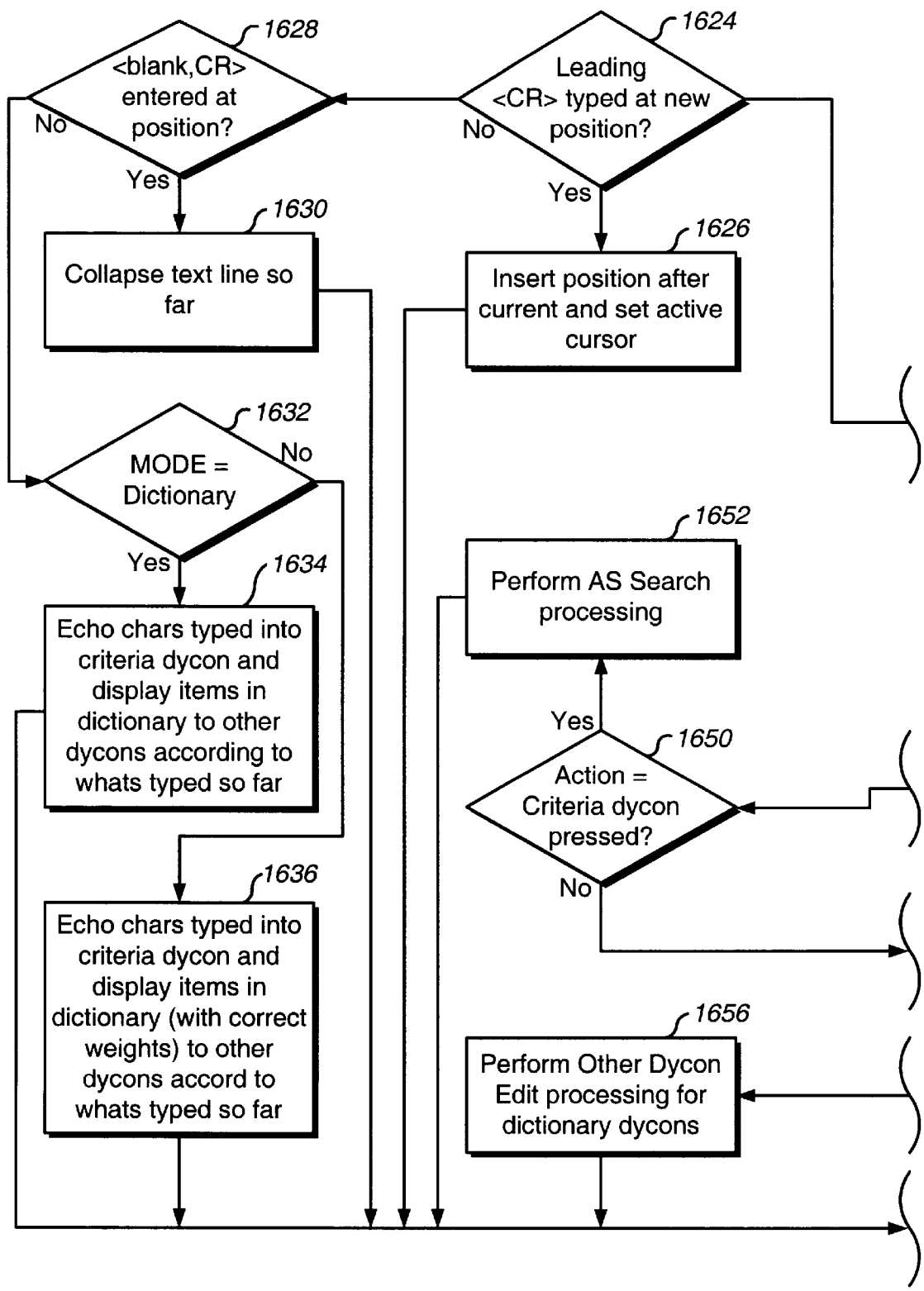

FIG. 16 depicts a flowchart for describing a preferred embodiment of the dictionary mode processing aspect of the present invention. FIG. 16 describes step 1018 processing which begins at step 1602 and continues to step 1604. If step 1604 determines that this is the first execution of step 1604 since a MODE change, then step 1604 proceeds to step 1606.

If step 1606 determines the MODE variable is set to dictionary mode, then step 1608 places an active cursor to dycon 110a, hereinafter referred to as a criteria dycon in dictionary mode, and fills other dycons 110b and following, with the dictionary translation member data using a sort reference 608 according to the client video setting, starting with the beginning dictionary translation members (e.g. the words which start with letter "a" when client video control setting is set to English). Processing then terminates at step 1658.

If step 1606 determines the MODE variable is set to weighted dictionary mode, then step 1610 places an active cursor to the criteria dycon, and fills other dycons 110b and following, with the dictionary translation member data using a sort reference 608 according to the client video setting, starting with the beginning dictionary translation members (e.g. the words which start with letter "a" when client video control setting is set to English). The weight value 612 is used to only retrieve those entries from the dictionary mode translation rules which exceed the weight threshold as set in configure mode processing. Processing then terminates at step 1658.

If step 1604 determines it is not the first time here since a MODE change, then step 1612 and subsequent FIG. 16 steps process user actions received while in dictionary, or weighted dictionary, mode. If step 1612 determines that the page up control 132 or page down control 134 was activated, then step 1614 checks for paging validity. If at step 1614, paging is appropriate, then step 1616 performs the appropriate paging to other translation members and associates references with the corresponding dycons to which the entries are displayed according to the client video setting. Processing then terminates at step 1658.

If step 1614 determines paging is not appropriate, then the action is ignored and processing terminates at step 1658.

If step 1612 determines paging was not requested, then step 1612 proceeds to step 1618. If step 1618 determines that context back control 136 or context forward control 138 was activated, then processing continues to step 1620. Step 1620 moves the active cursor in the criteria dycon to a word before (context back control), or after (context forward control), the word position of the active cursor. Criteria dycon 110a may have a plurality of text strings (e.g. words) therein from previous processing of FIG. 16. Context control round-robins criteria dycon contents. Context control is not relevant for a single word string in the criteria dycon in which case the cursor remains unchanged. Step 1618 continues to step 1658 which terminates processing.

If step 1618 determines contextual control was not requested, then step 1618 proceeds to step 1622. If step 1622 determines an attached keyboard at PS/2 port 114 is sending keyboard data (i.e. user typing), then step 1624 determines if the character typed is a leading carriage return (enter key) at the active cursor location.

If the character is a leading carriage return at a newly navigated word position in the criteria dycon 110*a* (at step 1624), then step 1626 inserts a word position in the criteria dycon 110*a* after the word position that has an active cursor (provided a text string is started at the active cursor), and moves the active cursor to the new word position. Processing then terminates at step 1658.

If the character is not a leading carriage return at a newly navigated word position in the criteria dycon 110*a* (at step 1624), then step 1628 determines if a space character, followed by a carriage return, has been typed at a newly navigated word position.

If at step 1628, a space character, followed by a carriage return was typed at a newly navigated word position in the criteria dycon 110*a,* then step 1630 collapses the criteria dycon 110*a* words typed so far by removing the word position (and word string) from the criteria dycon 110*a*.

If at step 1628, a space character, followed by a carriage return was not typed at a newly navigated word position in the criteria dycon 110*a,* then step 1632 determines the current dictionary mode.

If at step 1632, the MODE variable is set to dictionary mode, then step 1634 real-time updates characters typed to the criteria dycon 110*a* according to the active cursor, and updates other dycons 110*b* and following with matching translation members of dictionary mode translation rules which contain translation records (according to client video setting) that match to what is typed so far. Dictionary translation members can be paged. Then, processing terminates at step 1658.

If at step 1632, the MODE variable is set to weighted dictionary mode, then step 1636 real-time updates characters typed to the criteria dycon 110*a* according to the active cursor, and updates other dycons 110*b* and following with matching translation members of dictionary mode translation rules which contain translation records (according to client video setting) that match to what is typed so far. Also, only those translation members from the dictionary with a weight value 612 exceeding the weight threshold of configure mode are displayed contiguously, and can be paged. Then, processing terminates at step 1658.

Steps 1624, 1626, 1628, 1630, 1634, and 1636 process characters one at a time as they are passed one at a time from step 816 of FIG. 8. A maximum length string may be enforced for any text string (e.g. word) typed into dycon 110*a*. A user may enter space separated word strings in one sequence.

If at step 1622, keyboard data is not detected, then step 1638 determines if the iteration control 130 was activated. If iteration control 130 was activated, then processing continues to step 1640. Step 1640 invokes a subroutine, referred to as CommItem(), to iterate text string (e.g. words) in the criteria dycon 110*a,* starting from leftmost to rightmost. Step 1640 loops on the criteria dycon 110*a* associated contents and invokes CommItem() for processing as discussed in FIG. 21 below. Object Separation Speed set in Configure mode is used in the loop for properly timed spacing between CommItem() invocations. The particular word in a loop iteration is passed to the subroutine CommItem() as a translation member reference (of dictionary rules 602), if possible, for appropriate processing. If a translation member reference cannot be associated with the word, then CommItem() will perform a phonetic pronunciation (client video setting text only in each translation record of a scaffold translation member is passed to CommItem()).

Step 1640 also monitors for pause control 128 and continues to step 1642 if pause control 128 is detected, or if iteration has completed. If at step 1642, iteration has competed, then processing terminates at step 1658. If at step 1642, iteration has not completed (i.e. pause was detected), then step 1642 continues to step 1644. Step 1644 waits for any user control activated to terminate the pause (any user control terminates pausing and is intercepted at step 1644 specifically to terminate pausing), and processing subsequently returns back to step 1640 to complete the iteration.

If at step 1638, iteration was not activated, then step 1638 continues to step 1646. If step 1646 determines a dictionary dycon (of dycons 110*b* and following) was activated (pressed), then step 1646 continues to step 1648 where the translation record text string according to the dycon activated replaces anything typed so far at the current word location in the criteria dycon 110*a*. In this manner, a user can type a subset of a word, only to complete the word with a simple dictionary dycon activation. Thus, a user can conveniently construct an accurate dialogue using valid dictionary translation members. Processing then terminates at step 1658.

If step 1646 determines a dictionary dycon was not activated, then step 1646 continues to step 1650. If step 1650 determines that the criteria dycon 110*a* was activated (pressed), then step 1652 performs anticipated saying processing at step 1652, and processing terminates at step 1658. Anticipated saying processing allows a user to search the Anticipated Saying (AS) translation rules 700 for all translation members which match words (keyword(s)) typed in the criteria dycon 110*a*. In this manner, a user is able to search AS translation rules 700 after specifying one or more keywords.

If step 1650 determines that the criteria dycon 110*a* was not activated (pressed), then step 1652 continues to step 1654. If step 1654 determines the edit control 126 was activated, then step 1656 performs edit processing on dictionary dycons, and processing terminates at step 1658.

If at step 1654, the edit control was not activated, then processing terminates at step 1658.

Step 1654 performs no action when the configuration for Edit is disabled, thereby causing step 1650 to continue directly to step 1658 when it would have continued to step 1654.

Activating the client video control 118 for a new video language at any time during FIG. 16 processing instantly updates the dycons 110 with the new language and associated references (see steps 910 and 912) for the same translation member associated with each dycon. Words in the criteria dycon which are contained in dictionary translation rules 602 are also translated instantly. Words in the criteria dycon not matched to any translation members of dictionary rules 602 are kept as is.

Steps 1608, 1610, 1612, 1646, and 1654 will behave appropriately according to the Automatic Dictionary setting of configure mode. The dictionary dycons will not be used for a setting of disabled, and edit functionality thereof automatically becomes disabled.

An alternate embodiment supports multiple dictionaries, each of which may participate in FIG. 16 processing.

Figure 17A:
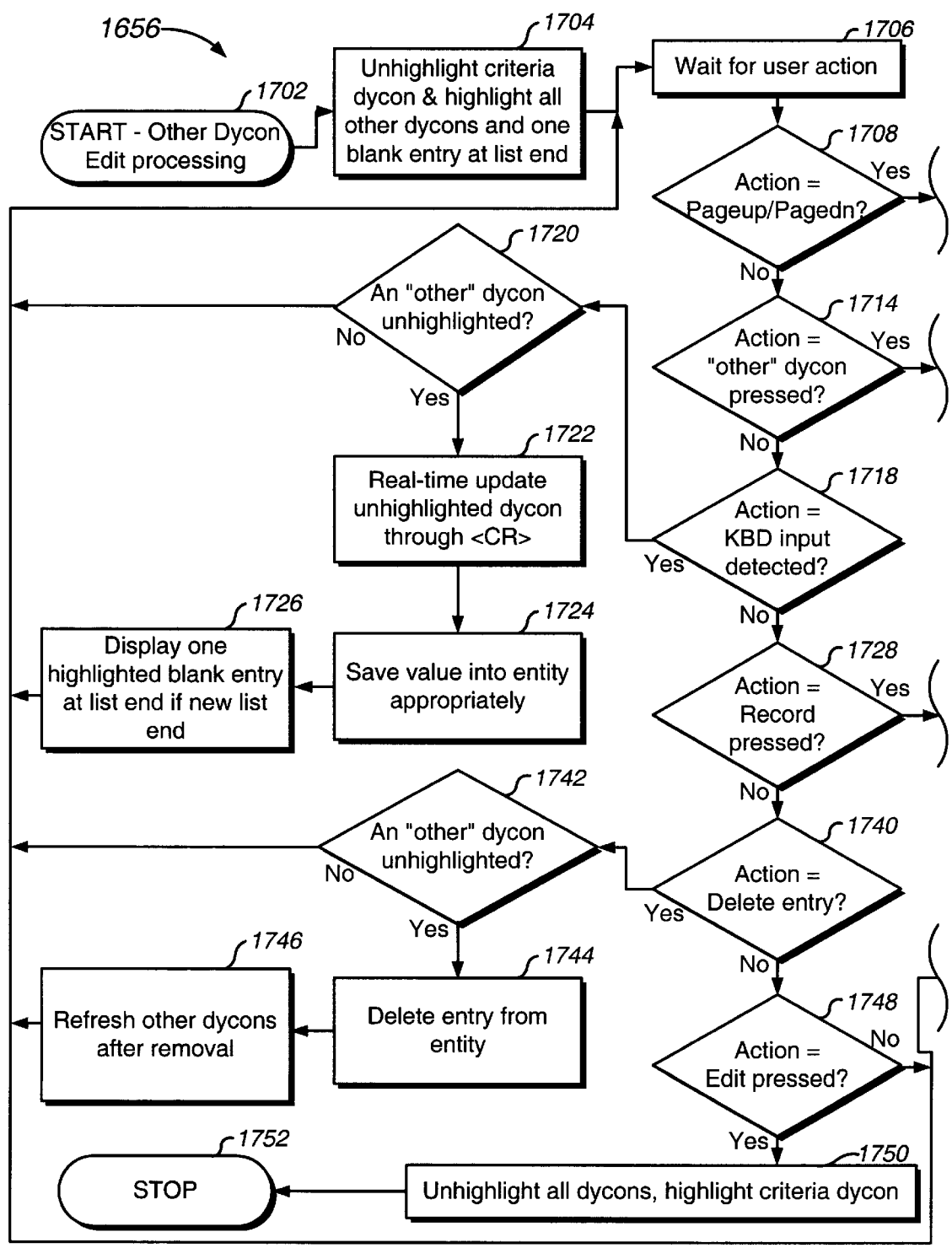
FIG. 17 depicts a flowchart for describing a preferred embodiment of the other dycon edit processing aspect of the present invention.
Figure 17B:
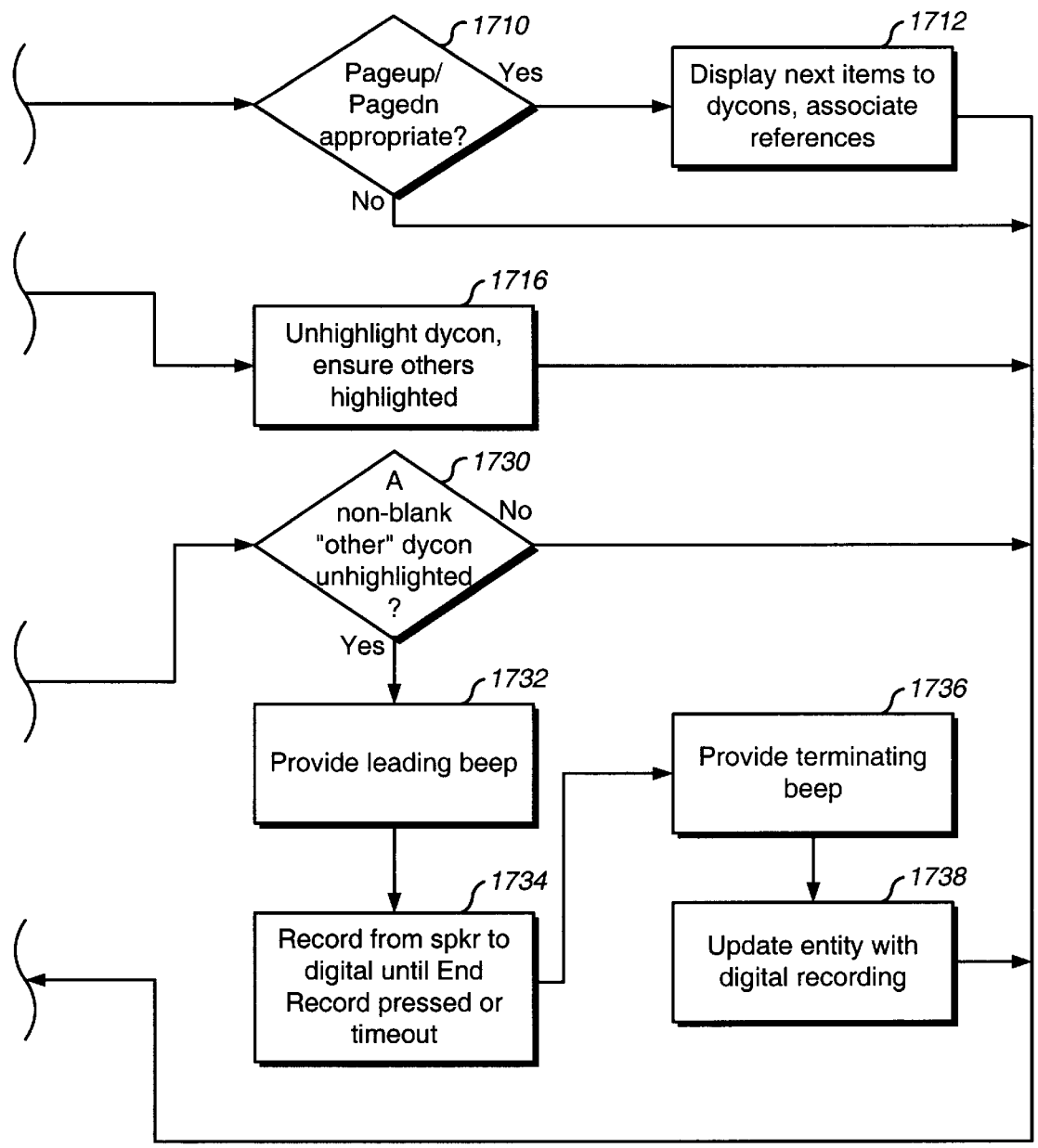

FIG. 17 depicts a flowchart for describing a preferred embodiment of the other dycon edit processing aspect of the present invention. FIG. 17 describes step 1656 processing which begins at step 1702 and continues to step 1704 which highlights all dictionary dycons (or AS dycons—see step 1850 below, or static response dycons—see step 2032) for indicating edit mode, and maintains an add member entry after the last translation member displayed corresponding to what is typed so far in criteria dycon 110a. The user may have to activate page down control 134 to expose the add member entry. Step 1704 then proceeds to step 1706 which waits for user action. Upon user action detected at step 1706, step 1706 continues to step 1708.

If step 1708 determines that the page up control 132 or page down control 134 was activated, then step 1710 checks for paging validity. If at step 1710, paging is appropriate, then step 1712 performs the appropriate paging to other translation members and associates references with the corresponding dycons to which translation members are displayed according to the client video setting. Processing then returns to step 1706. Of course, paging maintains the highlighting with a translation member if it were paged off dycons 110 and then paged back to dycons 110.

If step 1710 determines paging is not appropriate, then the action is ignored and processing returns to step 1706.

If step 1708 determines paging was not requested, then step 1708 proceeds to step 1714. If step 1714 determines a dictionary dycon (or AS dycon—see step 1850 below, or static response dycons—see step 2032) was activated (pressed), then step 1714 continues to step 1716 where the dycon is un-highlighted, thereby indicated it may be edited. Any other dycon which may have been un-highlighted from a previous execution of step 1716 is re-highlighted. Thereafter, processing continues back to step 1706.

If step 1714 determines a dycon from dycons 110b or following, was not activated, then step 1714 continues to step 1718. If step 1718 determines an attached keyboard at PS/2 port 114 is sending keyboard data (i.e. user typing), then step 1720 determines if there is a dycon un-highlighted for such data. If at step 1720, a dycon is not un-highlighted, then processing continues back to step 1706. If at step 1720, a dycon is un-highlighted, then step 1722 real-time updates the dycon with data which is typed through a carriage return (i.e. enter key). Step 1722 updates the dycon one character at a time, returning to step 1706 for the next character (backspace, delete, etc is supported). A maximum length string may also be enforced at step 1722. Thereafter, step 1724 saves the character to the text string of the translation record (that is un-highlighted) according to the current client video setting. Step 1724 will ensure current sort references for dictionary translation rules and will update dycons 110 if necessary. Then, step 1726 ensures there is still an add member entry maintained if steps 1722 and 1724 processed for the last add member entry. The add member entry is a method for adding new translation members. Step 1724 creates a translation member if the add member entry is used to add a translation member. Step 1726 then returns back to step 1706.

If at step 1718, keyboard data is not detected, then step 1728 determines if the pause control 128 was activated. Pause control 128 causes a record request.

If at step 1728, pause control 128 was activated, then step 1728 continues to step 1730. If step 1730 determines a dycon, other than the add member entry dycon, is un-highlighted, then step 1732 provides a prompt beep, the recording process is started, and ends either through another user control action (terminates) or timeout (step 1734). Thereafter, step 1736 provides a terminating beep, step 1738 updates the translation record of the translation member (that is un-highlighted) with the recorded file (according to client video setting), and processing continues back to step 1706.

If step 1730 determines a dycon is not un-highlighted or there is not yet a text string for the translation record of the translation member represented by the dycon (as could be the case for the add member entry dycon), then processing continues back to step 1706. Step 1730 requires a text string present in the translation record (for the language according to client video setting) of the un-highlighted translation member dycon before allowing an associated recording. Alternative embodiments will allow recordings without a text string present in the record and will indicate such a situation properly.

If at step 1728, pause control 128 was not detected (recording request), then step 1728 continues to step 1740.

If step 1740 determines that the context backward control 136 (delete entry in this context) was activated, then step 1742 checks for an un-highlighted dictionary (or AS, or static response) dycon for which the operation applies. If step 1742 determines there is not an un-highlighted dycon, then processing continues back to step 1706.

If step 1742 determines there is an un-highlighted dycon, then step 1744 deletes the translation member and step 1746 refreshes dycons to show the deletion. Processing then returns to step 1706. Step 1744 ensures current sort references for dictionary translation rules.

If step 1740 determines that the context backward control 136 (delete entry in this context) was not activated, then processing continues to step 1748. If step 1748 determines the edit control 126 was activated, then step 1750 un-highlights appropriate dycons 110, highlights criteria dycon 110a (according to Criteria Dycon highlight configuration) and then continues to step 1752 which terminates processing.

If step 1748 determines the edit control 126 was not activated, then processing continues back to step 1706.

Activating the client video control 118 for a new video language at any time during FIG. 17 processing instantly updates the dictionary (or AS, or static response) dycons 110 with the new language for viewing and associates references so that the corresponding translation record is edited (see steps 910 and 912). A user should attempt to fill as many language translation records as possible in a translation member when adding, otherwise null translation records may occur in particular translation rules. Subroutine CommItem() (FIG. 21) will handle null translation records with an audible beep and/or a visual text string "BLANK".

Figure 18A:
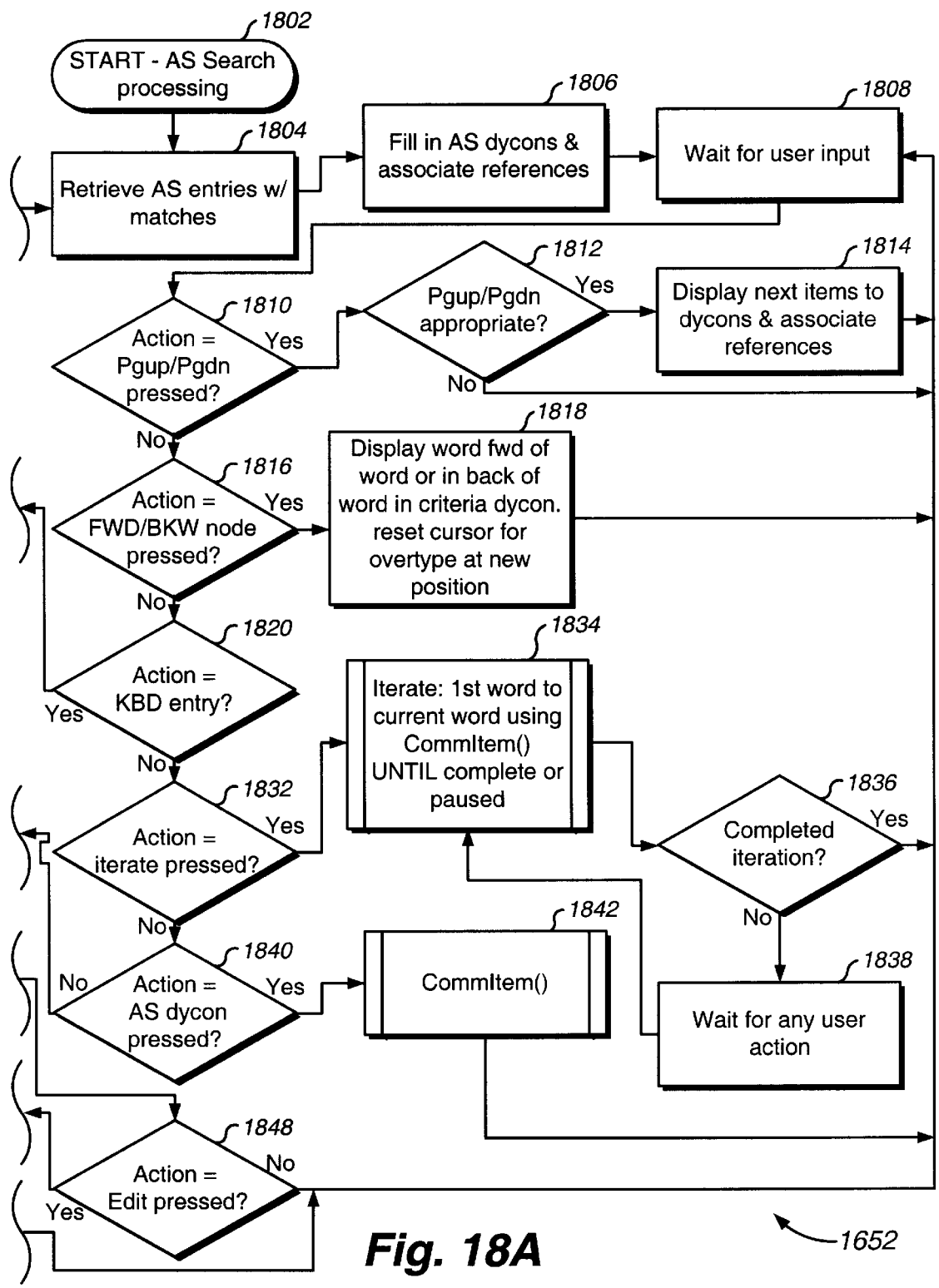
FIG. 18 depicts a flowchart for describing a preferred embodiment of the anticipated saying search processing aspect of the present invention.
Figure 18B:
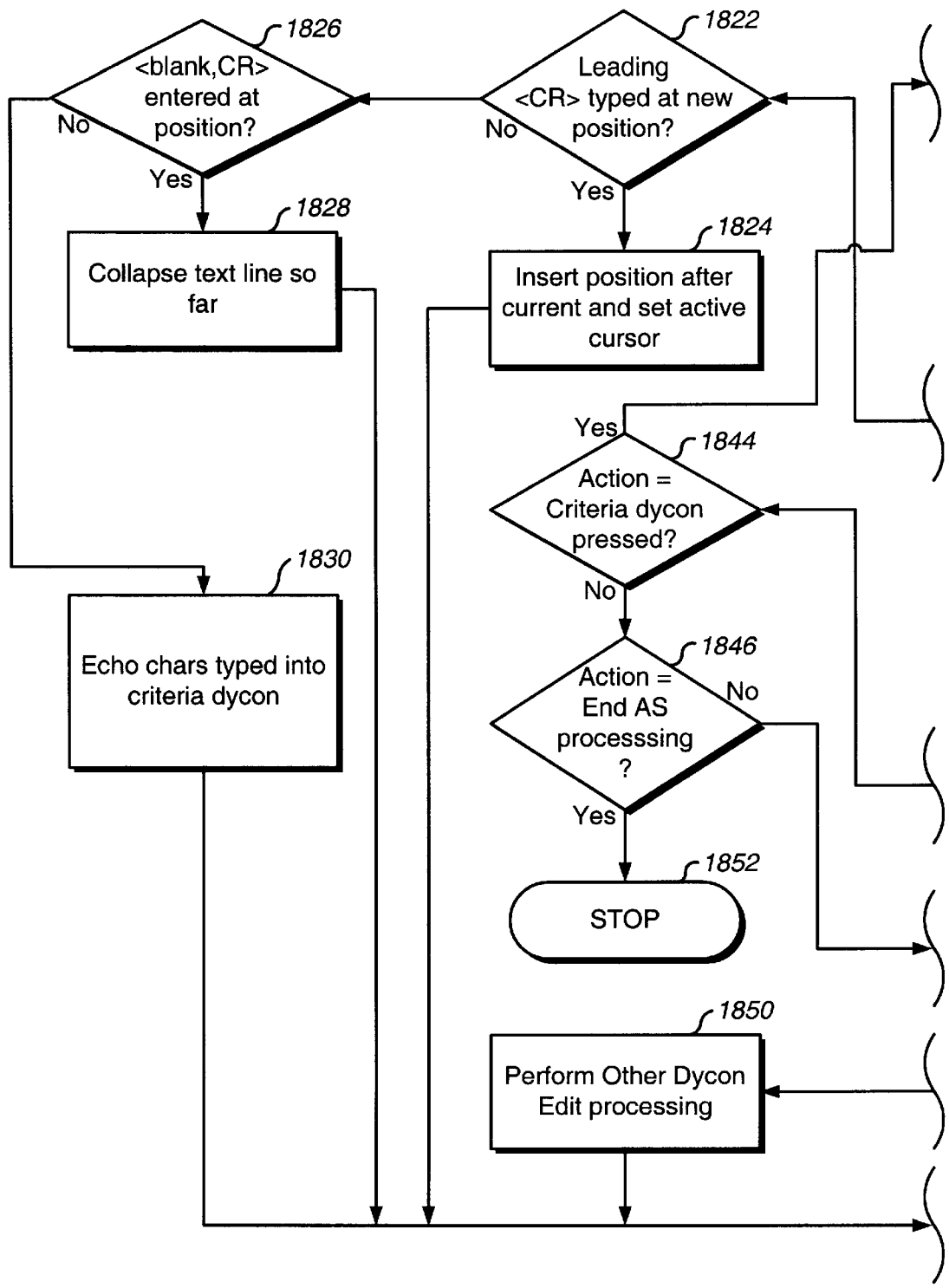

FIG. 18 depicts a flowchart for describing a preferred embodiment of the anticipated saying search processing aspect of the present invention. invention. FIG. 18 describes step 1652 processing which begins at step 1802 and continues to step 1804. Step 1804 retrieves all matches of translation members (of AS translation rules 700) containing keyword(s) in the criteria dycon. The client video setting determines which language partition to search for matches. The AS translation members which have all the keywords are retrieved. It is advantageous for a user to maximize the number of keywords in the criteria dycon 110a before searching so that a minimal number of hits are returned to the AS dycons 110*b* and following. Thereafter, step 1806 updates the AS dycons with results and associates AS translation member references. Then, step 1808 waits for any user action.

Upon a user action detected at step 1808, step 1808 proceeds to step 1810. If step 1810 determines that the page up control 132 or page down control 134 was activated, then step 1812 checks for paging validity. If at step 1812, paging is appropriate, then step 1814 performs the appropriate paging to other AS translation members and associates references with the corresponding dycons to which the translation members are displayed according to the client video setting. Processing then returns to step 1808.

If step 1812 determines paging is not appropriate, then the action is ignored and processing returns to step 1808.

If step 1810 determines paging was not requested, then step 1810 proceeds to step 1816. If step 1816 determines that context back control 136 or context forward control 138 was activated, then processing continues to step 1818. Step 1818 moves the active cursor in the criteria dycon to a word before (context back control), or after (context forward control), the word position of the active cursor, as previously described for FIG. 16. Criteria dycon 110*a* may have a plurality of words therein from previous processing. Step 1818 continues back to step 1808.

If step 1816 determines contextual control was not requested, then step 1816 proceeds to step 1820. If step 1820 determines an attached keyboard at PS/2 port 114 is sending keyboard data (i.e. user typing), then step 1822 determines if the character typed is a leading carriage return (enter key) at the active cursor location.

If the character is a leading carriage return at a newly navigated word position in the criteria dycon 110*a* (at step 1822), then step 1824 inserts a word position in the criteria dycon 110*a* after the word position that has an active cursor, and moves the active cursor to the new word position (as previously described for FIG. 16). Processing then returns to step 1808.

If the character is not a leading carriage return at a newly navigated word position in the criteria dycon 110*a* (at step 1822), then step 1826 determines if a space character, followed by a carriage return, has been typed at a newly navigated word position.

If at step 1826, a space character, followed by a carriage return was typed at a newly navigated word position in the criteria dycon 110*a,* then step 1828 collapses the criteria dycon 110*a* words typed so far by removing the word position (and word string) from the criteria dycon 110*a*.

If at step 1826, a space character, followed by a carriage return was not typed at a newly navigated word position in the criteria dycon 110*a,* then step 1830 real-time updates characters typed to the criteria dycon 110*a* according to the active cursor. Then, processing returns to step 1808.

Steps 1822, 1824, 1826, 1828, and 1830 process characters one at a time as they are passed one at a time from step 1808. A maximum length string may be enforced for any word typed into dycon 110*a*.

If at step 1820, keyboard data is not detected, then step 1832 determines if the iteration control 130 was activated. If iteration control 130 was activated, then processing continues to step 1834. Step 1834 invokes the subroutine CommItem() to iterate all words in the criteria dycon 110*a,* starting from leftmost to rightmost. Step 1834 loops on the criteria dycon 110*a* associated contents. The particular word in a loop iteration is passed to the subroutine CommItem() as a translation member from dictionary translation rules, if possible, for appropriate processing. Object Separation Speed set in Configure mode is used in the loop for properly timed spacing between CommItem() invocations. If a dictionary translation member cannot be associated with the word, then CommItem() will perform a phonetic pronunciation (a scaffold translation member with each translation record text string set to the text is passed to CommItem()).

Step 1834 also monitors for pause control 128 and continues to step 1836 if pause control 128 is detected, or if iteration has completed. If at step 1836, iteration has competed, then processing returns to step 1808. If at step 1836, iteration has not completed (i.e. pause was detected), then step 1636 continues to step 1838. Step 1838 waits for any user control activated to terminate the pause (any user control terminates pausing and is intercepted at step 1838 specifically to terminate pausing), and processing subsequently returns back to step 1834 to complete the iteration.

If at step 1832, iteration was not activated, then step 1832 continues to step 1840. If step 1840 determines an AS dycon (of dycons 110*b* and following) was activated (pressed), then step 1840 continues to step 1842 where subroutine CommItem() is invoked with the translation member of the dycon for appropriate processing. The AS translation member is properly accessed in CommItem() for languages according to client audio, host video, and host audio settings. Step 1842 then returns back to step 1808.

If step 1840 determines an AS dycon was not activated, then step 1840 continues to step 1844. If step 1844 determines that the criteria dycon 110*a* was activated, then processing continues back to step 1804 for another search according to criteria.

If step 1844 determines that the criteria dycon 110*a* was not activated (pressed), then step 1844 continues to step 1846. If step 1846 determines that pause control 128 was activated (end AS search processing), then processing terminates at step 1852.

If step 1846 determines that ending AS search processing was not requested, then step 1846 continues to step 1848.

If step 1848 determines the edit control 126 was activated, then step 1850 performs edit processing according to FIG. 17, and processing continues to step 1808. Step 1850 and step 1656 are equivalent in that FIG. 17 is used for processing.

If at step 1848, the edit control was not activated, then processing returns to step 1808.

Step 1848 performs no action when the configuration for Edit is disabled, thereby causing step 1846 to continue directly back to step 1808 when it would have continued to step 1848.

Activating the client video control 118 for a new video language at any time during FIG. 18 processing instantly updates the dycons 110 with the new language and associated references (see steps 910 and 912) for the translation member associated with the dycon. Words in the criteria dycon which are contained in dictionary mode translation rules 602 are also translated instantly. Words not matched to any translation members are kept as is.

An alternate embodiment permits FIG. 18 processing on multiple AS rules entities. Yet another embodiment supports predicates (AND, OR, NOT, etc) in the criteria dycon for searching.

Figure 19:
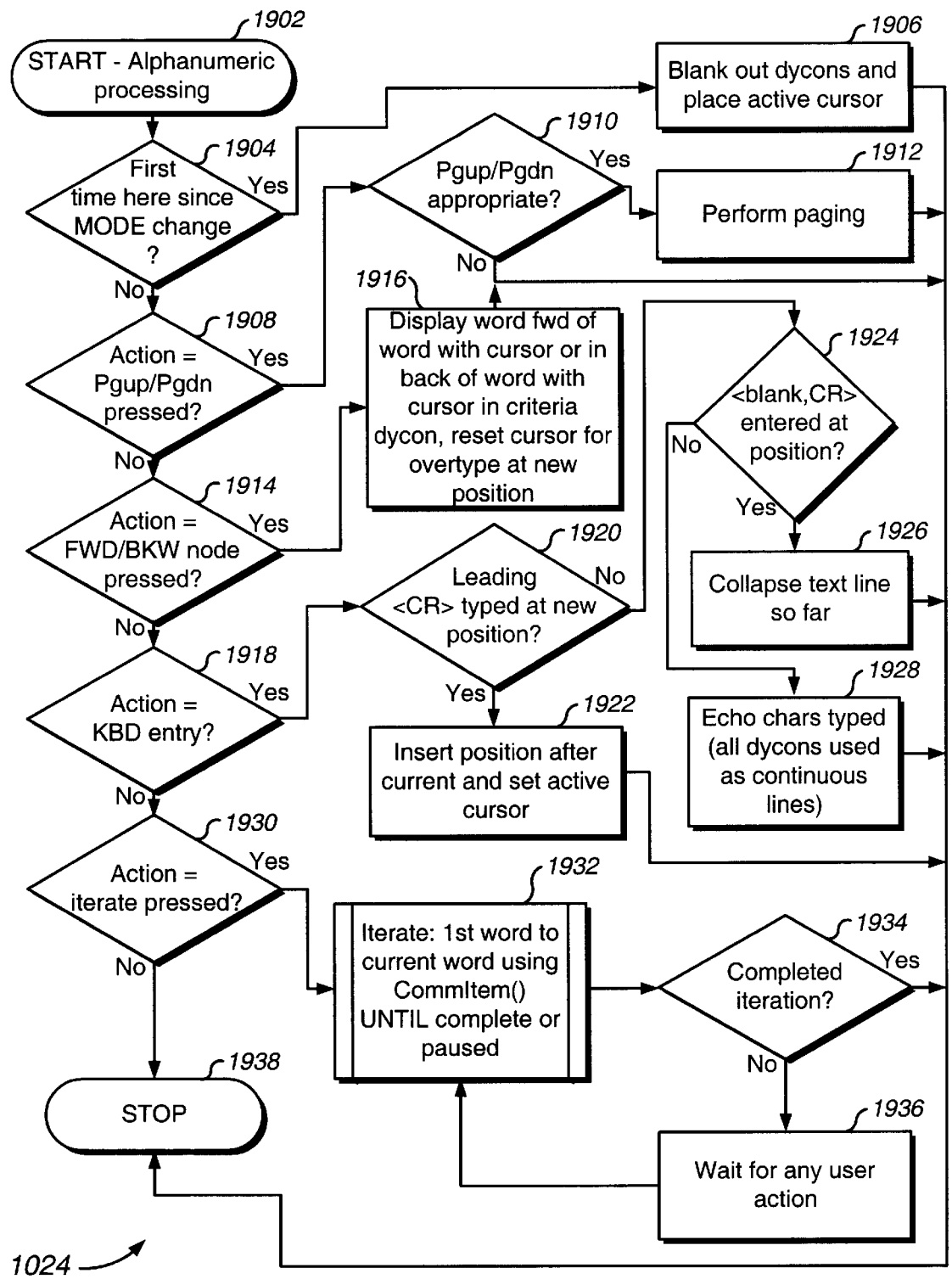
FIG. 19 depicts a flowchart for describing a preferred embodiment of the alphanumeric mode processing aspect of the present invention.

FIG. 19 depicts a flowchart for describing a preferred embodiment of the alphanumeric mode processing aspect of the present invention. FIG. 19 describes step 1024 processing which begins at step 1902 and continues to step 1904. If step 1904 determines that this is the first execution of step 1904 since a MODE change, then step 1904 proceeds to step 1906. Step 1906 blanks all dycons and places an active cursor in the leftmost character position of dycon 110*a*. Alphanumeric mode processing allows a user to type free form using all dycons as lines of a page. Step 1906 then continues to step 1938 which terminates processing.

If step 1904 determines that this is not the first execution of step 1904 since a MODE change, then step 1904 continues to step 1908.

If step 1908 determines that the page up control 132 or page down control 134 was activated, then step 1910 checks for paging validity. If at step 1910, paging is appropriate, then step 1912 performs the appropriate paging for lines typed to dycons 110. Processing then terminates at step 1938.

If step 1910 determines paging is not appropriate, then the action is ignored and processing terminates at step 1938.

If step 1908 determines paging was not requested, then step 1908 proceeds to step 1914. If step 1914 determines that context back control 136 or context forward control 138 was activated, then processing continues to step 1916. Step 1916 moves the active cursor to a word before (context back control), or after (context forward control), the word position of the active cursor. Step 1916 continues to step 1938 which terminates processing.

If step 1914 determines contextual control was not requested, then step 1914 proceeds to step 1918. If step 1918 determines an attached keyboard at PS/2 port 114 is sending keyboard data (i.e. user typing), then step 1920 determines if the character typed is a leading carriage return (enter key) at the active cursor location.

If the character is a leading carriage return at a newly navigated word position (at step 1920), then step 1922 inserts a word position after the word position that has an active cursor, and moves the active cursor to the new word position for all typing to continue there. Processing then terminates at step 1938.

If the character is not a leading carriage return at a newly navigated word position (at step 1920), then step 1924 determines if a space character, followed by a carriage return, has been typed at a newly navigated word position.

If at step 1924, a space character, followed by a carriage return was typed at a newly navigated word position, then step 1926 collapses words typed so far by removing the word position (and word), and processing terminates at step 1938.

If at step 1924, a space character, followed by a carriage return was not typed at a newly navigated word position, then step 1928 real-time updates characters typed according to the active cursor. Then, processing terminates at step 1938.

Steps 1920, 1922, 1924, 1926, and 1928 process characters one at a time as they are passed one at a time from step 816.

If at step 1918, keyboard data is not detected, then step 1930 determines if the iteration control 130 was activated. If iteration control 130 was activated, then processing continues to step 1932. Step 1932 invokes the subroutine CommItem() to iterate all words, starting from top and leftmost to bottom and rightmost. Step 1932 loops on associated contents. The particular word in a loop iteration is passed to the subroutine CommItem() as a dictionary translation member, if possible, for appropriate processing.

Object Separation Speed set in Configure mode is used in the loop for properly timed spacing between CommItem() invocations. If a translation member cannot be associated with the word, then CommItem() will perform a phonetic pronunciation (scaffold translation member with each translation record text set to the text is passed to CommItem()).

Step 1932 also monitors for pause control 128 and continues to step 1934 if pause control 128 is detected, or if iteration has completed. If at step 1934, iteration has competed, then processing terminates at step 1938. If at step 1934, iteration has not completed (i.e. pause was detected), then step 1934 continues to step 1936. Step 1936 waits for any user control activated to terminate the pause (any user control terminates pausing and is intercepted at step 1936 specifically to terminate pausing), and processing subsequently returns back to step 1932 to complete the iteration.

If at step 1930, iteration was not activated, then processing terminates at step 1938.

Activating the client video control 118 for a new video language at any time during FIG. 19 processing instantly updates the dycons 110 with the new language and associated references (see steps 910 and 912). Words not matched to any dictionary translation members are kept as is.

Figure 20:
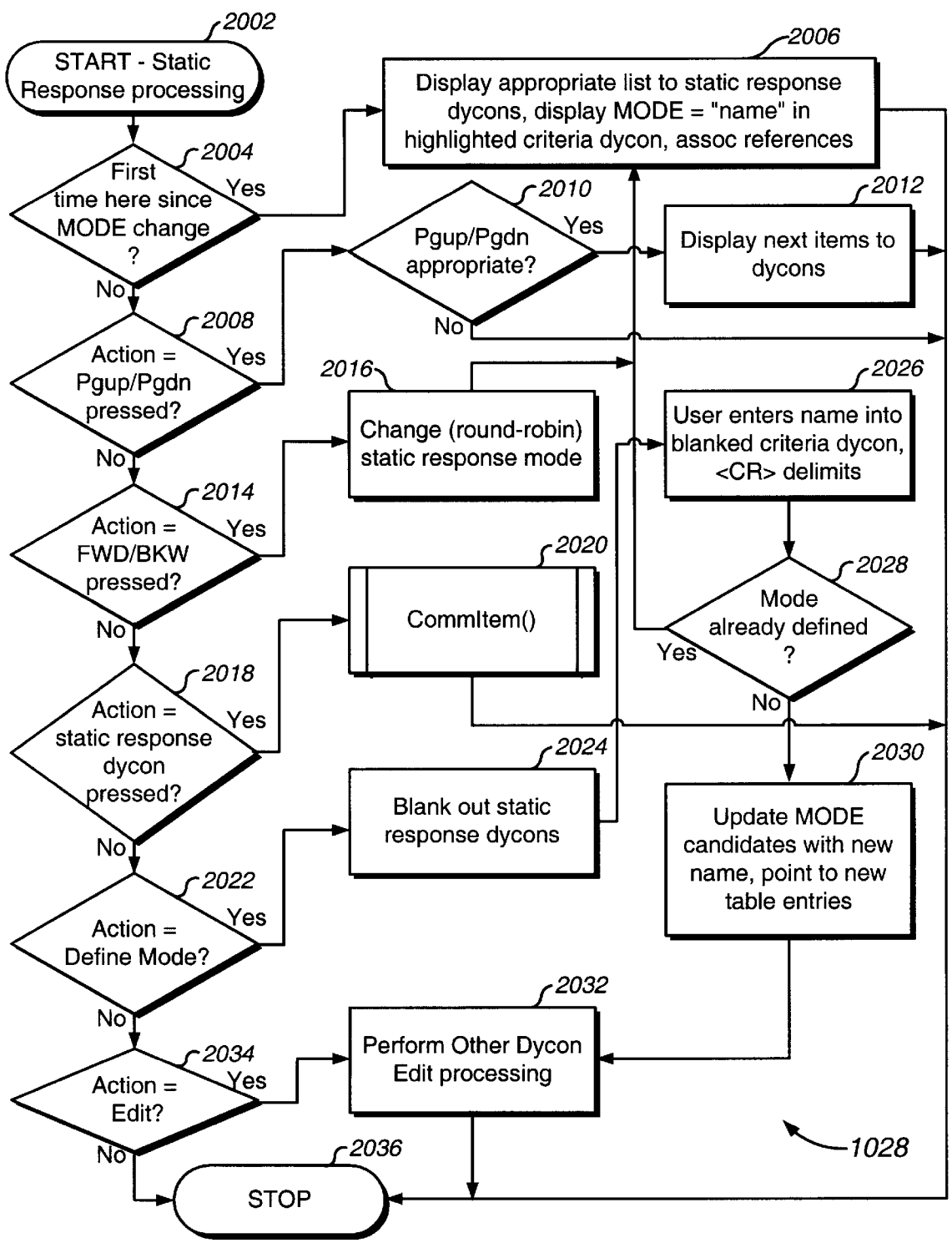
FIG. 20 depicts a flowchart for describing a preferred embodiment of the static response mode processing aspect of the present invention.

FIG. 20 depicts a flowchart for describing a preferred embodiment of the static response mode processing aspect of the present invention. FIG. 20 describes step 1028 processing which begins at step 2002 and continues to step 2004. If step 2004 determines that this is the first execution of step 2004 since a MODE change (for this type of static response mode), then step 2004 proceeds to step 2006. Step 2006 displays the appropriate list of static responses according to the mode, for example affirmation mode, weighted affirmation mode, or a user defined mode, to dycons 110*b* and following. The mode name, such as "Y/N", "W;Y/N", or a user defined name (e.g. "How do you feel?") is displayed highlighted in dycon 110*a*. Translation member references are associated appropriately to dycons. Thereafter, processing terminates at step 2036.

If step 2004 determines that this is not the first execution of step 2004 since a MODE change, then step 2004 continues to step 2008 for start of processing user actions.

If step 2008 determines that the page up control 132 or page down control 134 was activated, then step 2010 checks for paging validity. If at step 2010, paging is appropriate, then step 2012 performs the appropriate paging to other static response rules translation members and associates references with the corresponding dycons to which the translation members are displayed according to the client video setting. Processing then terminates at step 2036.

If step 2010 determines paging is not appropriate, then the action is ignored and processing terminates at step 2036.

If step 2008 determines paging was not requested, then step 2008 proceeds to step 2014. If step 2014 determines that context back control 136 or context forward control 138 was activated, then processing continues to step 2016. Step 2016 toggles through all static response modes in a round-robin fashion, thereby changing the MODE variable at step 2016. Step 2016 then returns to step 2006 for initial mode processing.

If step 2014 determines contextual control was not requested, then step 2014 proceeds to step 2018.

If at step 2018, a static response dycon (110*b* and following) was activated (pressed), then 2018 continues to step 2020 where subroutine CommItem() is invoked on the dycon's translation member for appropriate processing. The particular static response translation member is passed to the subroutine CommItem() for appropriate processing according to client audio, host video, and host audio settings. Step 2020 then terminates at step 2036.

If step 2018 determines a static response dycon was not activated, then step 2018 continues to step 2022. If step 2022 determines that the criteria dycon 110a was activated (define a mode selected), then processing continues to step 2024 where all dycons are blanked out, and then step 2026 allows a user to enter a string into the criteria dycon, up to a carriage return. Step 2026 also updates the MODE variable for the new mode. A maximum name length may be enforced at step 2026. Thereafter, step 2028 determines if the mode name is already defined.

If at step 2028, the mode name exists, then step 2028 proceeds to step 2006 for processing as previously described.

If at step 2028, the mode name is not already defined, then the MODE variable candidate list is updated with the new name at step 2030 and then step 2032 performs other dycon processing of FIG. 17. Thereafter, processing terminates at step 2036.

If step 2022 determines that the criteria dycon 110a (define new mode) was not activated (pressed), then step 2022 continues to step 2034.

If step 2034 determines the edit control 126 was activated, then step 2032 performs edit processing according to FIG. 17, and processing then terminates at step 2036. Steps 2032, 1850, 1656 are equivalent in that FIG. 17 is used for edit processing.

If at step 2034, the edit control was not activated, then processing terminates at step 2036.

Step 2034 performs no action when the configuration for Edit is disabled, thereby causing step 2022 to continue directly to step 2036 when it would have continued to step 2034.

Activating the client video control 118 for a new video language at any time during FIG. 20 processing instantly updates the static response dycons (110b and following) with the new language and associated references (see steps 910 and 912).

Figure 21:
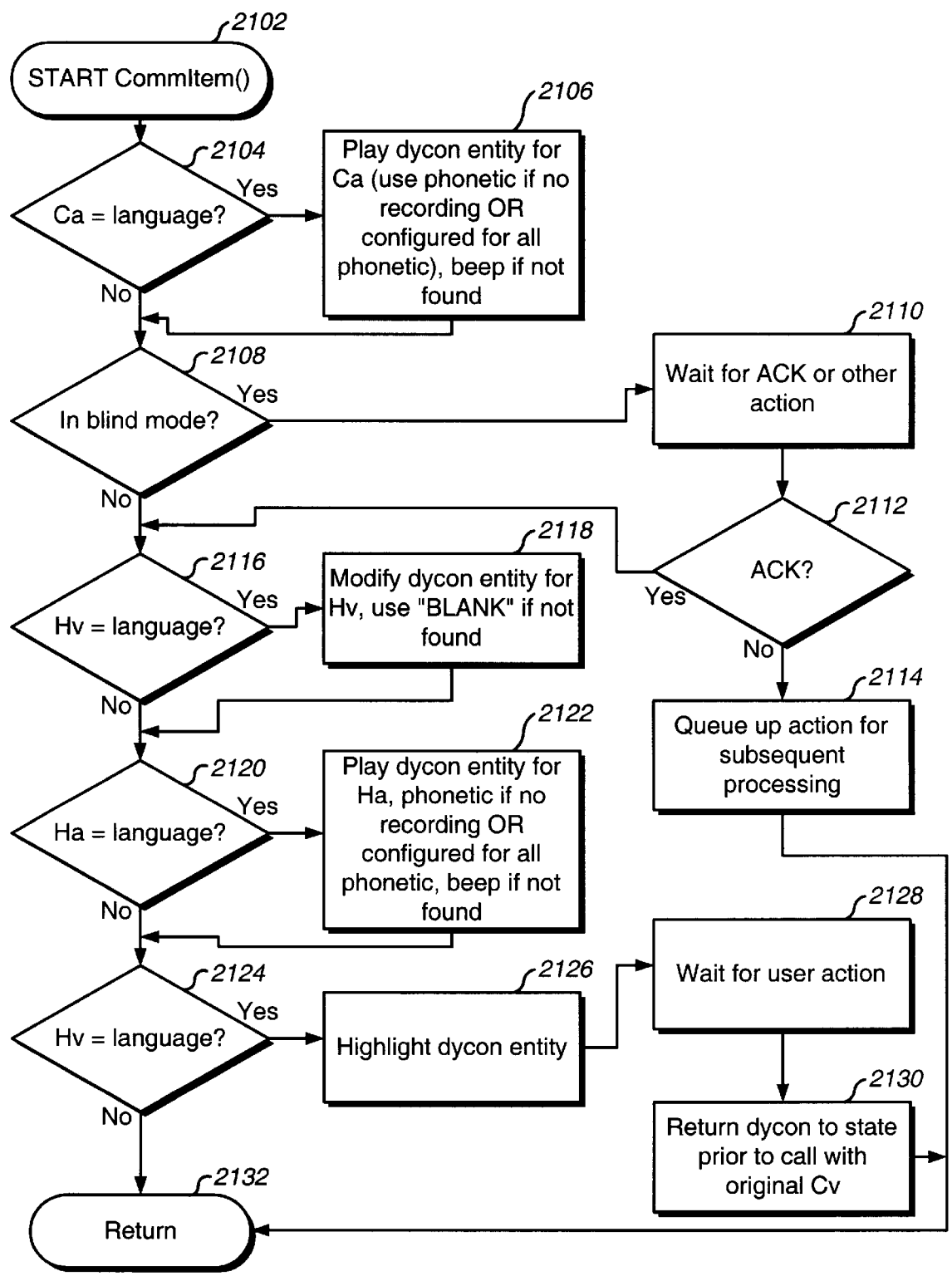
FIG. 21 depicts a flowchart for describing a preferred embodiment of the communicate item (CommItem()) subroutine processing aspect of the present invention.

FIG. 21 depicts a flowchart for describing a preferred embodiment of the communicate item (CommItem()) subroutine processing aspect of the present invention. CommItem() is invoked with a translation member, and an address of the function for displaying to the associated dycon, as a parameter from many steps heretofore described. The translation member is from one of the translation rules described above. CommItem() starts at step 2102 and then continues to step 2104. If step 2104 determines that the client audio setting (set with client audio control 120) is not null, then step 2106 plays the translation record of the translation member passed, according to the language of the client audio setting. Optimally, step 2106 plays the appropriate recording. If no recording is present, a phonetic pronunciation is performed on the text string. If the Client Audio configuration set in configure mode is phonetic, then the text string is phonetically pronounced regardless of a recording file present. If no text string or recording file (i.e. null) is present for the translation record according to the language of the client audio setting, then a beep is played. Step 2106 then continues to step 2108. If the client audio setting is null at step 2104, processing continues to step 2108.

If step 2108 determines the Blind Client configuration is enabled from Configure mode, then step 2108 continues to step 2110 to wait for a user action. Thereafter, step 2112 determines if an acknowledgment user action was detected. If an acknowledgment action was detected at step 2112, then processing continues to step 2116 (discussed below).

If step 2112 determines an acknowledgment action was not detected, then step 2114 queues up the action for subsequent processing. This allows a blind person to test dycons for playing what is associated with the dycon, and only when the last activated dycon is acknowledged will it be communicated to the host. Step 2114 then terminates at step 2132.

If step 2108 determines blind mode is not configured, then step 2108 continues to step 2116.

If at step 2116, the host video setting (set with host video control 122) is not null, then step 2118 displays the text string of the translation record of the translation member passed, according to the language of the host video setting. The text string "BLANK" is displayed if the translation record has no text string to display. Step 2118 then continues to step 2120. If the host video setting is null at step 2116, processing continues to step 2120. Step 2118 uses the dycon display function address parameter for displaying.

If step 2120 determines that the host audio setting (set with host audio control 124) is not null, then step 2122 plays the translation record of the translation member passed according to the language of the host audio setting. Optimally, step 2122 plays the appropriate recording. If no recording is present, a phonetic pronunciation is performed on the text string. If the Host Audio configuration set in configure mode is phonetic, then the text string is phonetically pronounced regardless of a recording file present. If no text string or recording file is present for the translation record according to the language of the host audio setting, then a beep is played. Step 2122 then continues to step 2124. If the host audio setting is null at step 2120, processing continues to step 2124.

If step 2124 determines that the host video setting is not null, then step 2126 highlights the dycon (according to Ack Highlight configuration in Configure mode), and step 2128 waits for any user action of controls. Upon detection of any user action at step 2128, step 2130 returns the dycon to its state prior to overwrite by host video at step 2118 using the client video translation record of the translation member passed to the subroutine. Step 2126 and step 2130 uses the dycon display function address parameter for dycon update. Step 2130 then continues to step 2132 which terminates processing.

If step 2124 determines the host video setting is null, then processing continues to step 2132 which terminates processing.

The Annotation Speed configuration is used at steps 2106 and 2122 for phonetic pronunciation.

Dyconic Keyboard of Invention

Figure 22:
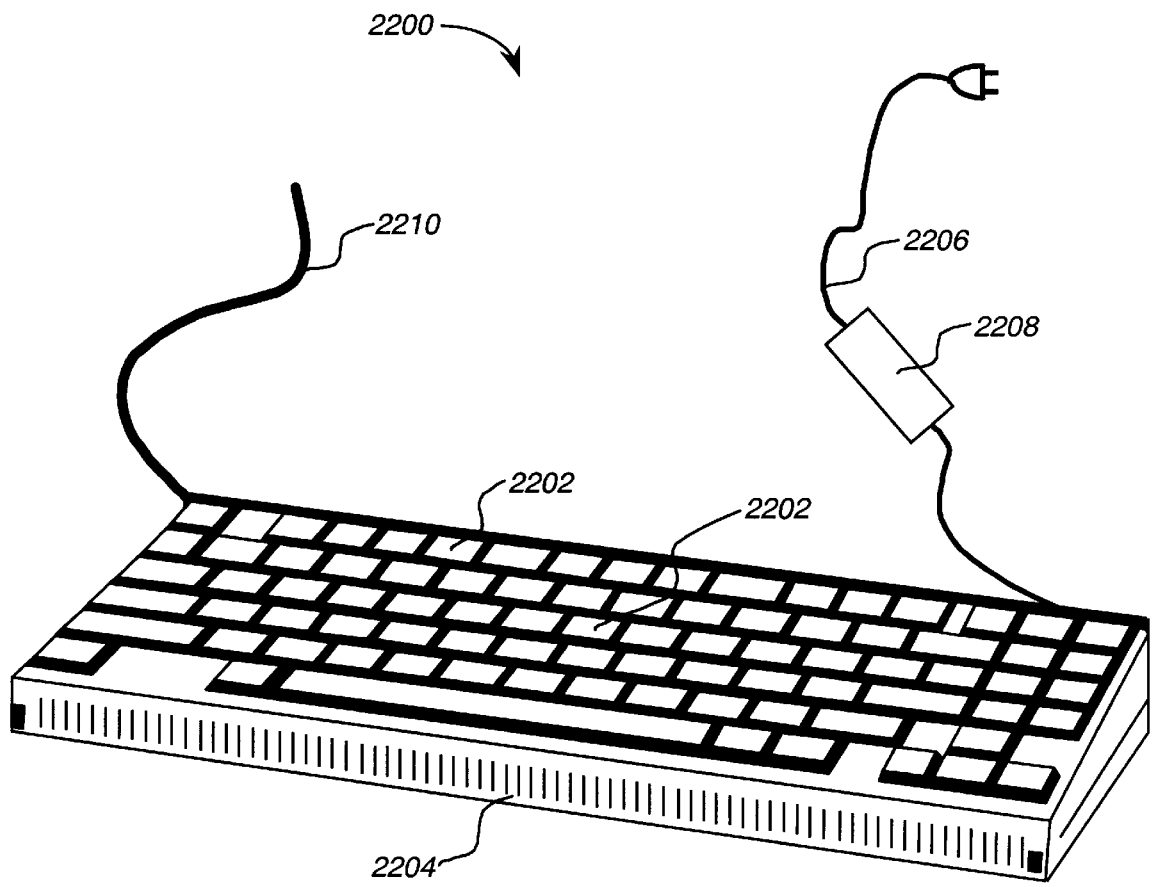
FIG. 22 illustrates a preferred dyconic keyboard embodiment of the present invention.

FIG. 22 illustrates a preferred dyconic keyboard embodiment of the present invention. It is a burden to keep the many keyboards handy for the many languages (with appropriate key characters displayed) LIPS 100 is able to support. The present invention incorporates a dyconic keyboard, capable of displaying key characters to dycons for dynamically associating a language to a keyboard. The Code page configuration of Configure mode tells LIPS 100 how to display character codes from a connected PS/2 keyboard, and how to store them.

The present invention dyconic keyboard 2200 contains a plurality of dycons 2202 for keys supported by housing 2204. The keyboard requires its own power from alternating current (AC) power cord 2206 which is integrated with an AC/DC transformer 2208. A PS/2 cable 2210 enables connecting dyconic keyboard 2200 to PS/2 port 114. An ON/OFF power switch (not shown), located in the back of housing 2204, turns power on and off.

Figure 23:
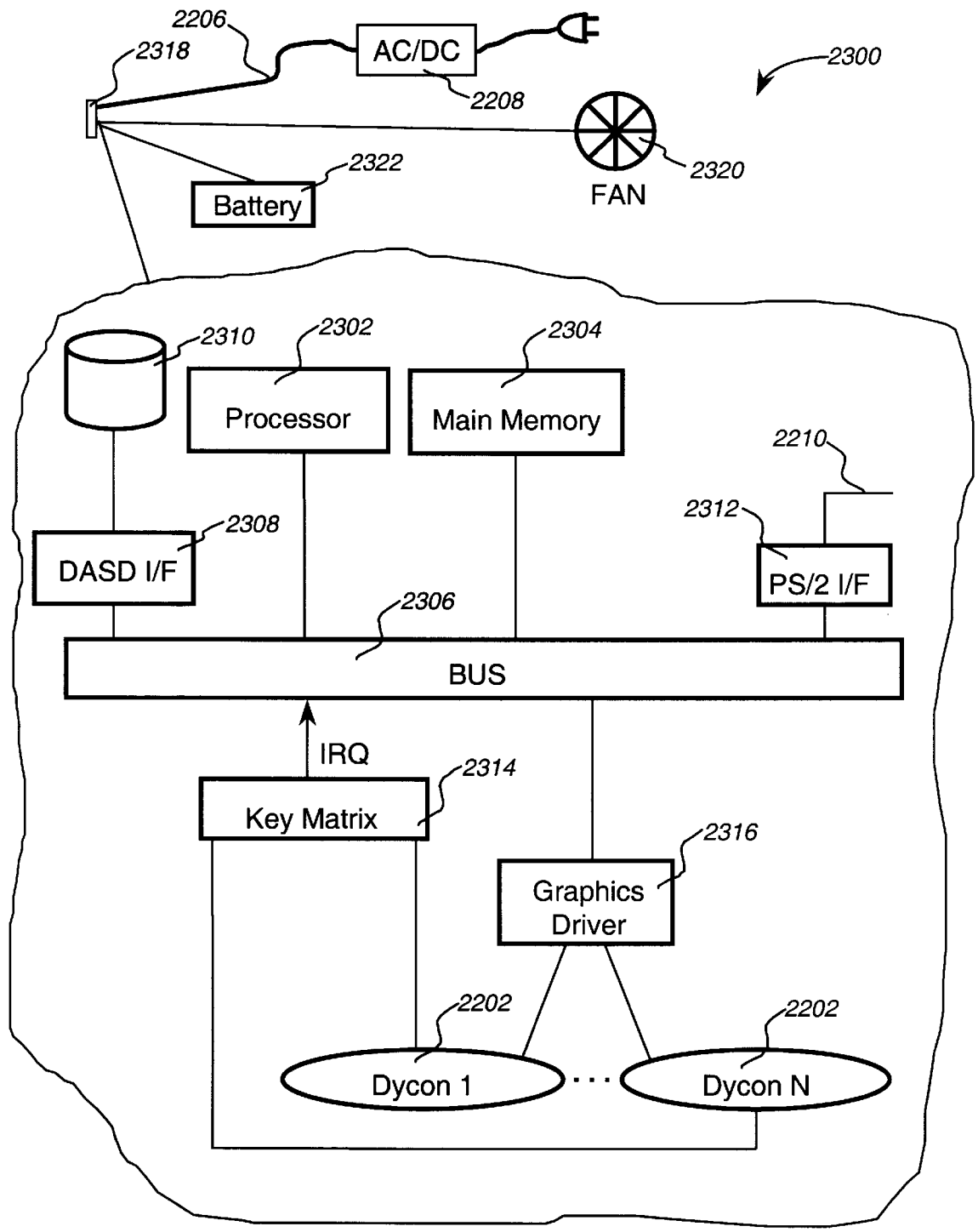
FIG. 23 depicts a block diagram of a preferred embodiment of the data processing system components of the dyconic keyboard of the present invention.

FIG. 23 depicts a block diagram of a preferred embodiment of the data processing system components of the dyconic keyboard of the present invention. A data processing system 2300 according to the present invention keyboard includes at least one processor 2302 and main memory 2304, for example random access memory (RAM), coupled to a bus 2306. The data processing system 2300 also includes a direct access storage device (DASD) interface module 2308 connected to bus 2306 for interface to a storage device, for example a hard disk drive 2310. A PS/2 interface module 2312 is connected to bus 2306 for communicating over a PS/2 cable connected to PS/2 port 114.

The data processing system 2300 also includes a key matrix module 2314 for issuing Interrupt Requests (IRQs) upon detection of user manipulation of control(s), for example dycons 2202. A graphics driver 2316 drives dedicated display means for dycons 2202 (shown generally as dycons 2202) according to data processing system control logic.

The AC/DC transformer 2208 integrated with power cord 2206 may or may not be connected to the dyconic keyboard through a female connector. The dyconic keyboard power switch 2318 draws electricity source through power cord 2206 when plugged in, otherwise a rechargeable battery 2322 is sourced. A fan 2320 operates whenever power switch 2318 is in the ON position to keep data processing system components at an appropriate temperature. Rechargeable battery 2322, for example a lithium battery, recharges whenever the dyconic keyboard is plugged in and power switch 2318 is in the ON position.

Data processing system programs (also called control logic) may be completely inherent in the processor 2302 being a customized semiconductor, or may be stored in main memory 2304 for execution by processor 2302 as the result of a read-only memory (ROM) load (not shown), or may be loaded from a storage device, such as hard disk drive 2310, into main memory 2304 for execution by processor 2302. Such programs, when executed, enable the data processing system 2300 to perform features of the present invention as discussed herein. Accordingly, such data processing system programs represent controllers of the data processing system.

In one embodiment, the invention is directed to a control logic program product comprising a processor 2302 readable medium having control logic (software) stored therein. The control logic, when executed by processor 2302, causes the processor 2302 to perform functions of the invention as described herein.

In another embodiment, the invention is implemented primarily in hardware, for example, using a prefabricated component state machine (or multiple state machines) in a semiconductor element, such as processor 2302. Key matrix module 2314, as well as graphic driver 2316 may have all, or part of, its processing in the semiconductor element.

Those skilled in the art will appreciate various modifications to the data processing system 2300 without departing from the spirit and scope of the invention.

Figure 24:
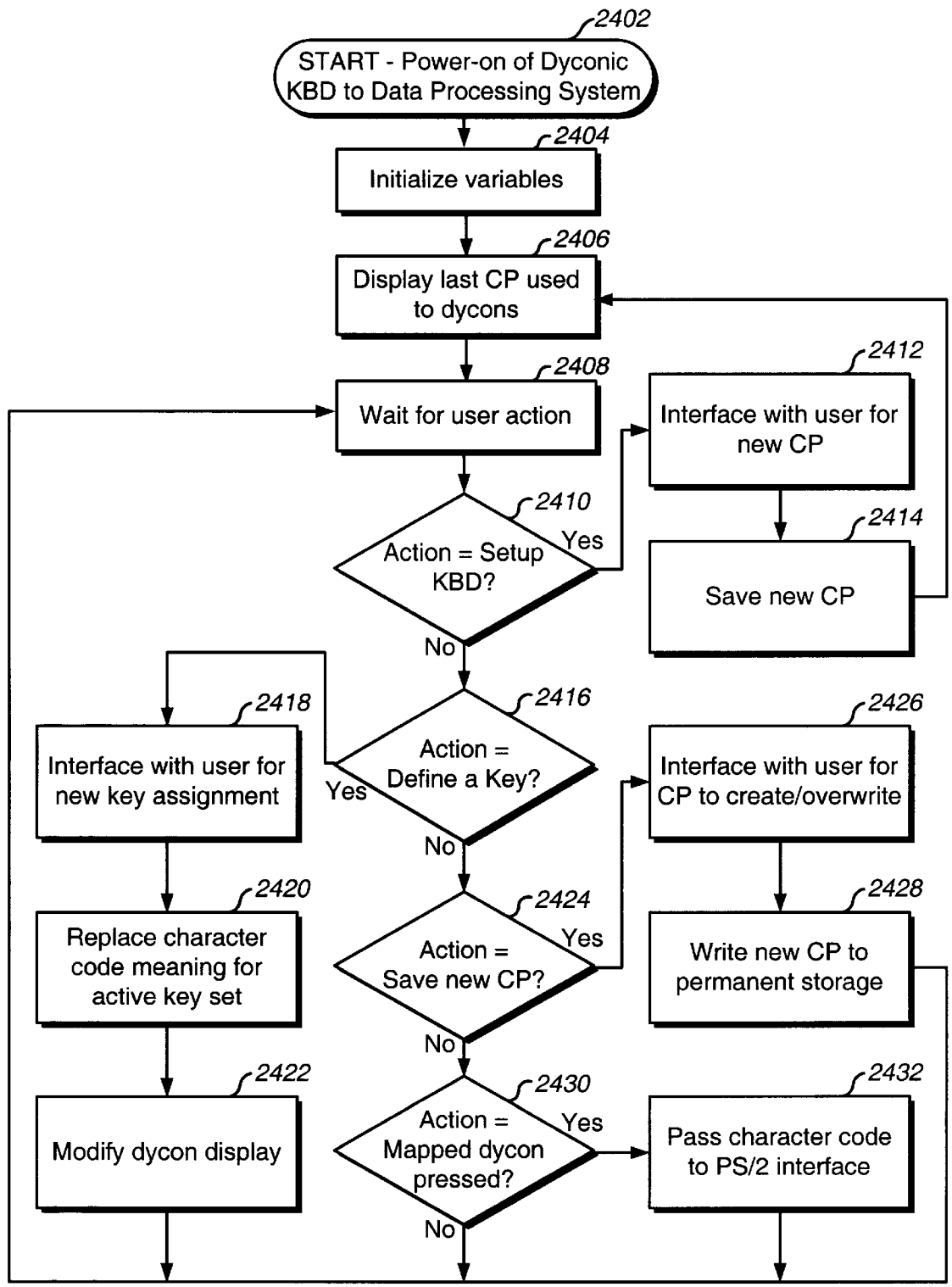
FIG. 24 depicts a flowchart for describing a preferred embodiment of data processing of the dyconic keyboard of the present invention.

FIG. 24 depicts a flowchart for describing a preferred embodiment of data processing of the dyconic keyboard of the present invention. The process starts upon power-on at step 2402 and continues to step 2404 where variables are initialized. Step 2404 continues to step 2406 which displays the appropriate characters to dycons 2202 according to the last code page used. Code page 850 is the default and step 2406 will use it if this is the first time the keyboard is used. Step 2408 continues to step 2408. Step 2408 waits for user action from the dyconic keyboard 2200. Upon user action at dyconic keyboard 2200, step 2408 continues to step 2410.

If step 2410 determines the action is to setup the keyboard, then processing continues to step 2412 where the user interfaces with data processing system 2300 for a new code page. Thereafter, step 2414 saves the new assigned code page, and continues back to step 2406 for display of the appropriate characters to dycons 2202, according to the new code page.

If step 2410 determines the action is not to setup the keyboard, then processing continues to step 2416.

If step 2416 determines the user action is to define or re-define a dycon, then step 2418 interfaces with the user for a new dycon assignment, step 2420 replaces the character code meaning for the dycon, and step 2422 modifies the dycon display per the new character assignment. Thereafter, step 2422 continues back to step 2408 to await further keyboard action. Steps 2418, 2420, and 2422 allow assigning characters from other code pages to the current code page in use of dyconic keyboard 2200.

If step 2416 determines the user action is not to define or re-define a dycon, then step 2416 continues to step 2424.

If step 2424 determines the user action is to save current displayed characters of dycons 2202 to a code page (create a new one or overwrite existing one), then step 2426 interfaces with the user for saving the code page. Then, step 2428 writes the code page to storage, such as hard disk drive 2310, and then continues back to step 2408. All code pages supported by the dyconic keyboard, and new code pages maintained by the user, are stored to storage, such as hard disk drive 2310. Step 2426 does not allow a user to overwrite a code page packaged with dyconic keyboard 2200 (stored for example, on hard disk drive 2310).

If step 2424 determines the user action is not to save current displayed characters of dycons 2202 to a code page, then step 2424 proceeds to step 2430.

If step 2430 determines the user action is a keystroke (dycon pressed), then step 2432 passes the corresponding character code to the present invention over the PS/2 interface and processing returns to step 2408. If step 2430 determines the user action is not a keystroke, then processing continues back to step 2408. Processing terminates with dyconic keyboard powered off by power switch 2318.

Steps 2412, 2418, and 2426 may use special controls on dyconic keyboard 2200 for toggling available values to a dycon(s), or step 2408 will recognize a unique keystroke combination for steps 2410, 2416, and 2424 whereupon steps 2412, 2418, and 2426 use dycons 2202 to interface with the user.

The dyconic keyboard may also be used to standard PS/2 ports to other computer systems. Products, for example Gateway/2000's AnyKey, continue be able to program sequences of keystrokes into a single key, adjust the repeat rate, or re-map the entire keyboard for a different arrangement of keys, at the computer system. The computer system sees the dyconic keyboard as a standard PS/2 keyboard. However, the dyconic keyboard is capable of being a keyboard for any language. (Gateway/2000 is a registered trademark of Gateway/2000 Corp.)

Images displayed to dycons 2202 are associated to dycons 2202 by a code page and offset therein. This allows users to define customized code pages with steps 2418, 2420, 2422, 2426, and 2428.

Alternate Embodiments in Spirit and Scope of Invention

Figure 25:
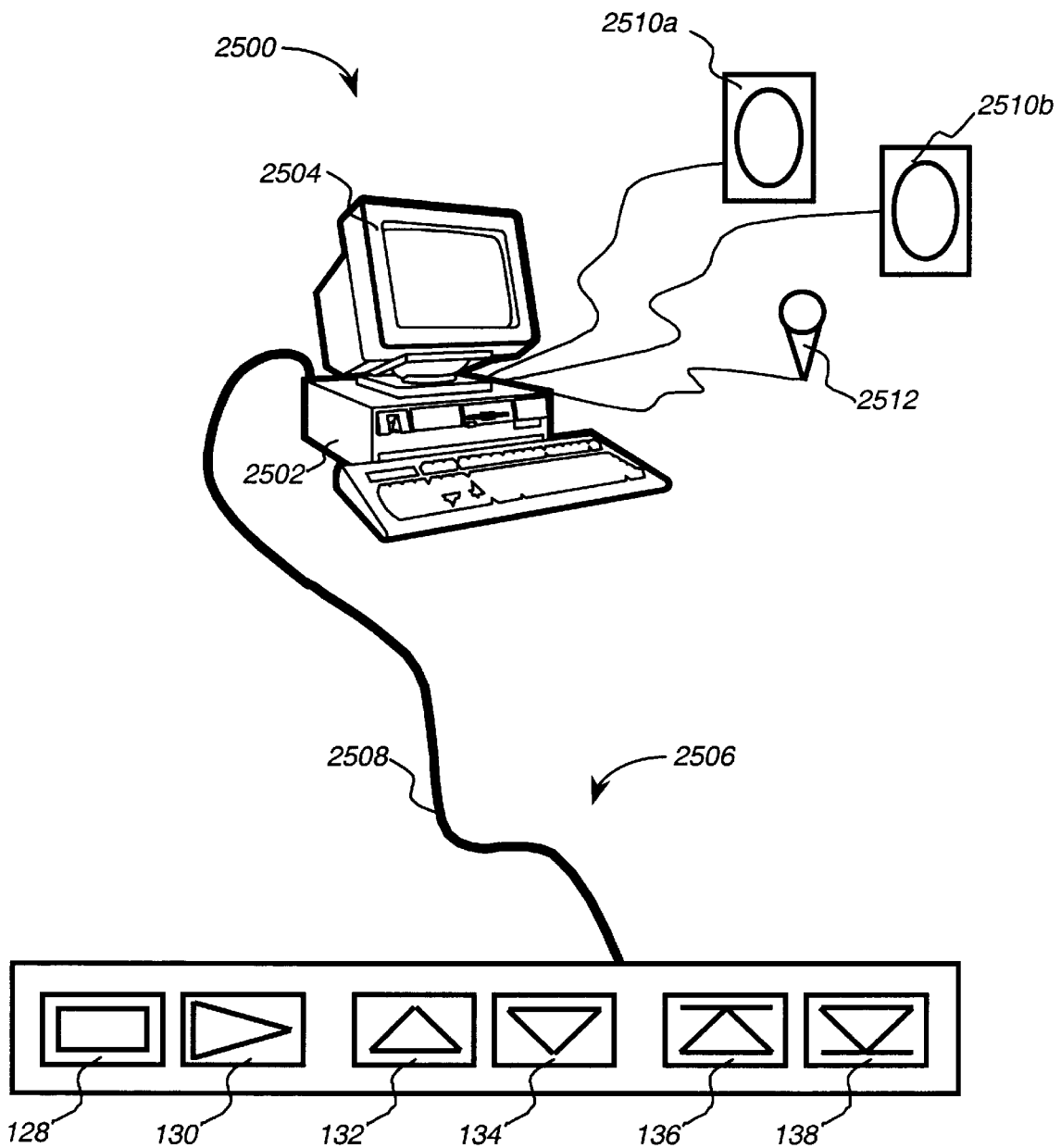
FIG. 25 illustrates an alternate embodiment of the present invention.

FIG. 25 illustrates an alternate embodiment of the present invention. It is a straightforward process to take matter heretofore discussed and implement a graphical image of LIPS 100 in FIG. 1 on a graphical user interface of a computer system 2500. Computer unit 2502 data processing capability would execute the present invention, and the user interface would be displayed to monitor 2504. A user would be able to use a mouse to activate controls and dycons, just like touching LIPS 100. The data processing system of computer system 2500 is capable of processing the present invention. Speaker 140 would be replaced by speakers 2510, and microphone 142 would be replaced by microphone 2512. A mouse could drive all processing. A touch screen computer system may also be utilized, whereby a touch interface to a graphical image of LIPS 100 is incorporated.

In another embodiment, computer system 2500 may be equipped with a special activation peripheral 2506. The computer keyboard could be used to operate host controls of a windows like interface of the present invention, while the activation peripheral 2506 could be used by a client. Activation peripheral 2506 could further be equipped with additional controls. In a hospital, monitor 2504 may be a television set, strategically located computer monitor, or the like. The computer unit 2502 may be hidden from sight. A patient could operate an activation peripheral 2506 to communicate effectively to a host. Connection 2508 may be serial, PS/2, or the like. In a windows interface of the present invention, the page up control 132 and page down control 134 could operate for moving one line up or down, wherein pause control 128 could actually select the current menu selection. Single click and double click may be incorporated to activation peripheral 2506. An activation peripheral (and possibly the entire embodiment of the present invention) may even be integrated with international airline seats, for example.

Activation peripheral 2506 may take on a variety of controls, depending on the user interface of the present invention on a computer system. The computer system 2500 keyboard may also be used to interface to the present invention.

Figure 26:
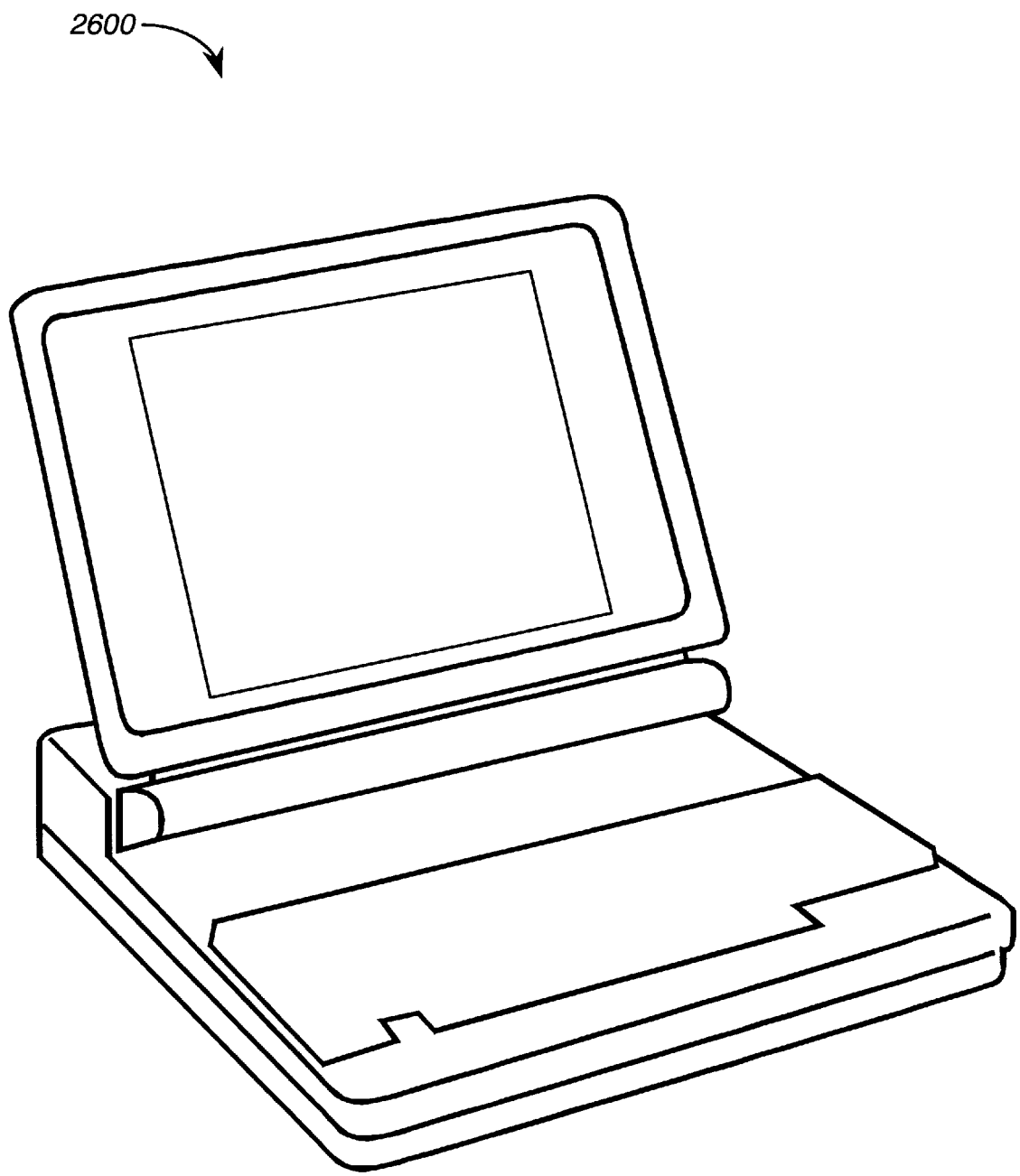
FIG. 26 illustrates another alternate embodiment of the present invention.

FIG. 26 illustrates another alternate embodiment of the present invention. A laptop computer 2600, not much different than computer system 2500 may also implement the invention in a similar manner to computer system 2500.

Yet another embodiment of the present invention will replace locations of keyboard input in processing with a voice control and voice to text processing interface utilizing microphone 216. This allows editing capability and criteria dycon specification without a keyboard. "Dragon Dictate" by Dragon Systems, Inc. and Voice Type Dictation System" by IBM may be utilized as a front end plug-in component to the present invention.

Yet another embodiment will utilize dynamic translation rule data. For example, a tree menu mode interface for an international car rental agency will use a dynamically changing tree structure depending on what cars are available. A static response mode may access remote translation rule data for processing. Thus, translation rule data may be dynamic and/or remotely accessed.

Yet another embodiment is to provide an integrated dyconic keyboard into the housing 102.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A data processing system for enhancing human communications, comprising:

a set of client controls for navigating the user interface of said data processing system;

a plurality of display buttons, each button of said plurality of display buttons being an individual visible mechanical button distinguishable by physical touch without inadvertent invocation, wherein said button includes a dedicated display means integrated thereon for dynamically displaying a plurality of purposes for manually invoking said button, and wherein said button is capable of bearing a physical touch communication;

tabular translation rules means containing a plurality of translation member rows by a plurality of language partition columns, wherein each translation member row of said plurality of translation member rows contains a plurality of translation records in correspondence with said language partition columns, and wherein each translation record of said plurality of translation records contains a plurality of fields for a dialogue, wherein said dialogue is completely constructed;

mode control means for selecting a current processing mode of said data processing system from a plurality of different user interface execution algorithms;

client media control means for maintaining at least one client partition index referencing a language partition column of said language partition columns;

host media control means for maintaining at least one host partition index referencing a language partition column of said language partition columns;

means for communicating to a user through said plurality of display buttons said plurality of fields for a set of first translation records of a language partition column referenced by said client partition index, in accordance with said client controls and said current processing mode;

means for associating a reference of each record of said set of first translation records to a button of said plurality of display buttons;

means for determining with said reference a selected translation record of said set of first translation records upon a user invoked button of said plurality of display buttons; and means for communicating to a user through said user invoked button said plurality of fields of a second translation record of the translation member row containing said selected translation record, said second translation record of a language partition column referenced by said host partition index.

2. The system of claim 1 wherein said plurality of fields includes a field for a visual representation of said dialogue.

3. The system of claim 1 wherein said plurality of fields includes a field for an audible representation of said dialogue.

4. The system of claim 1 wherein at least one button of said plurality of display buttons includes means for a physical form representation enabling physical touch communication of said set of first translation records of a language partition column.

5. The system of claim 1 further comprising means for editing said tabular translation rules means.

6. The system of claim 1 further comprising:
a tree menu mode tree structure wherein each node of said tree structure is associated to a translation member row of said tabular translation rules means;
stack means for maintaining a context in said tree structure, said stack means containing row references to said translation member rows of each level depth into said tree structure, said context corresponding to a current level of peer nodes of said tree structure communicated through said plurality of display buttons; and
tree traversal means accessing said stack means and responding to user interaction to said client controls wherein said set of first translation records correspond to said current level of peer nodes, and whereupon said user interaction causes said set of first translation records to subsequently change and correspond to a next descending or ascending level of peer nodes of said tree structure communicated through said plurality of display buttons.

7. The system of claim 1 further comprising:
dictionary mode sort schema means including a plurality of language sort references for maintaining a language dependent sorted order of said plurality of translation member rows according to a selected language sort reference; and
means for redefining said plurality of display buttons to a criteria display button and remaining display buttons, said remaining display buttons being presented to with said set of first translation records in accordance to said language sort reference corresponding to a language partition column referenced by said client partition index together in accordance with matching to a word in progress of entry to said criteria display button at an active cursor.

8. The system of claim 1 further comprising means for redefining said plurality of display buttons to a criteria display button and remaining display buttons, said remaining display buttons being presented to with said set of first translation records having fields containing a matching criteria thus far entered to said criteria display button.

9. The system of claim 6 further comprising iteratively processing means for processing a plurality of said row references from a first level to said current level, wherein an iteration of said iteratively processing means includes communication of a translation record of a translation member row referenced by a row reference of said row references.

10. The system of claim 1 wherein said means for communicating said plurality of fields for a set of first translation records of a language partition column further includes means for communicating through said plurality of display buttons an other set of first translation records of an other language partition column referenced by said client partition index in response to user manipulation of said client media control means.

11. The system of claim 1 further comprising means for prompting a user by highlighting a button of said plurality of display buttons.

12. The system of claim 6 further comprising means for editing said tree structure.

13. The system of claim 7 further comprising iteratively processing means for processing a plurality of contents in said criteria display button wherein an iteration of said iteratively processing means includes communication of a language occurrence in said criteria display button or communication of a translation record of a translation member row associated with said language occurrence.

14. The system of claim 7 wherein a field of said plurality of fields of a translation record of said set of first translation records is automatically used to replace a language occurrence in said criteria display button.

15. The system of claim 7 wherein said dictionary mode sort schema means further includes a weight value associated with each sort record of said language sort references, said weight value used as a threshold for filtered presentation of said set of first translation records to said plurality of display buttons.

16. The system of claim 8 further comprising iteratively processing means for processing a plurality of contents in said criteria display button wherein an iteration of said iteratively processing means includes communication of a language occurrence in said criteria display button or communication of a translation record of a translation member row associated with said language occurrence.

17. The system of claim 8 wherein a field of said plurality of fields of a translation record of said set of first translation records is automatically used to replace a language occurrence in said criteria display button.

18. A method in a data processing system for enhancing human communications, said method comprising the steps of:
manipulating a set of client controls for navigating the user interface of said data processing system;
manipulating a plurality of display buttons, each button of said plurality of display buttons being an individual visible mechanical button distinguishable by physical touch without inadvertent invocation, wherein said button includes a dedicated display means integrated thereon for dynamically displaying a plurality of purposes for manually invoking said button, and wherein said button is capable of bearing a physical touch communication;
accessing tabular translation rules containing a plurality of translation member rows by a plurality of language partition columns, wherein each translation member row of said plurality of translation member rows contains a plurality of translation records in correspondence with said language partition columns, and wherein each translation record of said plurality of translation records contains a plurality of fields for a dialogue, wherein said dialogue is completely constructed;
manipulating mode control means for selecting a current processing mode of said data processing system from a plurality of different user interface execution algorithms;
manipulating client media control means for maintaining at least one client partition index referencing a language partition column of said language partition columns;
manipulating host media control means for maintaining at least one host partition index referencing a language partition column of said language partition columns;
communicating to a user through said plurality of display buttons said plurality of fields for a set of first translation records of a language partition column referenced by said client partition index, in accordance with said client controls and said current processing mode;

associating a reference of each record of said set of first translation records to a button of said plurality of display buttons;

determining with said reference a selected translation record of said set of first translation records upon a user invoked button of said plurality of display buttons; and communicating to a user through said user invoked button said plurality of fields of a second translation record of the translation member row containing said selected translation record, said second translation record of a language partition column referenced by said host partition index.

19. The method of claim 18 wherein said plurality of fields includes a field for a visual representation of said dialogue.

20. The method of claim 18 wherein said plurality of fields includes a field for an audible representation of said dialogue.

21. The method of claim 18 wherein at least one button of said plurality of display buttons includes a physical form representation enabling physical touch communication of said set of first translation records of a language partition column.

22. The method of claim 18 further comprising the steps of:

traversing a tree menu mode tree structure wherein each node of said tree structure is associated to a translation member row of said tabular translation rules means;

managing stack means for maintaining a context in said tree structure, said stack means containing row references to said translation member rows of each level depth into said tree structure, said context corresponding to a current level of peer nodes of said tree structure communicated through said plurality of display buttons; and responding to user interaction to said client controls wherein said set of first translation records correspond to said current level of peer nodes, and whereupon said user interaction causes said set of first translation records to subsequently change and correspond to a next descending or ascending level of peer nodes of said tree structure communicated through said plurality of display buttons.

23. The method of claim 18 further comprising the steps of:

accessing dictionary mode sort schema including a plurality of language sort references for maintaining a language dependent sorted order of said plurality of translation member rows according to a selected language sort reference; and redefining said plurality of display buttons to a criteria display button and remaining display buttons, said remaining display buttons being presented to with said set of first translation records in accordance to said language sort reference corresponding to a language partition column referenced by said client partition index together in accordance with matching to a word in progress of entry to said criteria display button at an active cursor.

24. The method of claim 18 further comprising the step of redefining said plurality of display buttons to a criteria display button and remaining display buttons, said remaining display buttons being presented to with said set of first translation records having fields containing a matching criteria thus far entered to said criteria display button.

25. The method of claim 22 further comprising the step of iteratively processing a plurality of said row references from a first level to said current level, wherein an iteration of said step of iteratively processing includes communication of a translation record of a translation member row referenced by a row reference of said row references.

26. The method of claim 18 wherein said step for communicating said plurality of fields for a set of first translation records of a language partition column further includes the step of communicating through said plurality of display buttons an other set of first translation records of an other language partition column referenced by said client partition index in response to user manipulation of said client media control means.

27. The method of claim 18 further comprising the step of editing said tabular translation rules.

28. The method of claim 18 further comprising the step of prompting a user by highlighting a button of said plurality of display buttons.

29. The method of claim 22 further comprising the step of editing said tree structure.

30. The method of claim 23 further comprising the step of iteratively processing a plurality of contents in said criteria display button wherein an iteration of said step of iteratively processing includes communication of a language occurrence in said criteria display button or communication of a translation record of a translation member row associated with said language occurrence.

31. The method of claim 23 wherein a field of said plurality of fields of a translation record of said set of first translation records is automatically used to replace a language occurrence in said criteria display button.

32. The method of claim 23 wherein said step of accessing dictionary mode sort schema further includes the step of accessing a weight value associated with each sort record of said language sort references, said weight value used as a threshold for filtered presentation of said set of first translation records to said plurality of display buttons.

33. The method of claim 24 further comprising the step of iteratively processing a plurality of contents in said criteria display button wherein an iteration of said iteratively processing includes communication of a language occurrence in said criteria display button or communication of a translation record of a translation member row associated with said language occurrence.

34. The method of claim 24 wherein a field of said plurality of fields of a translation record of said set of first translation records is automatically used to replace a language occurrence in said criteria display button.

* * * * *